United States Patent
Yano et al.

(10) Patent No.: US 10,812,770 B2
(45) Date of Patent: Oct. 20, 2020

(54) IMAGE PROCESSING SYSTEM, IMAGE PROCESSING APPARATUS, IMAGE PROCESSING METHOD, AND PROGRAM

(71) Applicant: CANON KABUSHIKI KAISHA, Tokyo (JP)

(72) Inventors: Tomohiro Yano, Yokohama (JP); Mitsuru Maeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 119 days.

(21) Appl. No.: 16/128,159

(22) Filed: Sep. 11, 2018

(65) Prior Publication Data
US 2019/0082160 A1   Mar. 14, 2019

(30) Foreign Application Priority Data

Sep. 13, 2017 (JP) .................. 2017-175528
Oct. 18, 2017 (JP) .................. 2017-201955

(51) Int. Cl.
*H04N 13/111* (2018.01)
*G06K 9/32* (2006.01)
(Continued)

(52) U.S. Cl.
CPC ....... *H04N 13/111* (2018.05); *G06K 9/00758* (2013.01); *G06K 9/3241* (2013.01);
(Continued)

(58) Field of Classification Search
CPC ...... H04H 60/377; H04H 60/07; H04H 60/64; H04H 60/48; G06N 20/00
(Continued)

(56) References Cited

U.S. PATENT DOCUMENTS 10,535,146 B1 *   1/2020   Buibas ............... G06K 9/00201
2014/0247892 A1 *  9/2014   Williams ............. H04L 12/403
                                               375/257
(Continued)

FOREIGN PATENT DOCUMENTS

JP     2000-57350 A    2/2000
JP     2010-97355 A    4/2010
(Continued)

*Primary Examiner* — Jerome Grant, II
(74) *Attorney, Agent, or Firm* — Canon U.S.A., Inc. IP Division

(57) ABSTRACT

An image processing system for generating a virtual viewpoint image includes: an information acquisition unit configured to acquire viewpoint information indicating a virtual viewpoint; an image acquisition unit configured to acquire, based on a plurality of captured images acquired by shooting a target region by a plurality of cameras in a plurality of directions, background images not including a predetermined object in the target region and an image of the predetermined object; an extraction unit configured to extract a partial image to be used to generate the virtual viewpoint image from a background image included in the background images acquired by the image acquisition unit; and a generation unit configured to generate the virtual viewpoint image based on the partial image extracted by the extraction unit, the image of the predetermined object acquired by the image acquisition unit, and the viewpoint information acquired by the information acquisition unit.

14 Claims, 41 Drawing Sheets

(51) Int. Cl.
*G06T 7/70* (2017.01)
*G06K 9/62* (2006.01)
*G06T 7/55* (2017.01)
*G06T 17/00* (2006.01)
*G06T 7/194* (2017.01)
*G06K 9/00* (2006.01)
*H04N 5/232* (2006.01)
*G06T 15/20* (2011.01)

(52) U.S. Cl.
CPC ............ *G06K 9/6289* (2013.01); *G06T 7/194* (2017.01); *G06T 7/55* (2017.01); *G06T 7/70* (2017.01); *G06T 15/205* (2013.01); *G06T 17/00* (2013.01); *H04N 5/232* (2013.01); *G06T 2207/10024* (2013.01); *G06T 2207/20224* (2013.01); *G06T 2207/30221* (2013.01)

(58) Field of Classification Search
USPC .................................................. 382/159, 154
See application file for complete search history.

(56) References Cited

U.S. PATENT DOCUMENTS

| | | | |
|---|---|---|---|
| 2015/0294492 A1* | 10/2015 | Koch ................... | H04N 13/243 345/426 |
| 2018/0176424 A1* | 6/2018 | Christl ................... | H04N 7/181 |
| 2018/0288394 A1* | 10/2018 | Aizawa ............... | H04N 13/117 |
| 2019/0043207 A1* | 2/2019 | Carranza ............ | G06K 9/00228 |
| 2019/0147607 A1* | 5/2019 | Stent ...................... | G06S 5/046 382/103 |
| 2019/0174108 A1* | 6/2019 | Yano ......................... | G06T 7/55 |
| 2019/0174112 A1* | 6/2019 | Adachi ............... | H04N 13/161 |
| 2019/0289285 A1* | 9/2019 | Nashida ............... | H04N 9/3147 |
| 2019/0304114 A1* | 10/2019 | Yoshimura .............. | G06T 7/194 |
| 2020/0035075 A1* | 1/2020 | Stening ............ | G08B 13/19641 |

FOREIGN PATENT DOCUMENTS

JP 2012-222508 A 11/2012
JP 2013-97584 A 5/2013

* cited by examiner

| ILLUMINATION | TYPE | COORDINATE |
|---|---|---|
| 1010 | POINT LIGHT SOURCE | (x1, y1, z1) |
| 1020 | POINT LIGHT SOURCE | (x2, y2, z2) |
| 1030 | POINT LIGHT SOURCE | (x3, y3, z3) |
| 1040 | POINT LIGHT SOURCE | (x4, y4, z4) | ian
IMAGE PROCESSING SYSTEM, IMAGE PROCESSING APPARATUS, IMAGE PROCESSING METHOD, AND PROGRAM

BACKGROUND

Field of the Disclosure

The present disclosure relates to a technique for processing images shot by a plurality of cameras in order to shoot an object in a plurality of directions.

Description of the Related Art

In recent years, a technique has been paid attention to in which a plurality of cameras are installed at different positions to simultaneously shoot at multiple viewpoints and virtual viewpoint contents such as virtual viewpoint image are generated by use of the multi-viewpoint images obtained by the shooting. According to the technique, a highlight scene of a game of soccer or basketball can be viewed at various angles, for example, thereby giving a user a high realistic sensation.

On the other hand, in order to generate and view virtual viewpoint contents based on multi-viewpoint images, images shot by a plurality of cameras are collected into an image processing unit such as server, and a 3D model is generated and rendered in the image processing unit to be transmitted to a user terminal. Japanese Patent Laid-Open No. 2000-57350 describes that the foregrounds and the backgrounds are separated from the images shot by a plurality of cameras, and are combined, respectively, thereby to generate a virtual viewpoint image.

SUMMARY

An image processing system for generating a virtual viewpoint image includes: an information acquisition unit configured to acquire viewpoint information indicating a virtual viewpoint; an image acquisition unit configured to acquire, based on a plurality of captured images acquired by shooting a target region by a plurality of cameras in a plurality of directions, a plurality of background images not including a predetermined object in the target region and an image of the predetermined object; an extraction unit configured to extract a partial image to be used to generate the virtual viewpoint image from a background image included in the background images acquired by the image acquisition unit; and a generation unit configured to generate the virtual viewpoint image based on the partial image extracted by the extraction unit, the image of the predetermined object acquired by the image acquisition unit, and the viewpoint information acquired by the information acquisition unit.

Further features of the present disclosure will become apparent from the following description of exemplary embodiments (with reference to the attached drawings).

DESCRIPTION OF THE EMBODIMENTS

The present disclosure will be described below in detail by way of preferred embodiments with reference to the accompanying drawings. The configurations described in the following embodiments are merely exemplary, and the present disclosure is not limited to the illustrated configurations.

A processing of generating a 3D model from shot images (captured images), or the like needs to be performed with high accuracy and rapidly in order to generate and view virtual viewpoint contents based on multi-viewpoint images. A conventional image processing system has a problem that a common region in the images shot by the respective cameras is redundantly transmitted in order to generate a virtual viewpoint image and the transmission line capacity for transmitting many shot images increases. A configuration for efficiently transmitting images shot by a plurality of cameras will be described below according to a first embodiment and a second embodiment.

First Embodiment

There will be described a system in which a plurality of cameras and microphones are installed in a facility such as stadium or concert hall to shoot or collect sounds with reference to FIG. 1.

<Description of Image Processing System 100>

Figure 1:
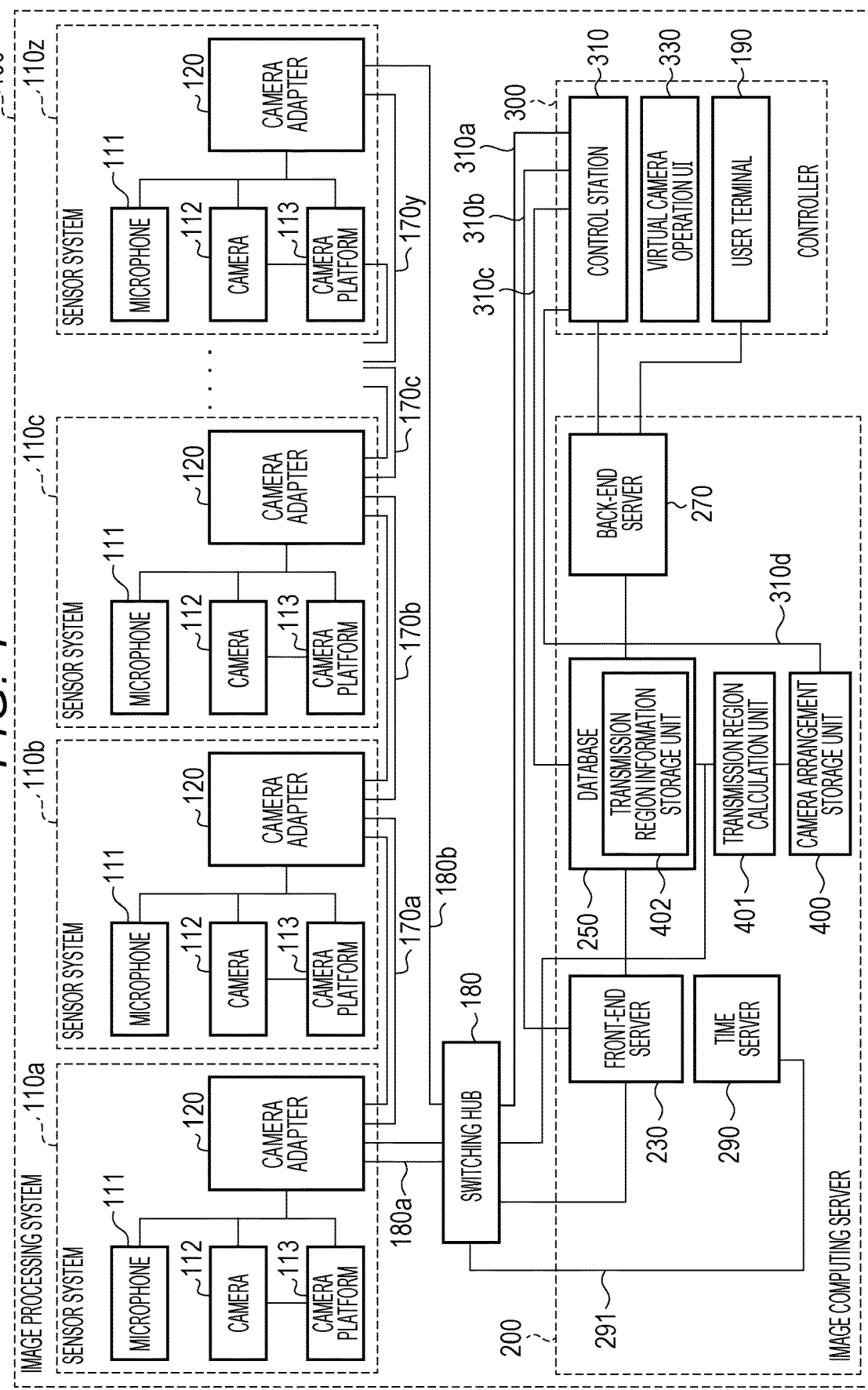
FIG. 1 is a configuration diagram of an image processing system.

FIG. 1 is a configuration diagram illustrating an exemplary image processing system 100. The image processing system 100 includes sensor systems 110a, ..., 110z, an image computing server 200, a controller 300, a switching hub 180, and an end-user terminal 190.

The controller 300 includes a control station 310 and a virtual camera operation UI 330. The control station 310 manages the operation states and controls parameter setting of the respective blocks configuring the image processing system 100 via networks 310a to 310d, 180a, 180b, and 170a ..., 170y.

<Description of Sensor System 110>

An operation of transmitting images and speech of 26 sensor systems 110a to 110z from the sensor system 110z to the image computing server 200 will be first described.

The sensor systems 110a to 110z are connected via daisy chains in the image processing system 100. According to the present embodiment, unless particularly stated, the 26 sensor systems 110a to 110z are not discriminated and are denoted as sensor system 110. Similarly, the devices in each sensor system 110 are not discriminated unless particularly stated, and are denoted as microphone 111, camera 112, camera platform 113, and camera adapter 120. 26 sensor systems are described, but are exemplary and the number of sensor systems is not limited thereto. Further, according to the present embodiment, unless particularly stated, the description will be made assuming that a word "image" includes a moving picture and a still image. That is, the image processing system 100 according to the present embodiment can process both still images and moving pictures.

Further, the present embodiment will be described mainly assuming that virtual viewpoint contents provided by the image processing system 100 include a virtual viewpoint image and virtual viewpoint speech, but is not limited thereto. For example, the virtual viewpoint contents may not include speech. For example, speech included in the virtual viewpoint contents may be collected by the closest microphone to a virtual viewpoint. According to the present embodiment, the description of speech is partially omitted for simple description, but it is assumed that images and speech are basically processed together.

The sensor systems 110a to 110z include the cameras 112a to 112z, respectively. That is, the image processing system 100 includes a plurality of cameras in order to shoot the same object in a plurality of directions. The sensor systems 110 are connected via daisy chains.

The sensor system 110 includes the microphone 111, the camera 112, the camera platform 113, and the camera adapter 120, but is not limited to the configuration. An image shot by the camera 112a is subjected to an image processing described below in the camera adapter 120a, and then transmitted to the camera adapter 120b in the sensor system 110b via the daisy chain 170a together with speech collected by the microphone 111a. The sensor system 110b transmits collected speech and a shot image to the sensor system 110c together with the image and the speech acquired from the sensor system 110a.

The above operations are continued so that the images and the speech acquired by the sensor systems 110a to 110z are transmitted from the sensor system 110z to the switching hub 180 via the network 180b, and then transmitted to the image computing server 200.

According to the present embodiment, the cameras 112a to 112z and the camera adapters 120a to 120z are separated, but may be integrated in the same casing. In this case, the microphones 111a to 111z may be incorporated in the integrated cameras 112, or may be connected to the outside of the cameras 112.

<Description of Image Computing Server 200>

The configuration and operations of the image computing server 200 will be described below. The image computing server 200 processes data acquired from the sensor system 110z.

The image computing server 200 includes a front-end server 230, a database 250 (which may be denoted as DB below), a back-end server 270, and a time server 290. The image computing server 200 further includes a transmission region calculation unit 401 and a camera arrangement storage unit 400. Further, the database 250 includes a transmission region information storage unit 402.

The camera arrangement storage unit 400 stores information (denoted as camera arrangement information below) on position, orientation, direction, and lens focal length of each camera 112 acquired from the control station 310.

The transmission region calculation unit 401 calculates a region (denoted as transmission region below) corresponding to an image transmitted for generating a virtual viewpoint image among the images shot by the cameras 112 based on the positions and the angles of view of the cameras stored in the camera arrangement storage unit 400, and generates transmission region information.

The transmission region information storage unit 402 stores the transmission region information of each camera 112 generated in the transmission region calculation unit 401. The transmission region information is updated whenever the position or the angle of view of the camera 112 is changed.

The time server 290 has a function of distributing time and a synchronization signal, and distributes time and a synchronization signal to the sensor systems 110a to 110z via the switching hub 180. The camera adapters 120a to 120z which receive time and a synchronization signal perform Genlock on the cameras 112a to 112z based on the time and the synchronization signal thereby to perform image frame synchronization. That is, the time server 290 synchronizes the shooting timings of the cameras 112. Thereby, the image processing system 100 can generate a virtual viewpoint image based on a plurality of images shot at the same timing, thereby preventing a reduction in quality of the virtual viewpoint image due to an offset in shooting timing.

The front-end server 230 reconstructs segmented transmission packets based on the images and the speech acquired from the sensor system 110z, and converts the data format. Thereafter, the transmission packets are written in the database 250 depending on the identifier of a camera, data type indicating image or speech, and a frame number.

The database 250 manages the reception situations of each frame and image data from each camera adapter 120, which are acquired from the front-end server 230, in a state management table. For example, for each time and each camera, 0 indicating that image data does not reach or 1 indicating that image data reaches is flagged. Further, 1 indicating that all image data reaches is flagged per predetermined time (per second, for example), or similar flagging is performed for each time and each camera within a predetermined time if all data does not reach.

The back-end server 270 receives a designated virtual viewpoint from the virtual camera operation UT 330. The back-end server 270 is an example of an information acquisition unit acquiring viewpoint information indicating a virtual viewpoint. A corresponding image and speech data are read from the database 250 based on the received viewpoint, and are rendered thereby to generate a virtual viewpoint image. The configuration of the image computing server 200 is not limited thereto. For example, at least two of the front-end server 230, the database 250, and the back-end server 270 may be integrally configured. Further, a plurality of front-end servers 230, databases 250, or back-end servers 270 may be present. A device other than the above devices may be included at any position in the image computing server 200. Further, the end-user terminal 190 or the virtual camera operation UI 330 may have at least some of the functions of the image computing server 200.

The rendered virtual viewpoint image is transmitted from the back-end server 270 to the end-user terminal 190, and the user operating the end-user terminal 190 can view an image and listen to speech depending on a designated viewpoint. That is, the back-end server 270 generates virtual viewpoint contents based on the shot images (multi-viewpoint images) shot by the cameras 112 and the viewpoint information. Specifically, the back-end server 270 generates virtual viewpoint contents based on image data (detailed in FIG. 4) of a predetermined region cut out from the shot images of the cameras 112 by the camera adapters 120, and user-designated viewpoint, for example. The back-end server 270 then provides the end-user terminal 190 with the generated virtual viewpoint contents.

Virtual viewpoint contents according to the present embodiment may include a virtual viewpoint image acquired when an object is shot at a virtual viewpoint. In other words, a virtual viewpoint image may express a vision at a designated viewpoint. A virtual viewpoint may be designated by a user, or may be automatically designated based on an image analysis result or the like. That is, a virtual viewpoint image includes an arbitrary-viewpoint image (free-viewpoint image) corresponding to a viewpoint arbitrarily designated by a user. Further, a virtual viewpoint image includes an image corresponding to user-designated viewpoint among a plurality of candidate viewpoints, or an image corresponding to a viewpoint automatically designated by a device. Further, the back-end server 270 may encode a virtual viewpoint image in a standard technique such as H.264 or HEVC and transmit it to the end-user terminal 190 by the MPEG-DASH protocol. Furthermore, a virtual viewpoint image may be transmitted to the end-user terminal 190.

In this way, a virtual viewpoint image is generated by the back-end server 270 based on the images shot by the cameras 112 configured to shoot an object in different directions in the image processing system 100. The image processing system 100 according to the present embodiment is not limited to the above-described physical configuration, and may be logically configured.

<Description of Functional Block Diagrams>

The functional block diagrams of the respective nodes (the camera adapter 120, the front-end server 230, and the transmission region calculation unit 401) in the image processing system 100 illustrated in FIG. 1 will be described below.

<Description of Camera Adapter 120>

Figure 2:
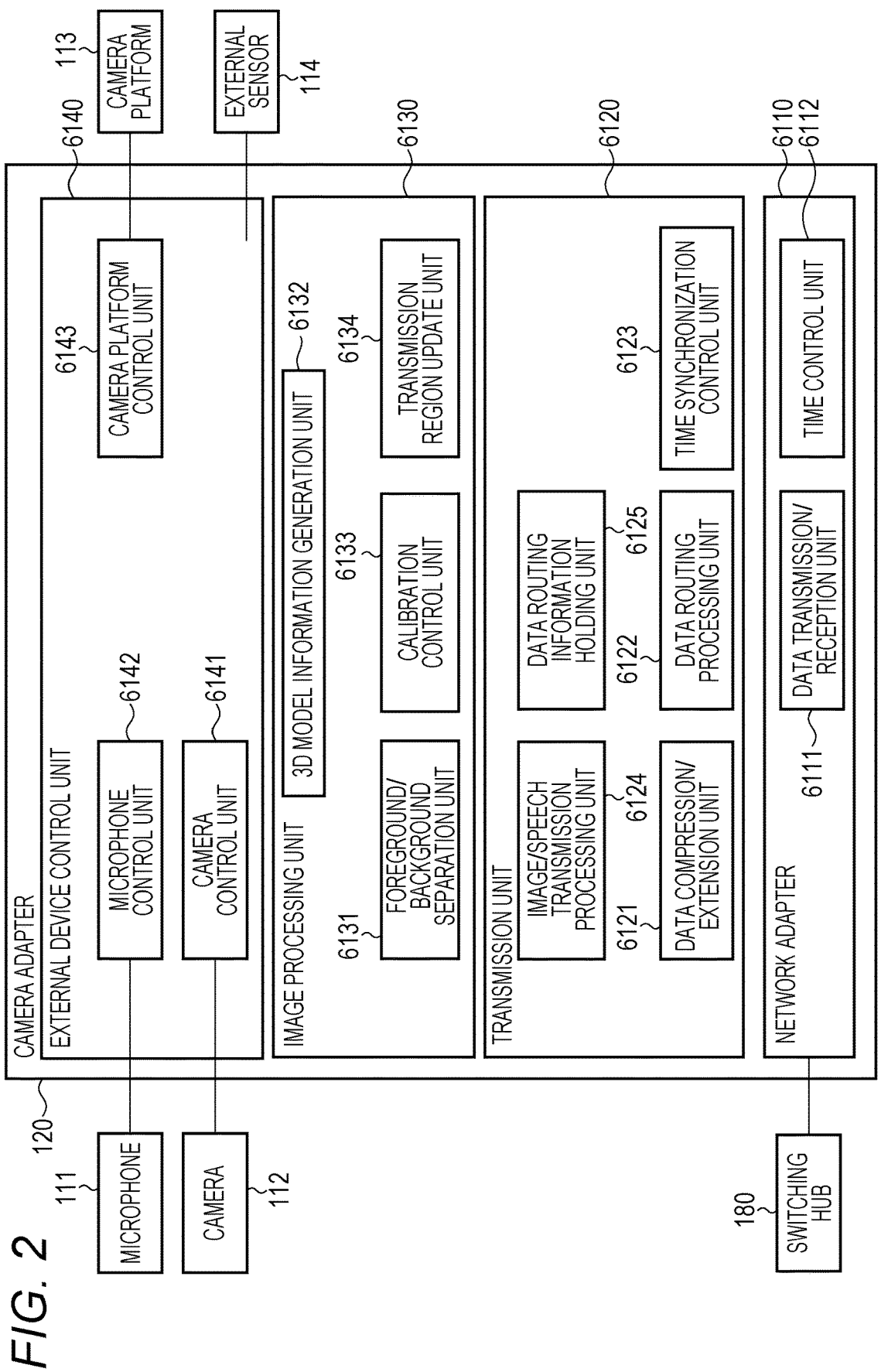
FIG. 2 is a functional block diagram of a camera adapter.

FIG. 2 is a block diagram for explaining a functional configuration of the camera adapter 120. The camera adapter 120 includes a network adapter 6110, a transmission unit 6120, an image processing unit 6130, and an external device control unit 6140.

The network adapter 6110 includes a data transmission/reception unit 6111 and a time control unit 6112. The data transmission/reception unit 6111 makes data communication with other camera adapters 120, the front-end server 230, the time server 290, and the control station 310 via the daisy chains 170, a network 291, and the network 310a. For example, the data transmission/reception unit 6111 receives transmission region information from the transmission region calculation unit 401. The data transmission/reception unit 6111 transmits a foreground image which a foreground/background separation unit 6131 generates by performing a separation processing on a shot image of the camera 112, or a background region image generated by a transmission region update unit 6134 to other camera adapter 120. The separation unit 6131 is an example of an image acquisition unit acquiring a background image and a foreground image. A transmission destination camera adapter 120 is a next camera adapter 120 in the order predetermined depending on a processing of a data routing processing unit 6122 among the camera adapters 120 in the image processing system 100. Each camera adapter 120 outputs a foreground image and a background image so that a virtual viewpoint image is generated based on the foreground image and the background image shot at a plurality of viewpoints.

The time control unit 6112 conforms to Ordinary Clock in the IEEE 1588 standard, for example, and has a function of saving time stamps of data exchanged with the time server 290, and a function of performing time synchronization with the time server 290. Time synchronization with the time server may be realized via other EtherAVB standard or unique protocol, not limited to the IEEE 1588.

The transmission unit 6120 includes a data compression/extension unit 6121, the data routing processing unit 6122, a time synchronization control unit 6123, an image/speech transmission processing unit 6124, a data routing information holding unit 6125, and a frame rate changing unit 6126. The data compression/extension unit 6121 has a function of compressing by applying a predetermined compression system, a compression rate, and a frame rate to data exchanged via the data transmission/reception unit 6111, and a function of extending compressed data.

The data routing processing unit 6122 determines a destination to which data received by the data transmission/reception unit 6111 and data processed by the image processing unit 6130 are to be routed by use of the data held in the data routing information holding unit 6125 described below. Further, the data routing processing unit 6122 has a function of transmitting data to a determined routing destination. A routing destination is preferably a camera adapter 120 corresponding to a camera 112 focused at the same point of gaze in terms of the image processing since a correlation in image frame is high between the cameras 112. The order of the camera adapters 120 configured to output a foreground image and a background region image in a relay system in the image processing system 100 is determined depending on the determinations of the data routing processing units 6122 in the respective camera adapters 120.

The time synchronization control unit 6123 conforms to Precision Time Protocol (PTP) in the IEEE1588 standard, and has a function of performing a processing for time synchronization with the time server 290. Time synchronization may be performed by use of other similar protocol, not limited to PTP.

The image/speech transmission processing unit 6124 has a function of creating a message for transferring image data or speech data to other camera adapter 120 or the front-end server 230 via the data transmission/reception unit 6111. The message includes image data or speech data, and meta-information of each item of data. The meta-information according to the present embodiment includes a timecode or sequence number when shooting an image or sampling speech, a data type, an identifier indicating an individual of a camera 112 or a microphone 111, and the like. Image data or speech data to be transmitted may be compressed by the data compression/extension unit 6121. The image/speech transmission processing unit 6124 receives a message from other camera adapter 120 via the data transmission/reception unit 6111.

The data routing information holding unit 6125 has a function of holding address information for determining a destination to which data exchanged by the data transmission/reception unit 6111 is to be transmitted.

The image processing unit 6130 includes the foreground/background separation unit 6131, a 3D model information generation unit 6132, a calibration control unit 6133, and the transmission region update unit 6134. The image processing unit 6130 processes image data shot by the camera 112 or image data received from other camera adapter 120 under control of a camera control unit 6141. The image processing unit 6130 will be described in detail with reference to FIG. 3.

The external device control unit 6140 has a function of controlling a device connected to the camera adapter 120, and includes the camera control unit 6141, a microphone control unit 6142, and a camera platform control unit 6143.

The camera control unit 6141 is connected to the camera 112, and has the functions of controlling the camera 112, acquiring a shot image, providing a synchronization signal, and setting time. The camera 112 is controlled in setting and referring to shooting parameters (such as the number of pixels, color depth, frame rate, and white balance), acquiring the state (such as shooting, stopping, synchronizing, and error) of the camera 112, starting and stopping shooting, adjusting focus, and the like. A shooting timing (control clock) is provided to the camera 112 by use of the time when the time synchronization control unit 6123 synchronizes with the time server 290 so that a synchronization signal is provided. The time when the time synchronization control unit 6123 synchronizes with the time server 290 is provided in a timecode conforming to the SMPTE12M format, for example, so that time is set. Thereby, the provided timecode is given to the image data received from the camera 112.

The microphone control unit 6142 and the camera platform control unit 6143 have the functions of controlling the microphone 111 and the camera platform 113 connected thereto, respectively. The camera platform control unit 6143 controls pan tilt, or acquires a state, for example.

<Description of Image Processing Unit 6130 in Camera Adapter 120>

Figure 3:
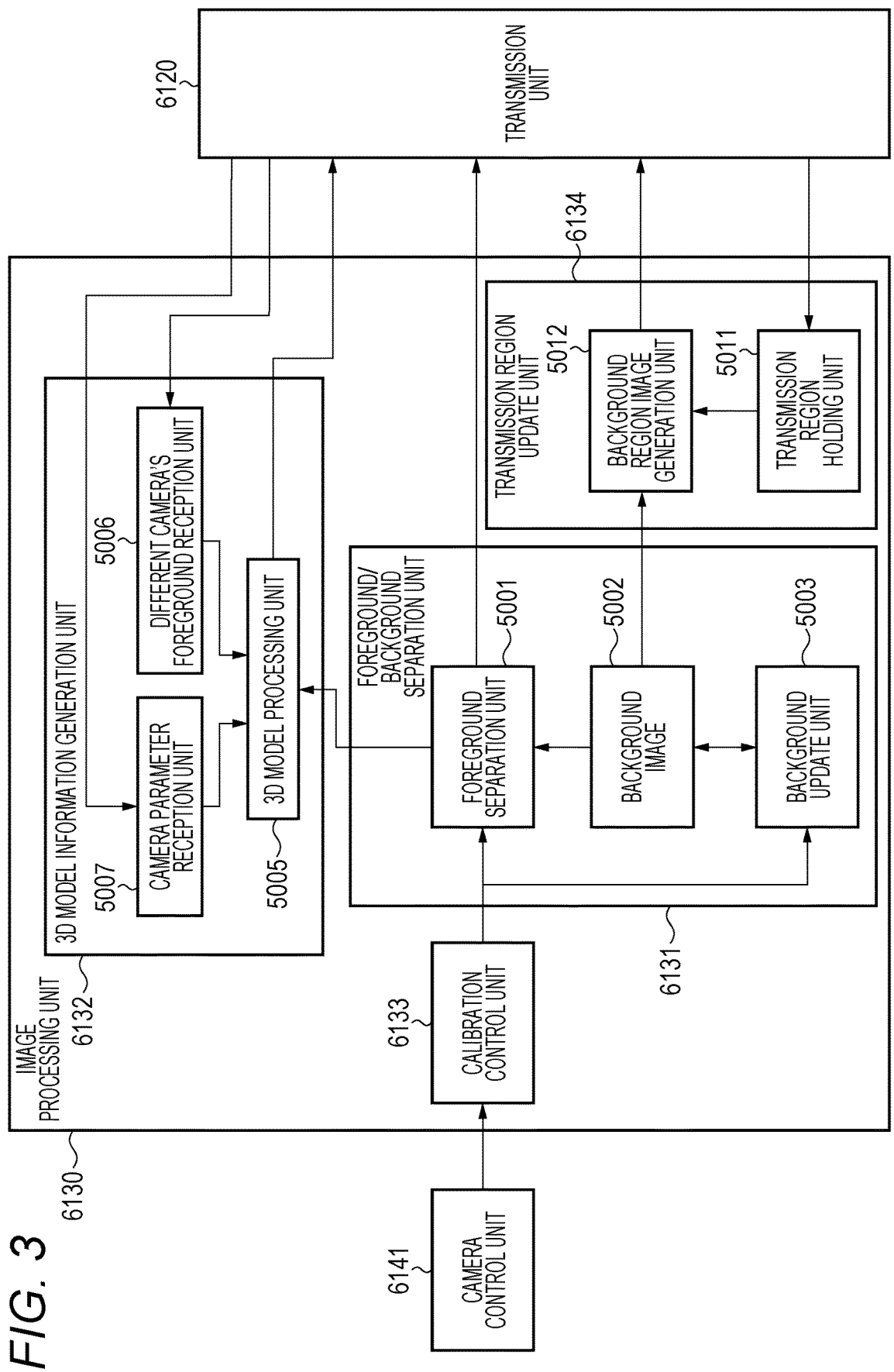
FIG. 3 is a functional block diagram of an image processing unit.

FIG. 3 is a functional block diagram of the image processing unit 6130 in the camera adapter 120. The image processing unit 6130 includes the foreground/background separation unit 6131, the 3D model information generation unit 6132, the calibration control unit 6133, and the transmission region update unit 6134.

The calibration control unit 6133 acquires image data required for calibration from the camera 112 via the camera control unit 6141. A color correction processing for restricting a variation in color per camera or a shake correction processing for stabilizing a position of an image against a shake due to a vibration of the camera is performed on the input image.

The foreground/background separation unit 6131 performs the processing of separating image data shot by the camera 112 into the foreground image and the background image. That is, the foreground/background separation units 6131 in the respective camera adapters 120 extract a predetermined region from an image shot by a corresponding camera 112 out of the cameras 112. The predetermined region is where an object is detected as a result of the processing of detecting the object from the shot image, for example.

The foreground/background separation unit 6131 separates a shot image into the foreground image which is an image in a predetermined region extracted from the shot image and the background image which is an image outside the predetermined region (or outside the foreground image). An object is a person, for example. An object may be a specific person (such as player, coach, and/or referee), or may be an item an image pattern of which is predetermined such as ball. A moving body may be detected as an object. The foreground image including an important object such as person and the background image not including the object are separated, thereby improving the quality of an image corresponding to the object in a virtual viewpoint image generated in the image processing system 100. The foreground image and the background image are separated by the respective camera adapters 120, thereby dispersing loads in the image processing system 100 comprising the cameras 112.

An image to be separated is an image for which a camera shooting the image and an image of its adjacently-installed camera are positioned. The positioning is performed by performing projective transformation on an image of an adjacent camera based on the camera installation information, extracting the characteristic points from a distribution of luminance of each image, and matching the characteristic points.

The foreground/background separation unit 6131 includes a foreground separation unit 5001, a background image 5002, and a background update unit 5003. The foreground separation unit 5001 detects an object from an input image, and extracts the foreground region. For example, the foreground region is extracted based on background difference information obtained by comparison with the background image 5002. The respective pixels in the foreground region are coupled thereby to generate the foreground image.

The background update unit 5003 generates a new background image by use of the image for which the background image 5002 and the camera are positioned, and updates the background image 5002 to the new background image.

The transmission region update unit 6134 includes a transmission region holding unit 5011 and a background region image generation unit 5012.

The transmission region holding unit 5011 acquires transmission region information from the transmission region calculation unit 401 via the transmission unit 6120, and sends it to the background region image generation unit 5012.

The background region image generation unit 5012 generates a background region image from the background image 5002 according to the transmission region information acquired from the transmission region holding unit 5011. The background region image generation unit 5012 is an example of an extraction unit extracting a background region image from a background image generated by the separation unit 6131. Generation of a background region image will be described below with reference to FIG. 11.

The 3D model information generation unit 6132 includes a 3D model processing unit 5005, a different camera's foreground reception unit 5006, and a camera parameter reception unit 5007. The different camera's foreground reception unit 5006 receives a foreground image foreground/background-separated by other camera adapter 120.

The camera parameter reception unit 5007 receives camera-specific intrinsic parameters (such as focal length, center of image, and lens distortion parameter), and extrinsic parameters (such as rotation matrix and position vector) indicating position and orientation of a camera.

The 3D model processing unit 5005 sequentially generates image information on a 3D model from the principle of a stereo camera, for example, by use of the foreground image separated by the foreground separation unit 5001 and the foreground image of other camera 112 received via the transmission unit 6120.

<Description of Front-End Server 230>

Figure 4:
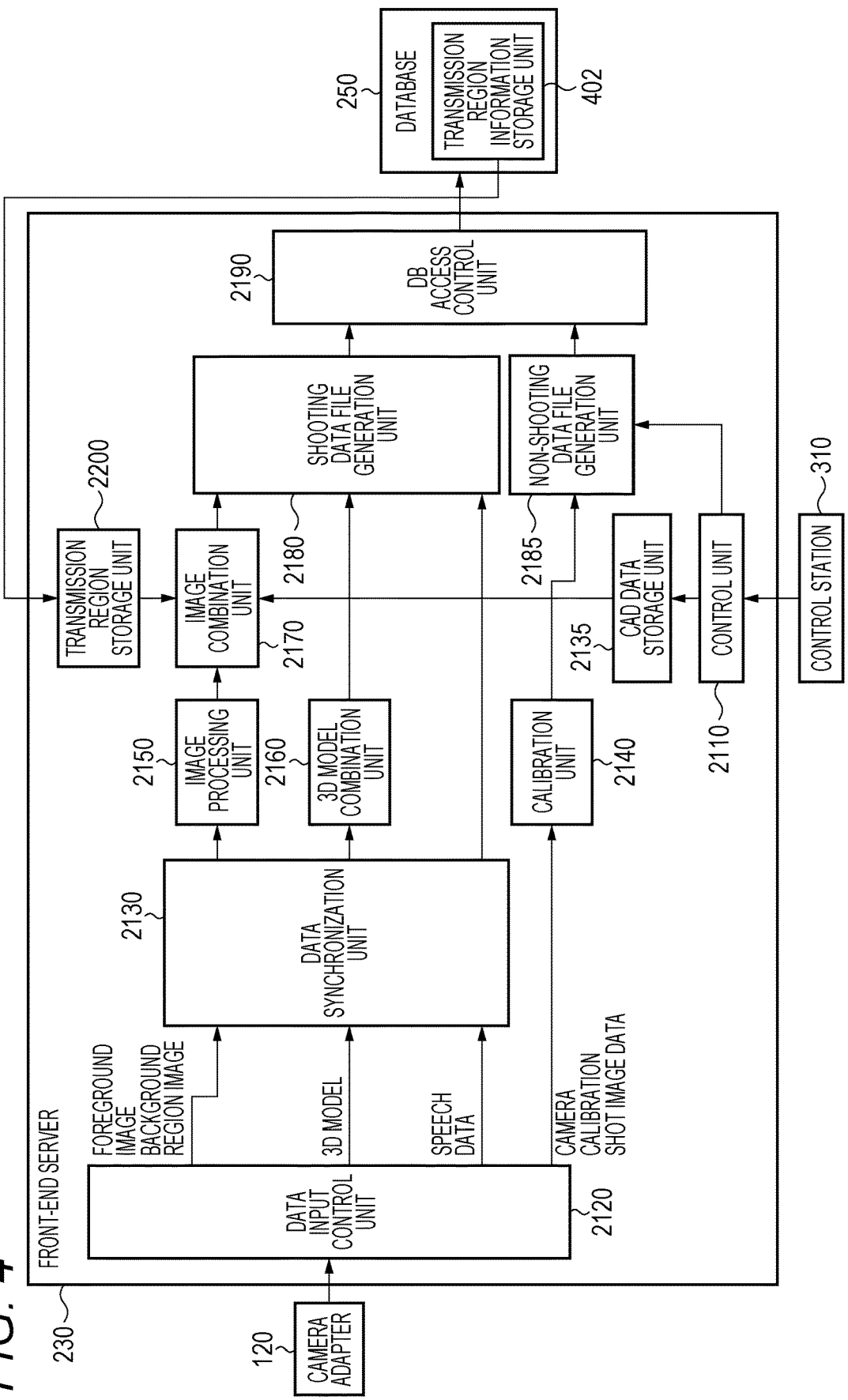
FIG. 4 is a functional block diagram of a front-end server.

FIG. 4 is a block diagram for explaining a functional configuration of the front-end server 230. The front-end server 230 includes a control unit 2110, a data input control unit 2120, a data synchronization unit 2130, a CAD data storage unit 2135, a calibration unit 2140, and an image processing unit 2150. The front-end server 230 further includes a 3D model combination unit 2160, an image combination unit 2170, a shooting data file generation unit 2180, a non-shooting data file generation unit 2185, a DB access control unit 2190, and a transmission region storage unit 2200.

The control unit 2110 is configured in hardware including a storage medium such as CPU, DRAM, HDD or NAND memory storing program data or various items of data, or Ethernet (registered trademark). The control unit 2110 controls each functional block in the front-end server 230 and the entire system of the front-end server 230. The control unit 2110 switches the operation modes such as calibration operation, preparation operation before shooting, and operation during shooting under mode control. For example, the control unit 2110 receives a control instruction from the control station 310 via the network 310b (Ethernet (registered trademark)), and switches each mode or inputs/outputs data. Similarly, the control unit 2110 acquires stadium CAD data (stadium shape data) from the control station 310 via the network 310b, and transmits the stadium CAD data to the CAD data storage unit 2135 and the shooting data file generation unit 2180. The stadium CAD data (stadium shape data) according to the present embodiment is 3D data indicating a shape of the stadium, may be data indicating a mesh model or other 3D shape, and is not limited to the CAD form.

The data input control unit 2120 is network-connected to the camera adapters 120 via a communication path such as networks 180a and 180b (Ethernet (registered trademark)), and the switching hub 180. The data input control unit 2120 acquires foreground images, background region images, 3D models of an object, speech data, and camera calibration shooting image data from the camera adapters 120 via the networks 180a and 180b and the switching hub 180. The data input control unit 2120 transmits the acquired foreground images and background region images to the data synchronization unit 2130, and transmits the camera calibration shooting image data to the calibration unit 2140.

The data synchronization unit 2130 temporarily stores the data acquired from the camera adapters 120 in the DRAM, and buffers it until the foreground images, the background region images, the speech data, and the 3D model data are all acquired. The foreground images, the background region images, the speech data, and the 3D model data are collectively denoted as shooting data below. The shooting data is given meta-information such as routing information, time-code information (time information), and camera identifier, and the data synchronization unit 2130 confirms the attributes of the data based on the meta-information. Thereby, the data synchronization unit 2130 determines the data at the same time, and confirms that all the data is acquired. This is because the data transferred from each camera adapter 120 via a network is not guaranteed in terms of the reception order of network packets, and needs to be buffered until the data required to generate a file is acquired. When the data is acquired, the data synchronization unit 2130 transmits the foreground images and the background region images to the image processing unit 2150, transmits the 3D model data to the 3D model combination unit 2160, and transmits the speech data to the shooting data file generation unit 2180.

The CAD data storage unit 2135 saves the 3D data indicating the stadium shape received from the control unit 2110 in the storage medium such as DRAM, HDD, or NAND memory. The CAD data storage unit 2135 then transmits the saved stadium shape data to the image combination unit 2170 when receiving a request for the stadium shape data.

The calibration unit 2140 performs a camera calibration operation, and transmits the camera parameters acquired by the calibration to the non-shooting data file generation unit 2185 described below. At the same time, the calibration unit 2140 holds the camera parameters in its own storage region, and provides the 3D model combination unit 2160 described below with the camera parameter information.

The image processing unit 2150 adjusts the colors and the luminance values among the cameras for the foreground images and the background region images, and performs a development processing and a camera lens distortion correction processing when it has RAW image data input. Then, the image-processed foreground images are transmitted to the shooting data file generation unit 2180, and the background region images are transmitted to the image combination unit 2170.

The 3D model combination unit 2160 combines the 3D model data at the same time acquired from the camera adapters 120 by use of the camera parameters generated by the calibration unit 2140. For example, the 3D model data of the foreground images in the entire stadium is generated in a method called Visual Hull. The generated 3D model is transmitted to the shooting data file generation unit 2180.

The transmission region storage unit 2200 reads transmission region information from the transmission region information storage unit 402 in the database 250 and stores the transmission region information.

The image combination unit 2170 acquires the background region images from the image processing unit 2150, and acquires related transmission region information from the transmission region storage unit 2200. The image combination unit 2170 further acquires the 3D shape data of the stadium (stadium shape data) as background structure information from the CAD data storage unit 2135, and specifies the positions of the background region images relative to the coordinates of the acquired 3D shape data of the stadium. When the position of each of the background region images can be specified relative to the coordinates of the 3D shape data of the stadium, the background region images are combined into one background image based on the transmission region information. The 3D shape data of the background image may be created by the back-end server 270.

The shooting data file generation unit 2180 acquires the speech data from the data synchronization unit 2130, the foreground image from the image processing unit 2150, the 3D model data from the 3D model combination unit 2160, and the background image combined into the 3D shape from the image combination unit 2170. The shooting data file generation unit 2180 then outputs the acquired data to the DB access control unit 2190. Here, the shooting data file generation unit 2180 associates and outputs the data based on the respective items of time information. Part of the data may be associated and output. For example, the shooting data file generation unit 2180 associates and outputs the foreground image and the background image based on the time information of the foreground image and the time information of the background image. Further, for example, the shooting data file generation unit 2180 associates and outputs the foreground image, the background image, and the 3D model data as shooting data based on the time information of the foreground image, the time information of the background image, and the time information of the 3D model data.

The non-shooting data file generation unit 2185 acquires the camera parameters from the calibration unit 2140 and acquires the 3D shape data of the stadium from the control unit 2110, and adjusts the camera parameters and the 3D shape data depending on a file format and transmits the adjusted ones to the DB access control unit 2190.

The DB access control unit 2190 is connected to the database 250 to make faster communication by InfiniBand or the like. The DB access control unit 2190 transmits the files received from the shooting data file generation unit 2180 and the non-shooting data file generation unit 2185 to the database 250. According to the present embodiment, the shooting data associated based on the time information by the shooting data file generation unit 2180 is output to the database 250 as a storage device connected to the front-end server 230 via a network via the DB access control unit 2190. An output destination of the associated shooting data is not limited thereto. For example, the front-end server 230 may output the shooting data associated based on the time information to the back-end server 270 as an image generation apparatus connected to the front-end server 230 via a network and directed for generating a virtual viewpoint image. Further, the front-end server 230 may output the shooting data to both the database 250 and the back-end server 270.

<Description of Transmission Region Calculation Unit 401>

Figure 5:
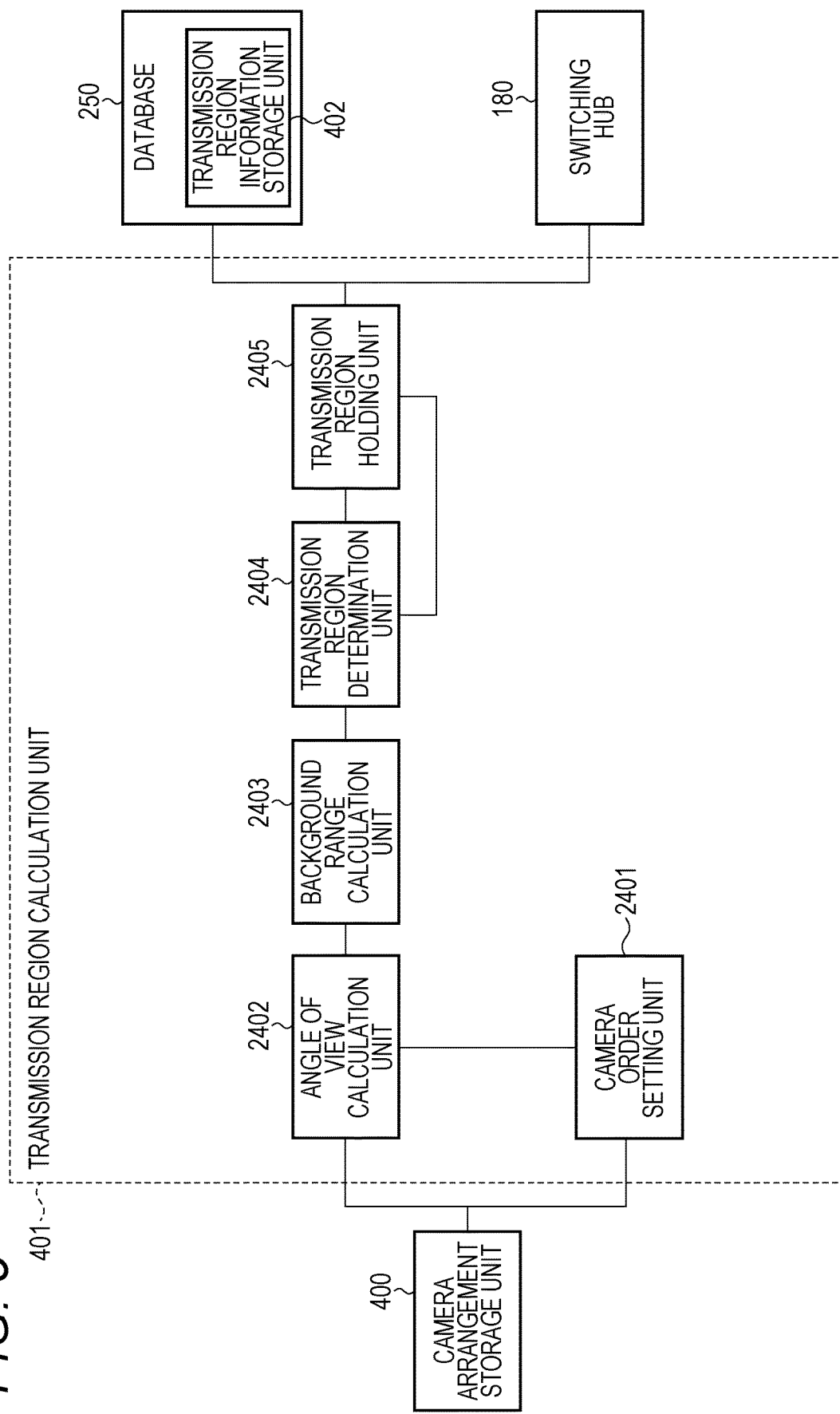
FIG. 5 is a functional block diagram of a transmission region calculation unit.

FIG. 5 is a block diagram for explaining a functional configuration of the transmission region calculation unit 401. The transmission region calculation unit 401 includes a camera order setting unit 2401, an angle of view calculation unit 2402, a background range calculation unit 2403, a transmission region determination unit 2404, and a transmission region holding unit 2405.

The camera order setting unit 2401 acquires arrangement information of each camera 112 from the camera arrangement storage unit 400. The camera order setting unit 2401 selects the closest camera to the switching hub 180 based on the camera arrangement information of each camera 112, and sets it as a camera which first transmits a background region image. A transmission region to be transmitted of the background image of the camera is determined in the order of daisy chain connection as described below. Selection of a camera which first transmits a background region image is not limited thereto, and the closest camera to the center of the front stand of the stadium may be selected, and any uniquely-determined camera may be employed.

The angle of view calculation unit 2402 acquires the camera arrangement information of each camera 112 from the camera arrangement storage unit 400, and calculates the angle of view based on the orientation and the focal length of the camera which determines a transmission region.

The background range calculation unit 2403 calculates a range shot as a background image (denoted as background range below) based on the calculated angle of view. The background range matches with the shooting range shot by each camera 112.

The transmission region determination unit 2404 reads a transmission region earlier transmitted than the camera from the transmission region holding unit 2405 described below, and detects an overlap with the background range of the camera. The background range with the overlap excluded is determined as a transmission region of the camera.

The transmission region holding unit 2405 holds the determined transmission region per camera 112. The transmission region holding unit 2405 sends the transmission region information indicating the determined transmission region to the camera adapters 120 via the transmission region information storage unit 402 and the switching hub 180.

The operation procedures will be described below with reference to FIG. 6 to FIG. 10.

Figure 6:
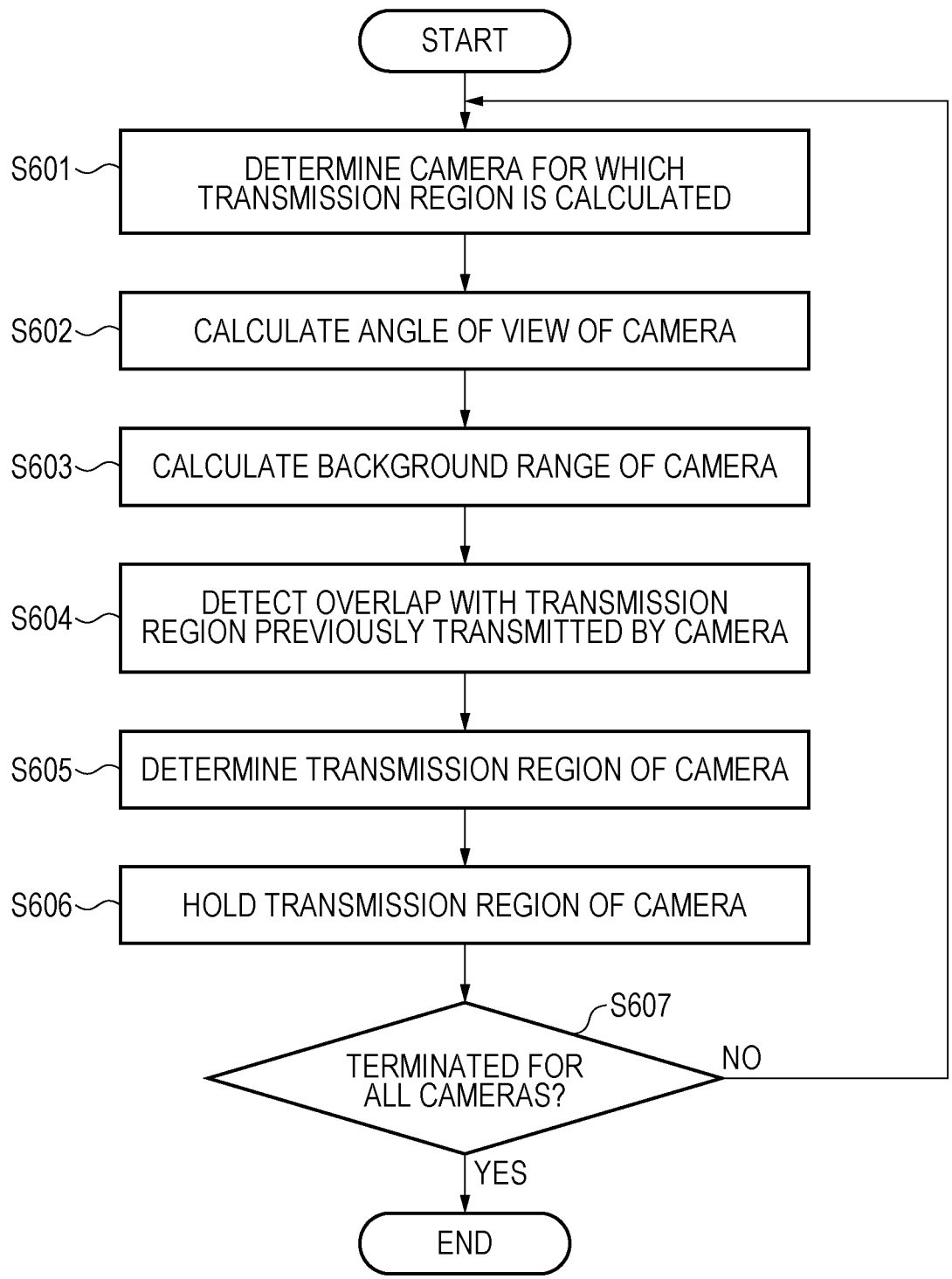
FIG. 6 is a flowchart for explaining how to determine a transmission region.

FIG. 6 is a flowchart illustrating the determination method. Unless particularly stated, the processings described below are realized under control of the controller 300. That is, the controller 300 controls the other devices (such as the front-end server 230 and the database 250) in the image processing systems 100 thereby to realize the control.

Figure 7:
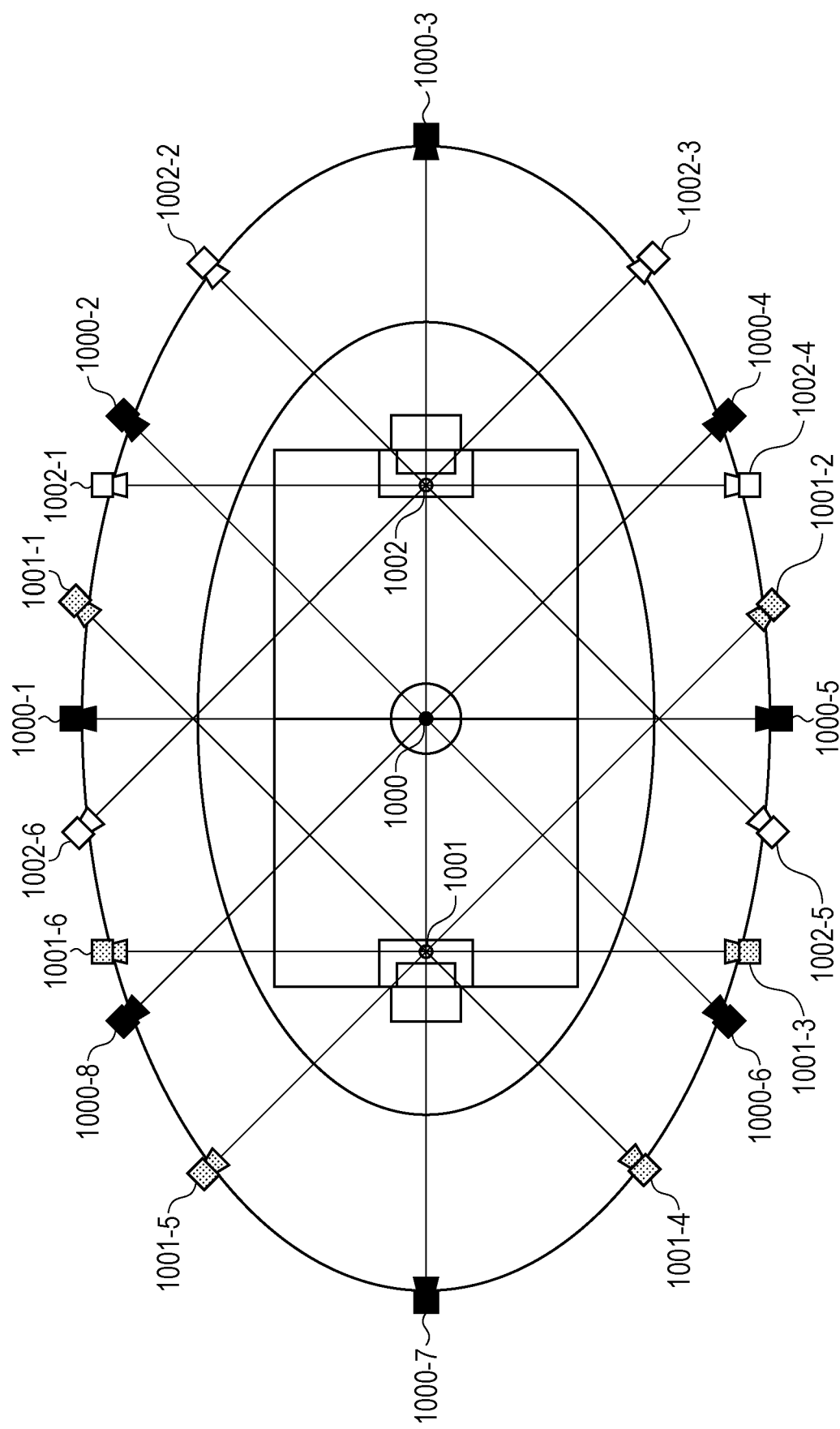
FIG. 7 is a diagram illustrating an exemplary arrangement of sensor systems.
Figure 8:
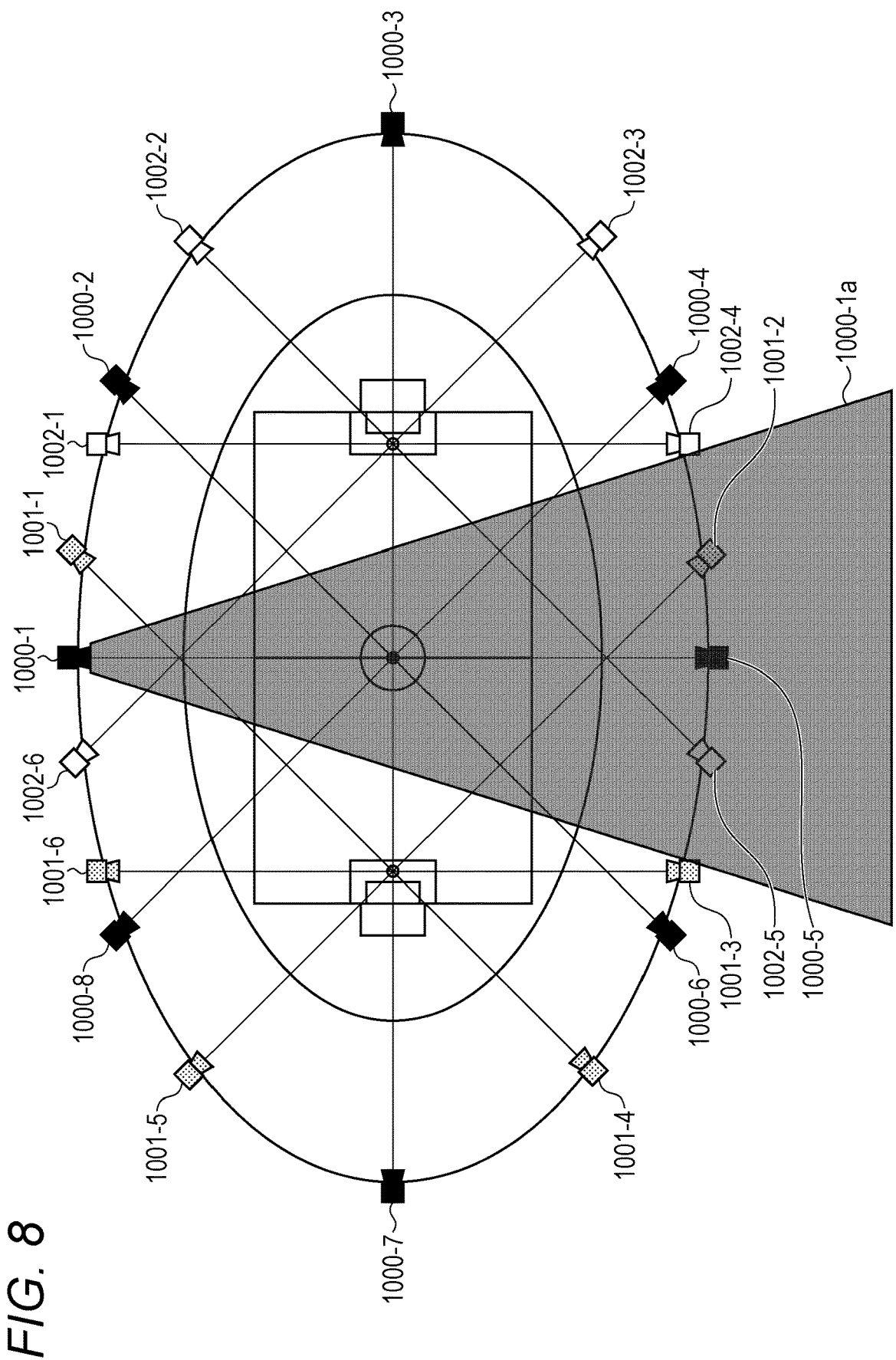
FIG. 8 is a diagram illustrating a calculation procedure of determining a camera transmission region.
Figure 9:
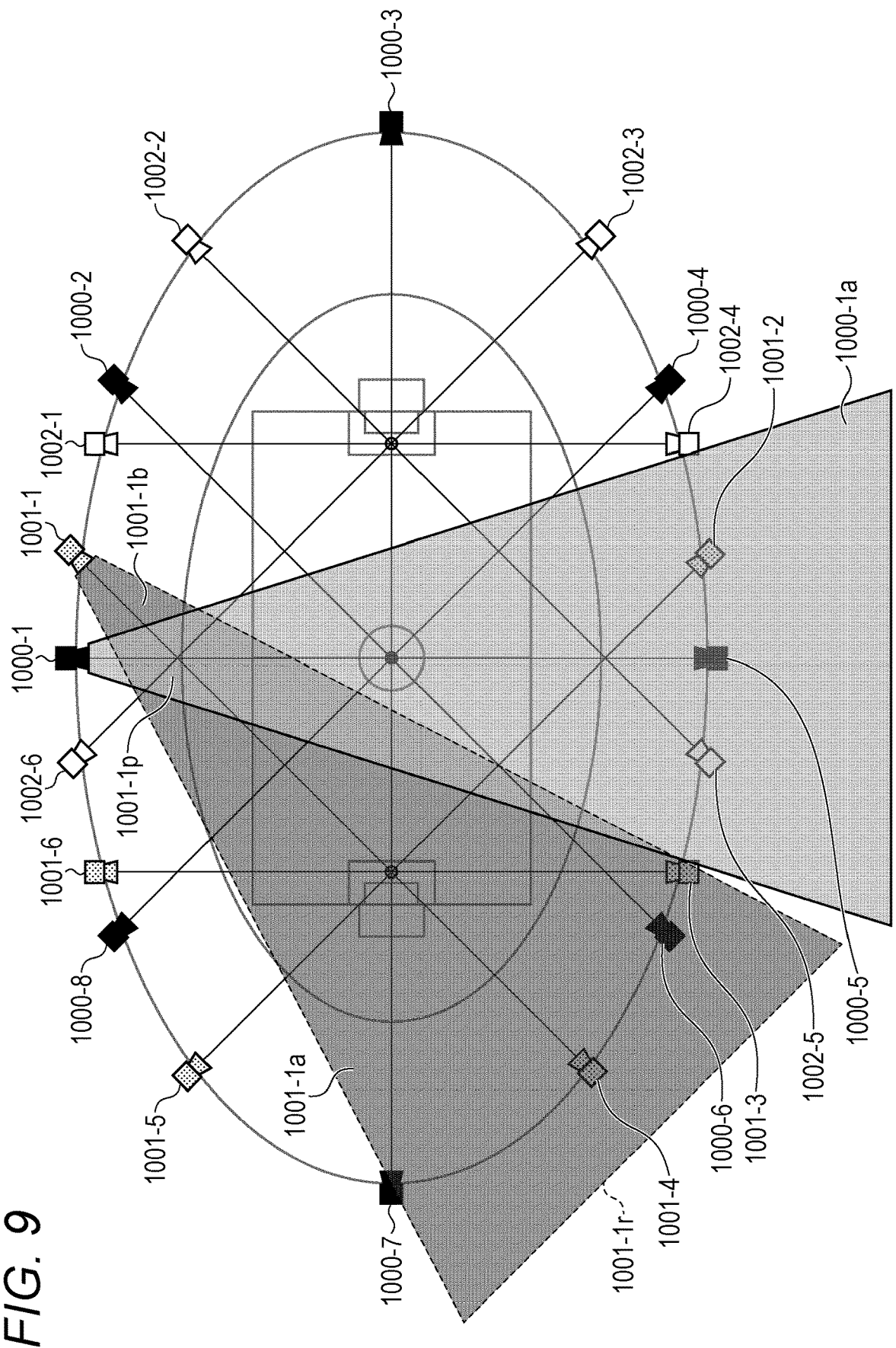
FIG. 9 is a diagram illustrating the calculation procedure of determining a camera transmission region.
Figure 10:
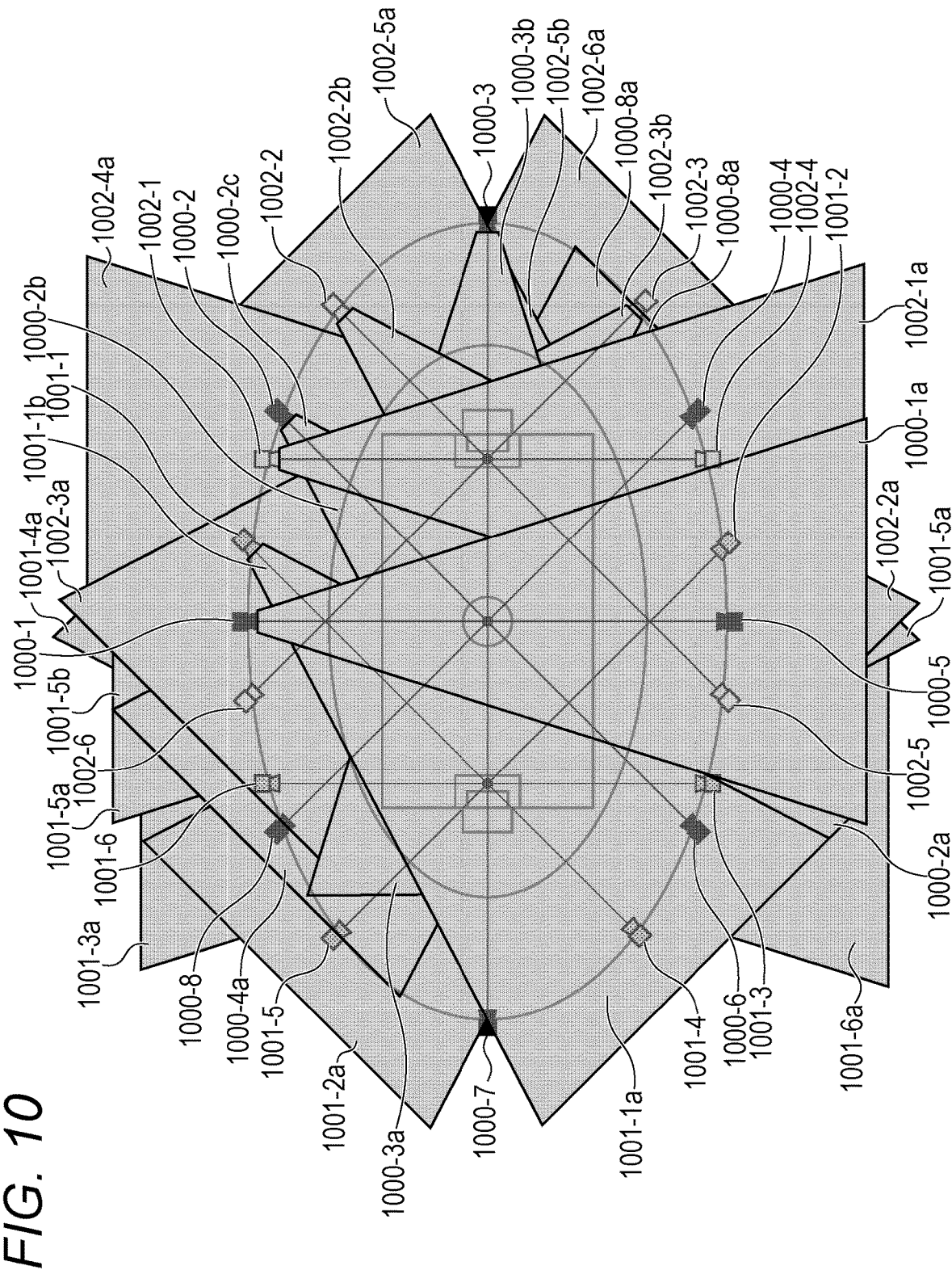
FIG. 10 is a diagram illustrating the calculation procedure of determining a camera transmission region.

FIG. 7 is a diagram illustrating an exemplary arrangement of the sensor systems, and FIGS. 8 to 10 are diagrams illustrating a calculation procedure of determining a transmission region of the camera in the sensor system of FIG. 7. In FIGS. 7 to 10, the cameras 112 (which may be denoted as cameras 1000-1 to 1002-6 below) in the sensor systems 1000-1 to 1002-6 are arranged to surround a stadium. The cameras 1000-1 to 1000-8 shoot a point of gaze 1000. Similarly, the cameras 1001 and 1002 shoot the points of gaze 1001 and 1002, respectively. The respective sensor systems are assumed to be in cascade connection. The clockwise-arranged sensor systems 1000-1, 1001-1, 1002-1, . . . , and 1002-6 correspond to the sensor systems 110*a*, 110*b*, 110*c*, . . . , and 110*t* of FIG. 1, for example, and are connected to the switching hub 180. In order to simplify the description of the present embodiment, all the cameras are set at the same height, and the lenses thereof are set at the same focal length.

Returning to FIG. 6, in step S601, the camera order setting unit 2401 selects a camera for which a transmission region is determined from the arranged sensor systems. For example, the camera 1000-1 of FIG. 7 is first selected. Further, the transmission region held in the transmission region holding unit 2405 is first empty.

In step S602, the angle of view calculation unit 2402 calculates the angle of view from the focal length of the camera 112 or the like. For example, the horizontal angle of view is 29 degrees and the vertical angle of view is 19 degrees and thirty arcminutes at a focal length of 70 mm.

In step S603, the background range calculation unit 2403 calculates the background range of the camera 112 based on the position and the orientation of the camera 112, and the angle of view calculated by the angle of view calculation unit 2402. A region 1000-1a of the camera 1001-1 is calculated in FIG. 8.

Returning to FIG. 6, in step S604, the transmission region determination unit 2404 detects an overlap between the region 1000-1a and an earlier-transmitted transmission region. In FIG. 8, the transmission region of the cameral 1000-1 is first determined, and the transmission region held in the transmission region holding unit 2405 is empty as described above, and thus an overlap with the region 1000-1a is not detected.

Returning to FIG. 6, in step S605, the transmission region determination unit 2404 removes the overlap detected in step S604 from the background range thereby to determine the transmission region. An overlap is not detected for the camera 1000-1 as described above, and the entire region 1000-1a is determined as a transmission region.

In step S606, the transmission region holding unit 2405 holds the transmission region determined in step S605.

In step S607, the camera order setting unit 2401 determines whether the transmission regions of all the cameras are determined. When the transmission regions of all the cameras are determined (YES in step S607), the present processing terminates. Otherwise (NO in step S607), the processing returns to step S601, where a transmission region of a next camera is determined in the transmission order. Here, a transmission region of the camera 1001-1 on the right of the camera 1000-1 is determined.

Returning to step S601, the camera order setting unit 2401 selects the camera 1001-1. In step S602 and step S603, the background range of the camera is calculated. FIG. 9 illustrates the calculation. A region 1001-1r (indicated in a dotted line) shot by the camera 1001-1 is calculated.

In step S604, the transmission region determination unit 2404 detects an overlap between the region 1001-1r and an earlier-transmitted transmission region. Here, an overlap with the region 1000-1a is detected. A region 1001-1p corresponds to the overlap in FIG. 9.

Returning to FIG. 6, in step S605, the transmission region determination unit 2404 removes the overlap from the background range thereby to determine the transmission region. Here, a region 1001-1a and a region 1001-1b, for which the region 1001-1p is removed from the region 1001-1r, are determined as the transmission regions of the camera 1001-1.

In step S606, the transmission region holding unit 2405 holds the newly-determined transmission regions. That is, the transmission region holding unit 2405 holds the newly-determined regions 1001-1a, 1001-1b, and the already-stored region 1000-1a.

In step S607, the camera order setting unit 2401 determines whether the transmission regions of all the cameras are determined. When all the transmission regions are not determined (NO in step S607), step S601 to step S606 are repeatedly performed. In this case, the camera 1002-1 is next selected. FIG. 10 illustrates the transmission regions held in the transmission region holding unit 2405 as a result of the processings for the camera 1001-1 to the camera 1002-6. The transmission regions are determined in this way such that the background ranges to be transmitted of the respective cameras do not overlap. The transmission region calculation unit 401 notifies the camera adapter 120 in each sensor system of the transmission region information on the transmission regions via the switching hub 180 such that the background region images are generated by the transmission regions.

Figure 11:
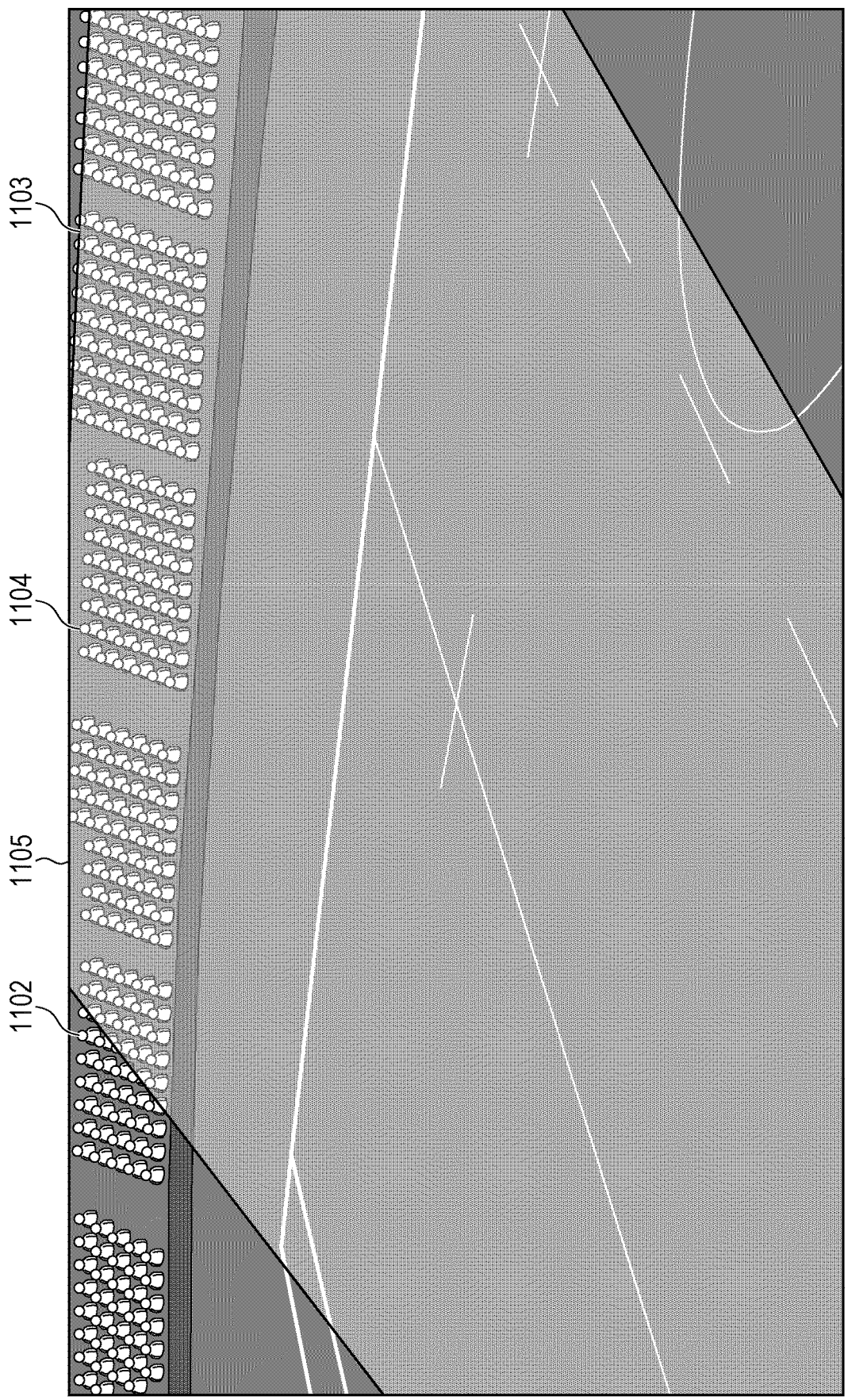
FIG. 11 is a diagram illustrating a background image.

FIG. 11 is a diagram illustrating a background image. In FIG. 11, a background image 1105 is configured in which a background region image made of an image 1104 is combined with a background region image made of images 1102 and 1103. The background region image made of the image 1104 corresponds to the transmission region determined for the camera 112a in the background image of the camera 112a, for example. The background region image made of the images 1102 and 1103 corresponds to the transmission region determined for the camera 112b in the background image of the camera 112b, for example.

The transmission region information is input into each camera from the transmission region calculation unit 401. The transmission region information is the number of transmission regions as well as the shapes and positions of the respective transmission regions, for example. The shape of a transmission region is realized by setting the circumscribed rectangle and assuming a binary image with the inside of 1 and the outside of 0 relative to the size of the circumscribed rectangle. The position of a transmission region may be expressed as the upper left coordinate of the circumscribed rectangle. The transmission region information is not limited thereto, and a contour can be expressed in chain coding or the like. The background region images are generated based on the transmission region information.

<Hardware Configuration>

A hardware configuration of each device configuring the present embodiment will be described below.

Figure 12:
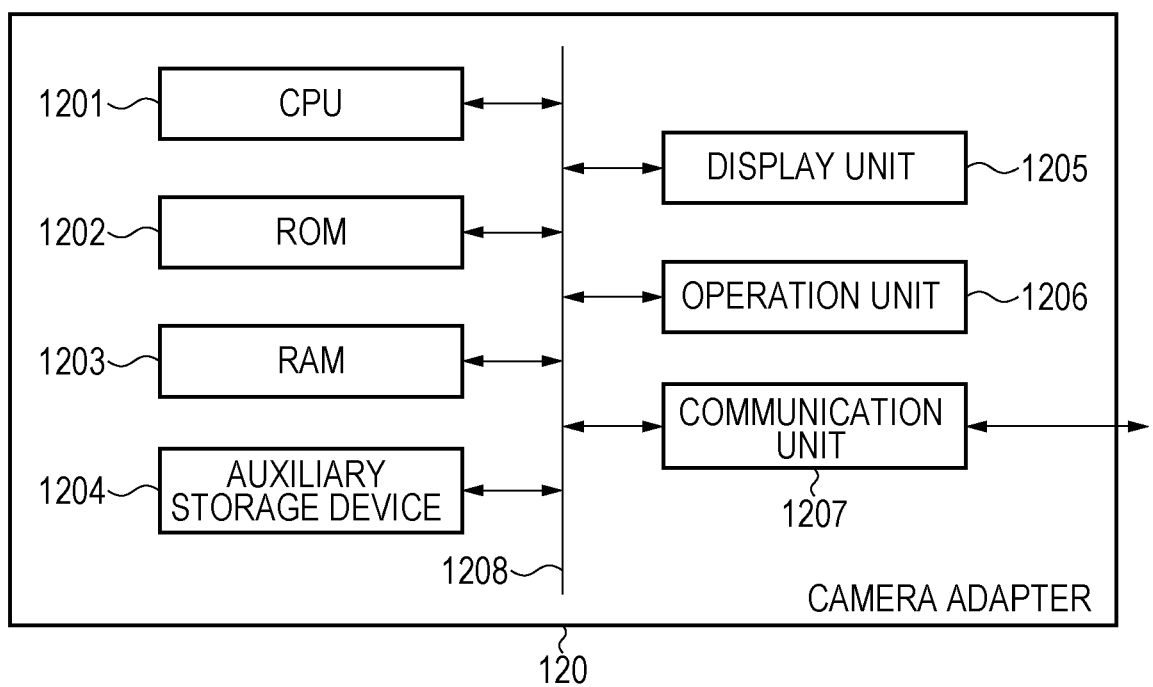
FIG. 12 is a block diagram illustrating a hardware configuration of the camera adapter.

FIG. 12 is a block diagram illustrating a hardware configuration of the camera adapter 120.

The camera adapter 120 includes a CPU 1201, a ROM 1202, a RAM 1203, an auxiliary storage device 1204, a display unit 1205, an operation unit 1206, a communication unit 1207, and a bus 1208.

The CPU 1201 controls the entire camera adapter 120 by use of the computer programs or data stored in the ROM 1202 or the RAM 1203. The ROM 1202 stores the programs or parameters which does not need to be changed. The RAM 1203 temporarily stores the programs or data supplied from the auxiliary storage device 1204, or the data supplied from the outside via the communication unit 1207. The auxiliary storage device 1204 is configured of a hard disc drive or the like, for example, and stores content data such as still images or moving pictures.

The display unit 1205 is configured of a liquid crystal display or the like, for example, and displays a graphical user interface (GUI) or the like by which the user operates the camera adapter 120. The operation unit 1206 is configured of a keyboard, a mouse, or the like, for example, and inputs various instructions in the CPU 1201 in response to user's operation. The communication unit 1207 makes communication with an external device such as the camera 112 or the front-end server 230. The bus 1208 connects the respective units in the camera adapter 120 to transmit information.

The devices such as the front-end server 230, the database 250, the back-end server 270, the control station 310, the virtual camera operation UI 330, and the end-user terminal 190 may have the hardware configuration of FIG. 12. The functions of each device described above may be realized in the software processings by use of the CPU or the like.

With the configuration and the operations (image transmission) described above, an overlap in a background range is removed and the amount of image information to be transmitted is reduced in transmitting images from a plurality of cameras, thereby transmitting high-definition images at an inexpensive network.

The present embodiment has been described assuming that the transmission region information storage unit 402 is installed in the database 250, but is not limited thereto. For example, the transmission region information storage unit 402 may be an independent storage unit, or may be inside the control station 310 or the transmission region calculation unit 401.

Further, the present embodiment has been described mainly assuming that the image processing system 100 is installed in a facility such as stadium or concert hall. Other exemplary facilities are amusement park, park, racetrack, bicycle racetrack, casino, swimming pool, skating rink, ski area, club, and the like. The events in various facilities may be performed indoors or outdoors. The facilities according to the present embodiment include fixed-term facilities.

<Variant>

A transmission region determination processing will be described below as a variant of the first embodiment. Here, a transmission region is determined by use of 3D shape data (stadium shape data) of a stadium to be shot.

Figure 13:
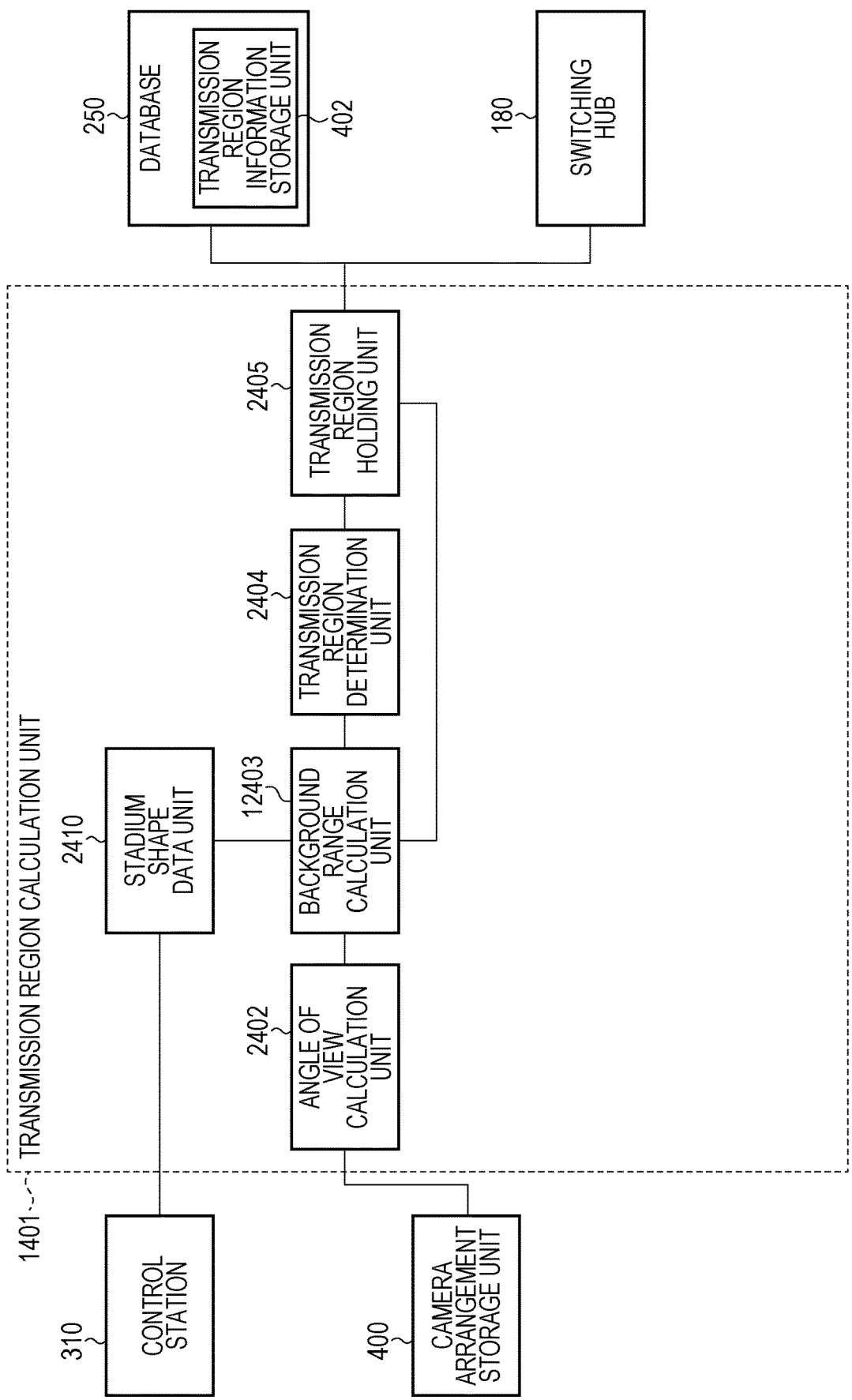
FIG. 13 is a functional block diagram of a transmission region calculation unit.

FIG. 13 is a functional block diagram of the transmission region calculation unit 1401 according to the present variant. In FIG. 13, the blocks having the same functions as in FIG. 5 are denoted with the same reference numerals, and the description thereof will be omitted. The transmission region calculation unit 1401 includes the angle of view calculation unit 2402, a background range calculation unit 12403, the transmission region determination unit 2404, the transmission region holding unit 2405, and a stadium shape data unit 2410.

The stadium shape data unit 2410 acquires and stores stadium CAD data (stadium shape data) from the control station 310. The background range calculation unit 12403 calculates a background range shot as a background image based on the angle of view calculated by the angle of view calculation unit 2402 and the stadium shape data from the stadium shape data unit 2410.

Figure 14:
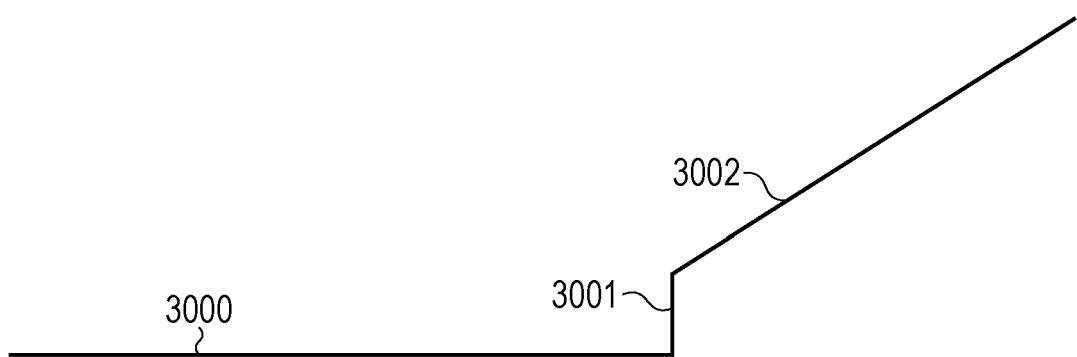
FIG. 14 is a diagram schematically illustrating a structure of a stadium.

FIG. 14 is a diagram schematically illustrating a configuration of a stadium. A wall 3001 is present between a field 3000 and seats 3002. Thus, a background range acquired from a camera is not trapezoidal, and changes in its shape due to an angle of the seats.

Figure 15:
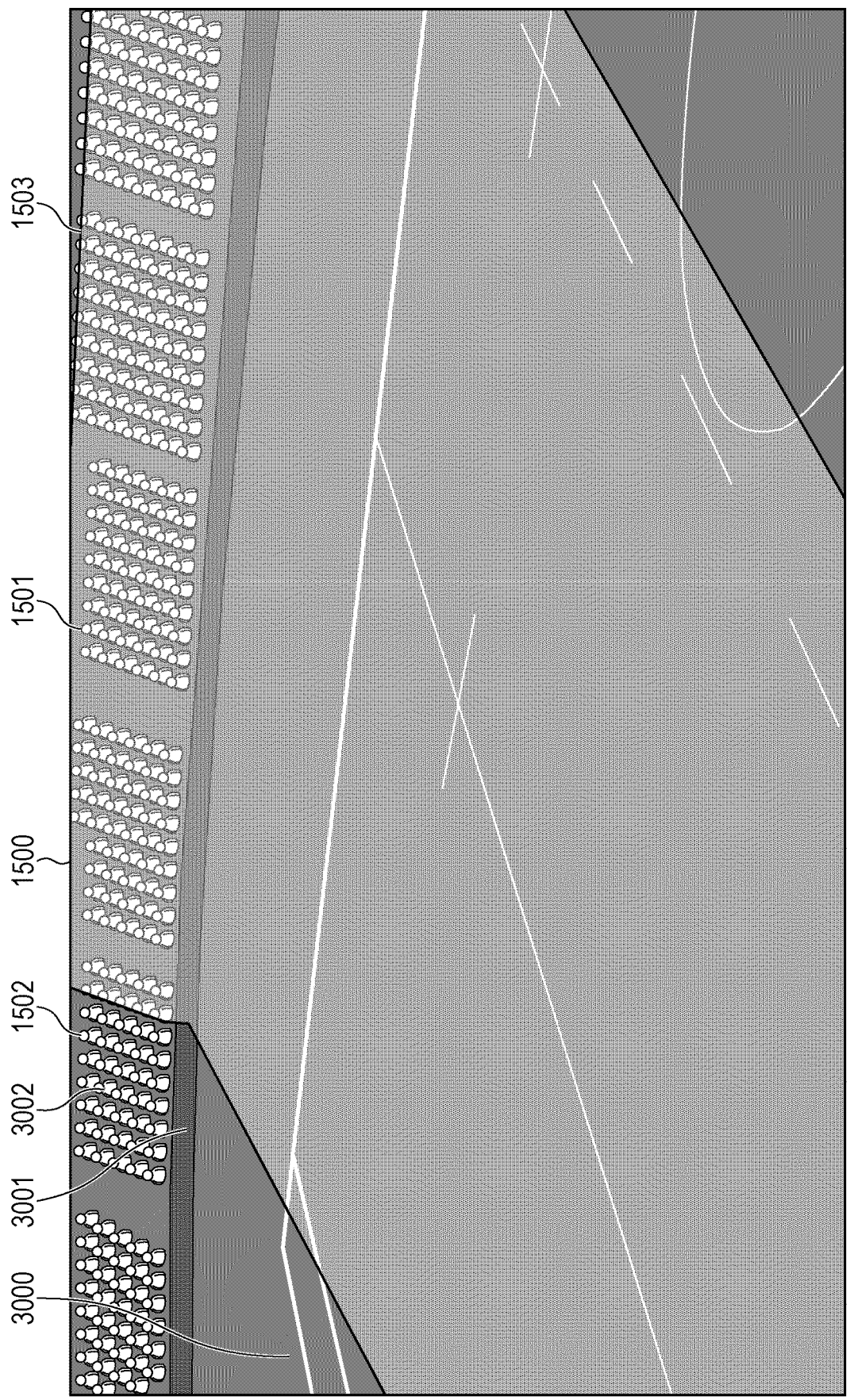
FIG. 15 is a diagram illustrating a background image.

FIG. 15 is a diagram illustrating a background image. In FIG. 15, a background image 1500 is configured of a background region image made of an image 1501 and a background region image made of images 1502 and 1503. The wall 3001 and the seats 3002 are different in tilt from the field 3000, and thus the image 1502 is different in its shape from the image 1102 of FIG. 11.

Figure 16:
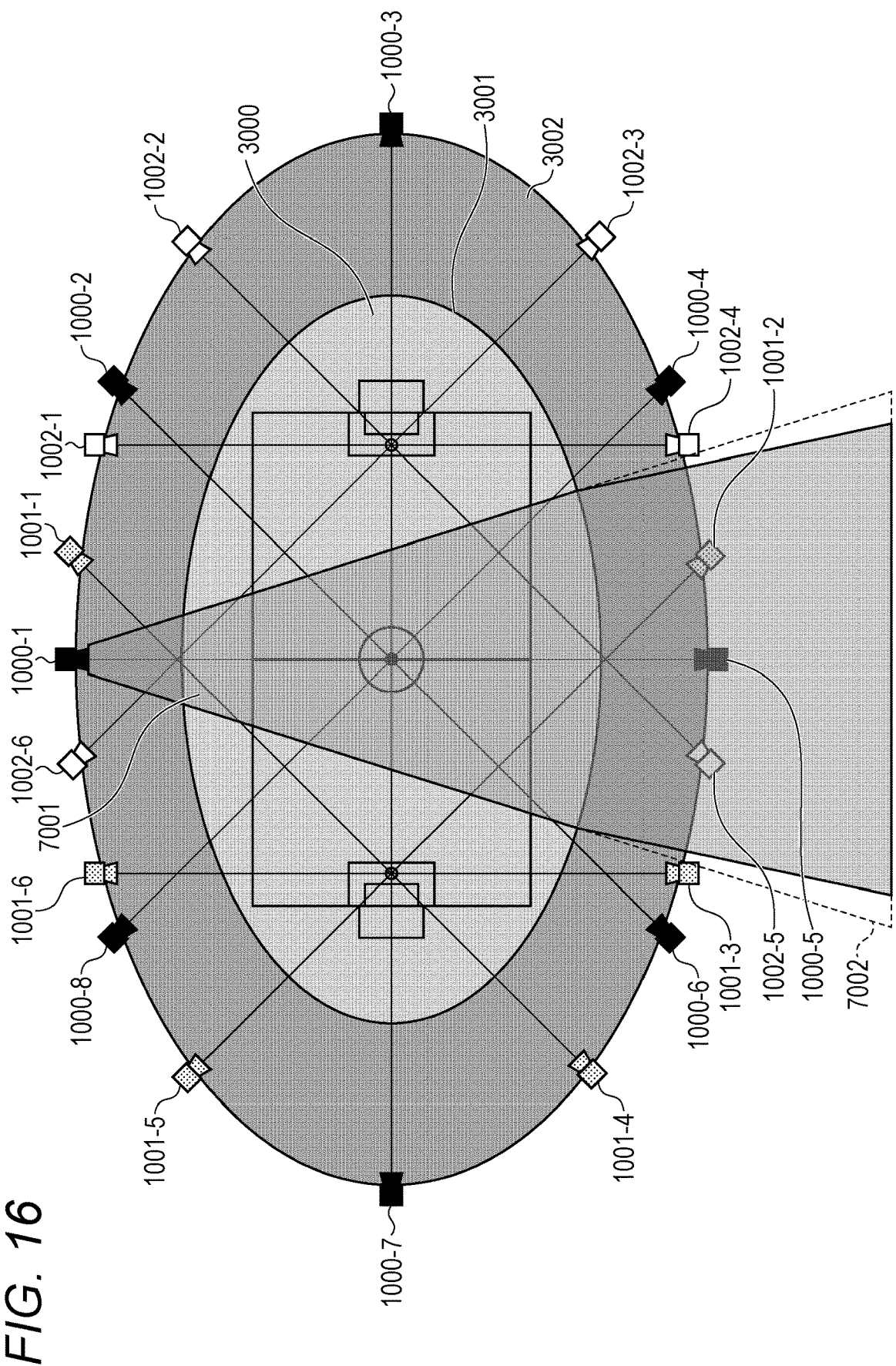
FIG. 16 is a diagram illustrating a background range.

FIG. 16 is a diagram illustrating a background range. When the stadium shape data is not considered, the background range is a region 7002 in a dotted line, but when the stadium shape data is considered, the background range is a region 7001.

When a transmission region is calculated not in consideration of the stadium shape data in this way, a double-transmitted part is caused in order to compensate for the difference between the region 7001 and the region 7002. However, the overlapping part can be prevented in consideration of the stadium shape.

With the configuration and the operations described above, the 3D shape data of the stadium is used in association with a point of gaze in transmitting a background image, thereby more accurately determining a transmission region and further reducing the amount of data during transmission.

Second Embodiment

Figure 17:
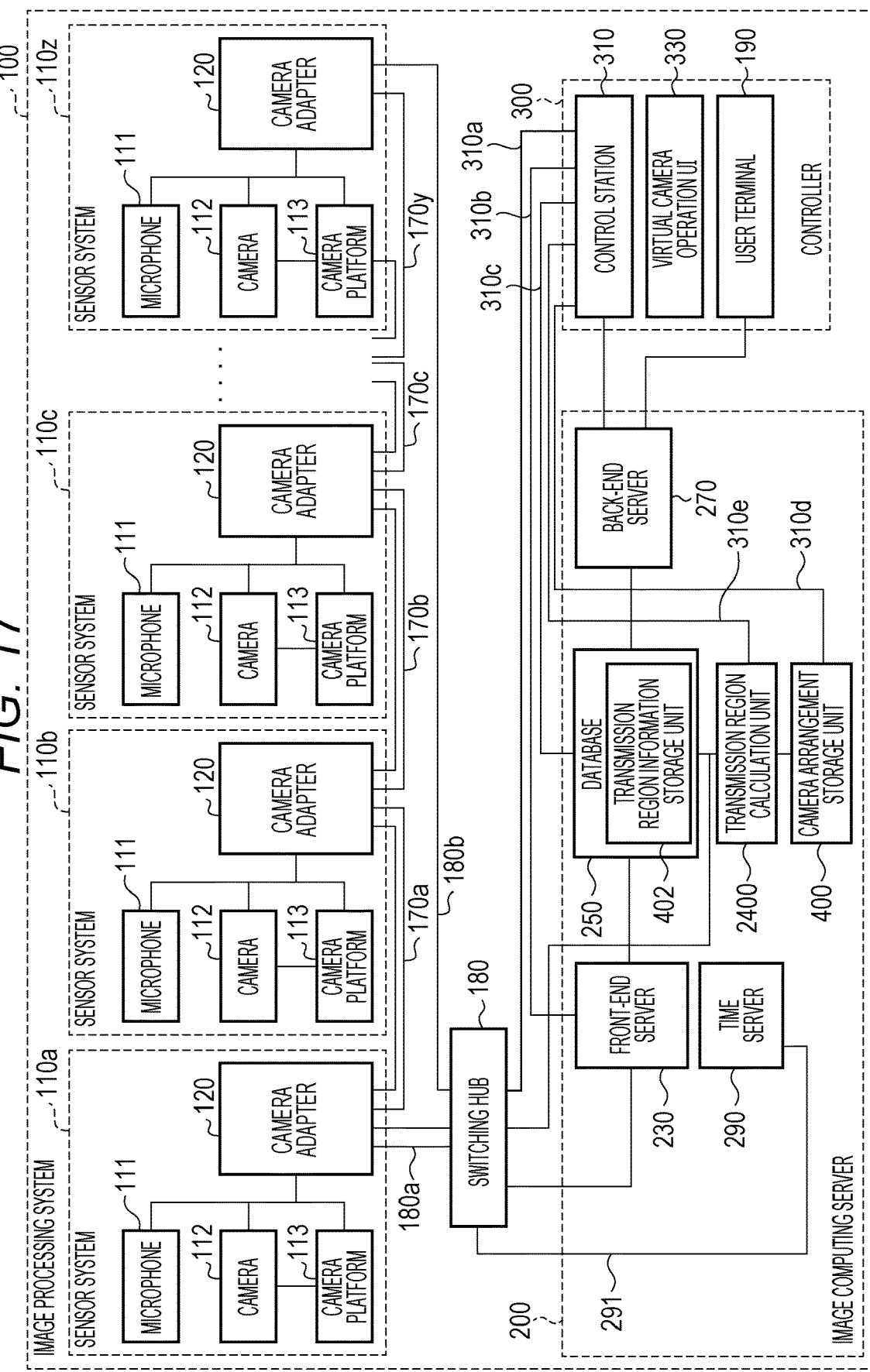
FIG. 17 is a configuration diagram of the image processing system.

FIG. 17 is a configuration diagram of the image processing system 100 according to a second embodiment. In FIG. 17, the blocks having the same functions as in FIG. 1 are denoted with the same reference numerals, and the description thereof will be omitted. The transmission region calculation unit 2400 according to the present embodiment is different from that according to the first embodiment in that it is connected to the control station 310 via the network 310e and receives a designated virtual viewpoint from the virtual camera operation UI 330.

Figure 18:
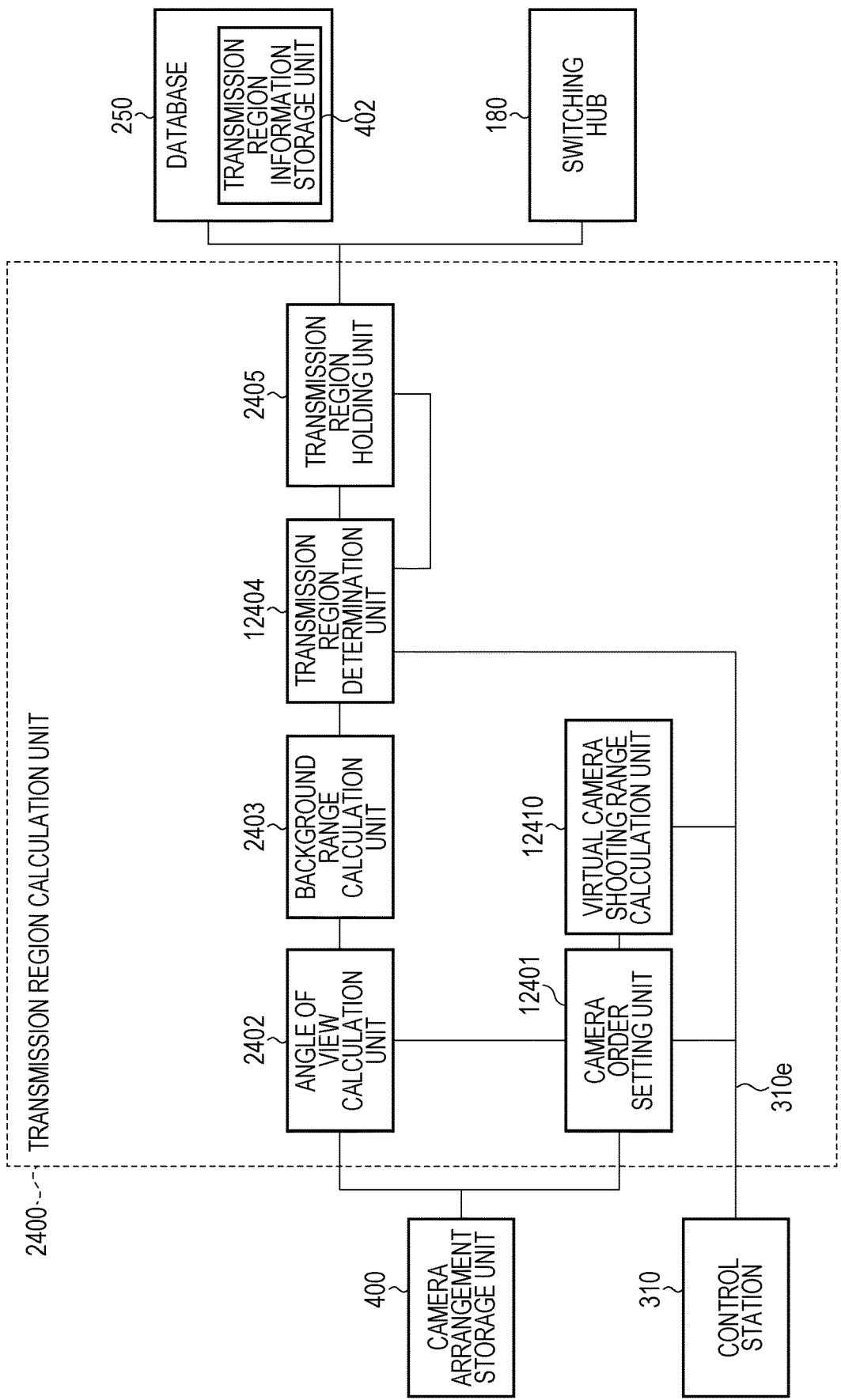
FIG. 18 is a functional block diagram of a transmission region calculation unit.

FIG. 18 is a functional block diagram of the transmission region calculation unit 2400. In FIG. 18, the blocks having the same functions as in FIG. 5 are denoted with the same reference numerals, and the description thereof will be omitted.

A camera order setting unit 12401, a virtual camera shooting range calculation unit 12410, and a transmission region determination unit 12404 acquire the number of cameras (N: natural number) from the control station 310. The transmission region determination unit 12404 determines a transmission region of each camera based on a shooting range of a virtual camera (which may be denoted as virtual shooting range below) calculated by the virtual camera shooting range calculation unit 12410 described below.

The virtual camera shooting range calculation unit 12410 acquires the position, the direction, and the angle of view of the virtual camera from the control station 310. The shooting range of the virtual camera is then calculated.

The operations of the transmission region calculation unit 2400 will be described with reference to FIG. 19 to FIG. 24.

Figure 19:
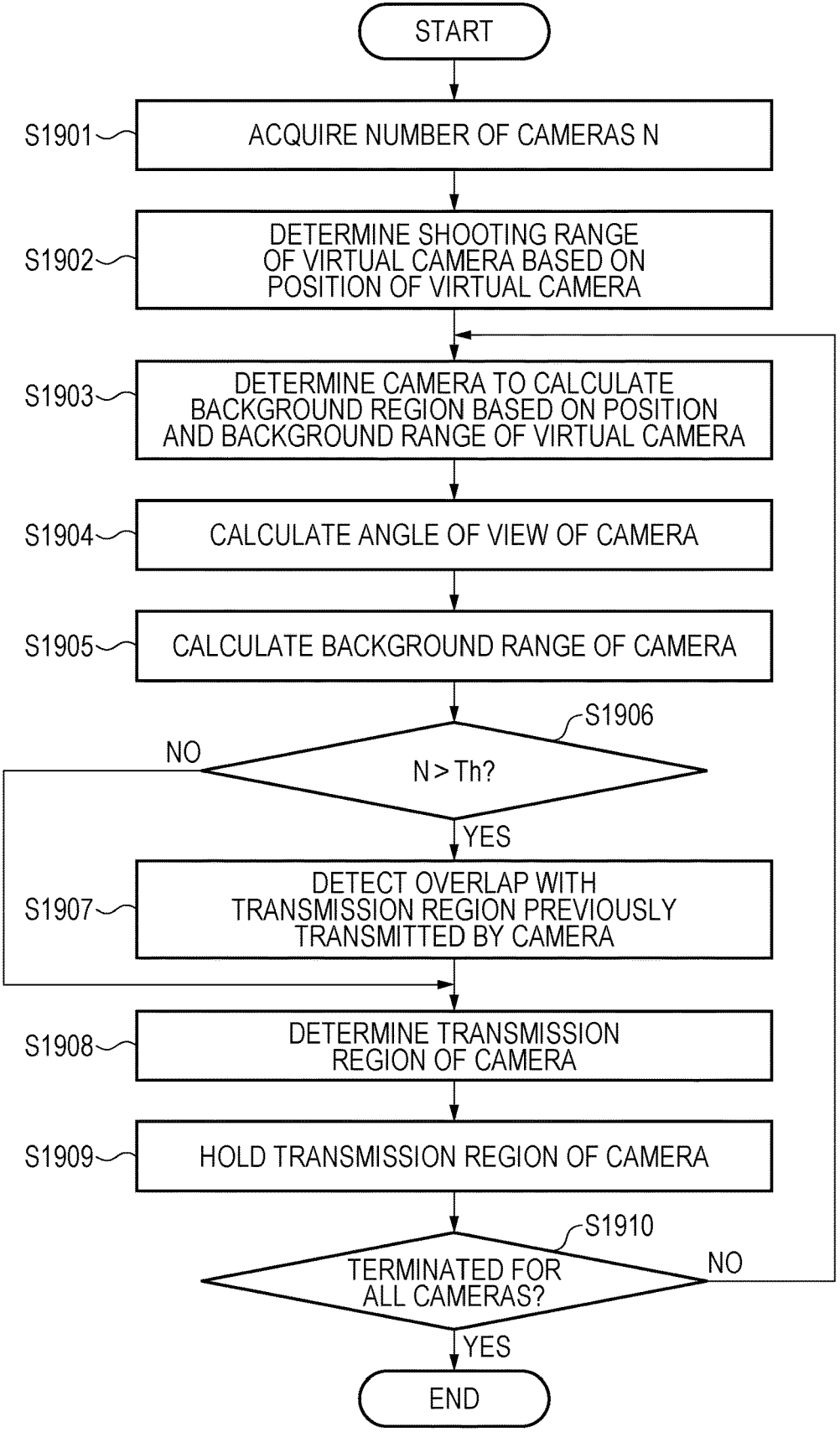
FIG. 19 is a flowchart for explaining how to determine a background region.

FIG. 19 is a flowchart illustrating the determination method by the transmission region calculation unit 2400. Unless particularly stated, the processings described below are realized under control of the controller 300. That is, the controller 300 controls the other devices (such as the front-end server 230 and the database 250) in the image processing system 100 thereby to realize the control.

Figure 20:
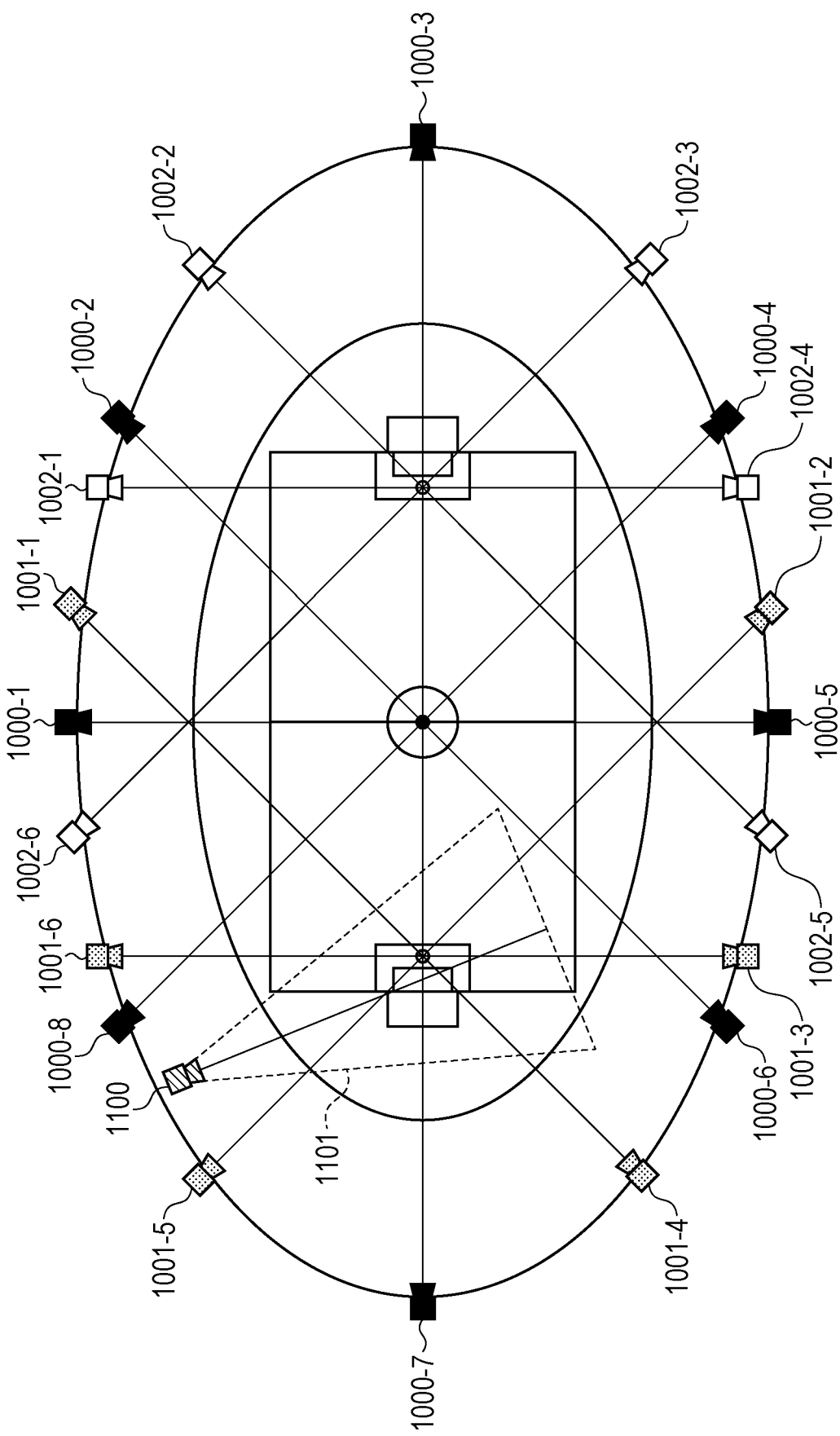
FIG. 20 is a diagram illustrating a shooting range of a virtual camera.

FIG. 20 is a diagram illustrating a shooting range of a virtual camera, and FIG. 21 to FIG. 24 are diagrams illustrating a calculation procedure of determining a transmission region in order to generate a virtual viewpoint image by a virtual camera 1100 in the sensor system of FIG. 20. The sensor system of FIG. 20 is similar to the sensor system of FIG. 7.

Returning to FIG. 19, in step S1901, the camera order setting unit 12401, the virtual camera shooting range calculation unit 12410, and the transmission region determination unit 12404 acquire the number of arranged cameras (N) from the control station 310.

In step S1902, the virtual camera shooting range calculation unit 12410 receives a designated viewpoint from the virtual camera operation UI 330. It sets the position, the direction, and the angle of view of the virtual camera based on the received viewpoint, and determines a virtual shooting range. With reference to FIG. 20, the virtual camera shooting range calculation unit 12410 calculates a virtual shooting range 1101 based on the position, the direction, and the angle of view of the virtual camera 1100. The virtual shooting range 1101 may be calculated by use of the 3D shape data.

Figure 21:
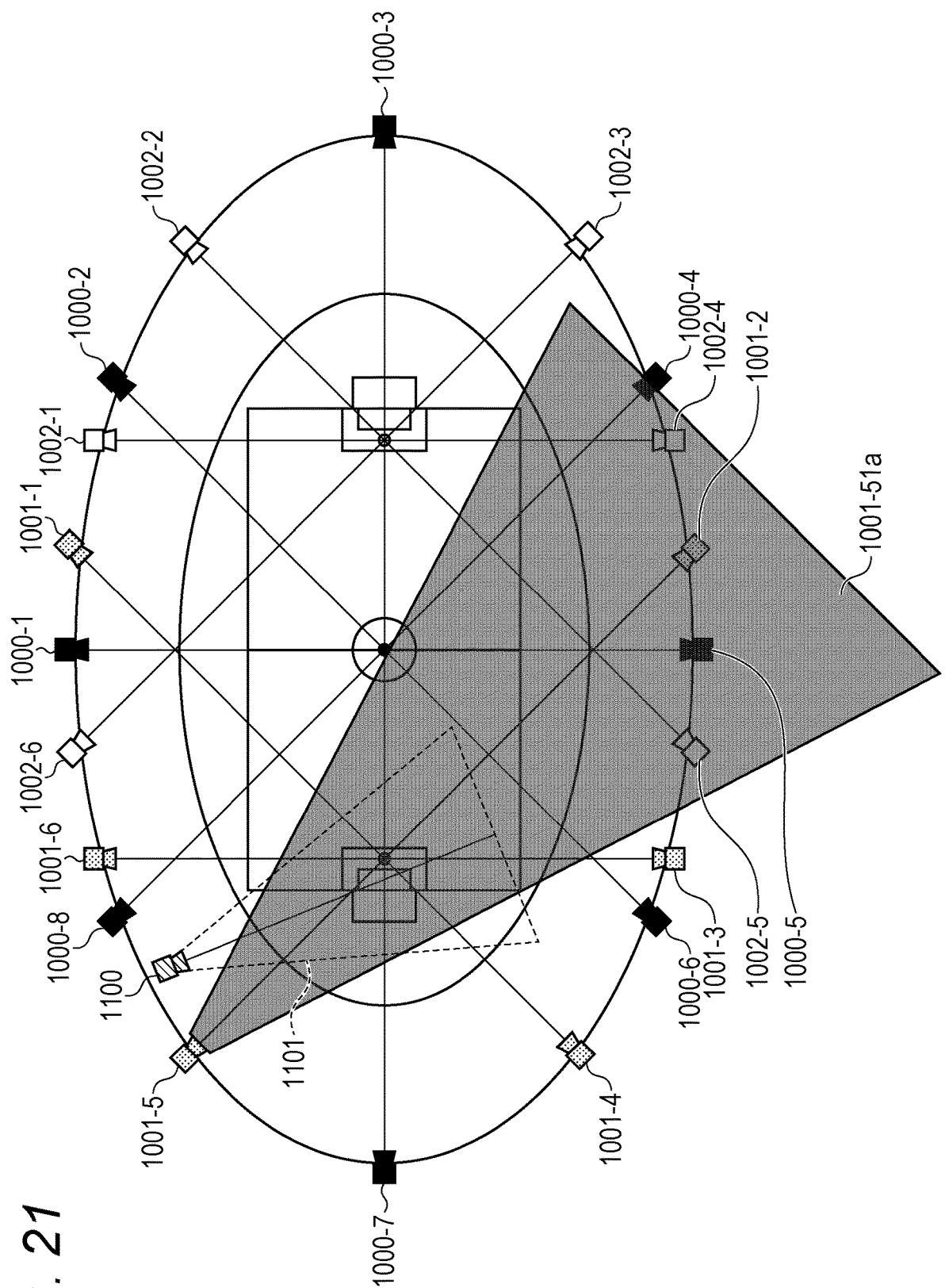
FIG. 21 is a diagram illustrating a calculation procedure of determining a transmission region for generating a virtual viewpoint image.

Returning to FIG. 19, in step S1903, the camera order setting unit 12401 selects the closest camera to the virtual camera among the cameras which cover the virtual shooting range (whose background ranges overlap). With reference to FIG. 21, the camera order setting unit 12401 selects a camera for which a transmission region is determined based on the position of the virtual camera 1100 and the arrangement information of each camera input from the camera arrangement storage unit 400. That is, the closest camera 1001-5 to the virtual camera 1100 is selected from among the cameras covering the virtual shooting range 1101.

Returning to FIG. 19, in step S1904, the angle of view calculation unit 2402 calculates the angle of view of the camera. Then in step S1905, the background range calculation unit 2403 calculates a background range.

In step S1906, the transmission region determination unit 12404 compares the number of cameras N with a threshold Th. When the number of cameras N is higher than the threshold Th (Yes in step S1906), the processing proceeds to step S1907. Otherwise (No in step S1906), the processing proceeds to step S1908. The threshold Th indicates the maximum number of cameras when the background ranges of the respective cameras are arranged not to overlap. When the number of cameras is equal to or lower than the threshold Th, the background ranges of the respective cameras do not overlap. Even if the background ranges of the respective cameras are arranged to overlap, the number of cameras may be assumed at the threshold Th when the transmission amount of the overlapping background ranges is the amount of data allowable in the system.

In step S1907, the transmission region determination unit 12404 detects an overlap between the calculated background range and an earlier-transmitted transmission region. In the case of FIG. 21, the transmission region of the camera in the sensor system 1001-5 is first determined, and an overlap is not detected in a region 1000-51a.

Returning to FIG. 19, in step S1908, the transmission region determination unit 12404 removes the overlap detected in step S1907 from the background range thereby to determine the transmission region. When the processing proceeds from step S1906 to step S1908, the entire background range is to be transmitted. In FIG. 21, an overlap with an earlier-transmitted transmission region is not detected for the first-selected camera 1001-5, and thus the entire region 1000-51a is determined as a transmission region.

Returning to FIG. 19, in step S1909, the transmission region holding unit 2405 holds the transmission region determined in step S1908.

Figure 22:
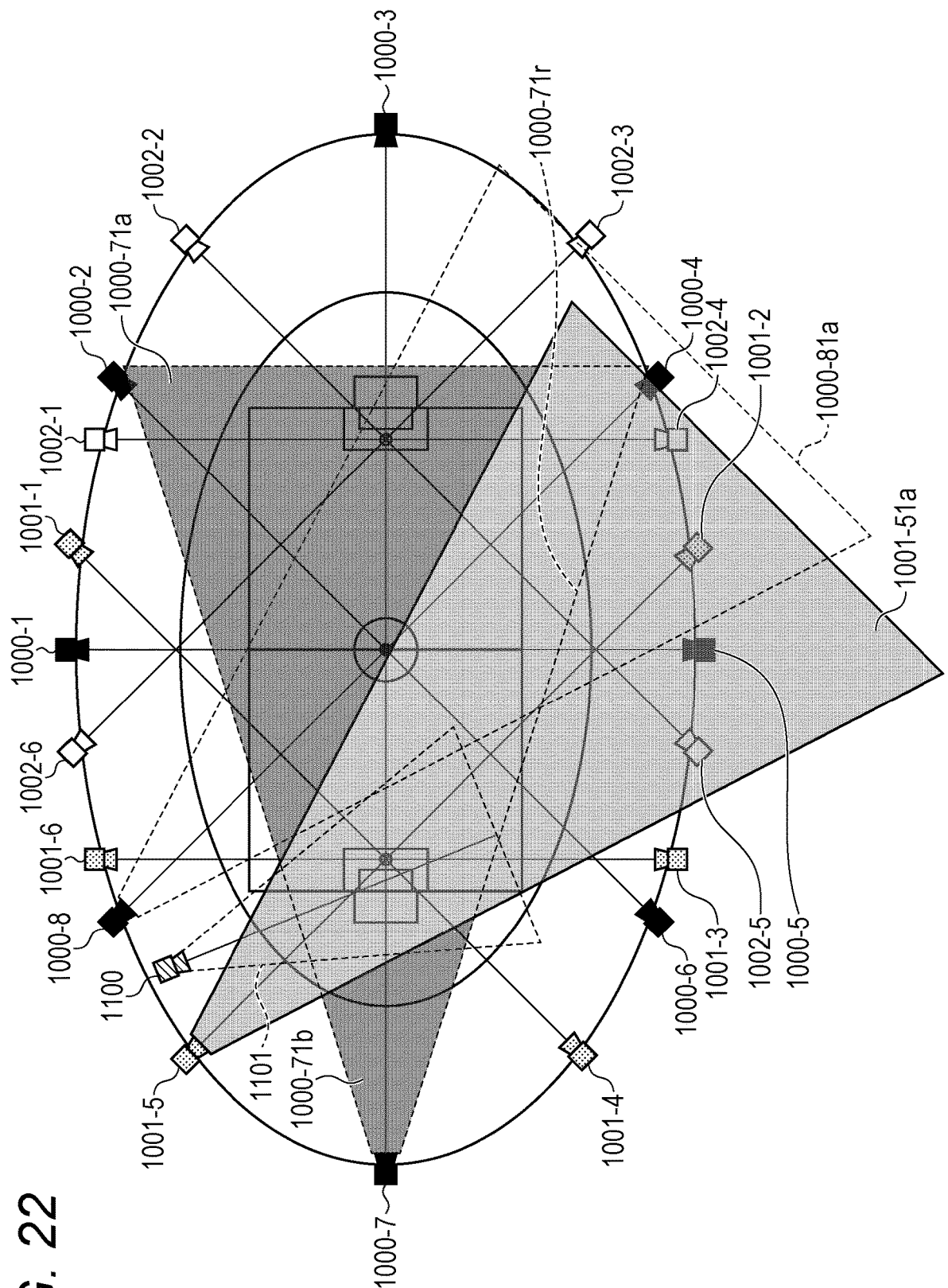
FIG. 22 is a diagram illustrating the calculation procedure of determining a transmission region for generating a virtual viewpoint image.

In step S1910, the camera order setting unit 12401 determines whether the transmission regions of all the cameras are determined. When the transmission regions of all the cameras are determined (YES in step S1910), the processing terminates. Otherwise (NO in step S1910), the processing returns to step S1903 to select a next camera. With reference to FIG. 22, the next closest camera to the virtual camera 1100 after the camera 1001-5 is the camera 1000-8. A part of a region 1000-81a of the camera overlapping with the virtual shooting range 1101 is already included in the region 1001-51a, and thus the camera 1000-8 is not selected at this time. The background range of the next closest camera 1000-7 to the virtual camera 1100 newly overlap with the virtual shooting range 1101, and thus the camera 1000-7 is selected.

Returning to FIG. 19, in steps S1904 and S1905, the angle of view and the background range of the camera 1000-7 are calculated.

In step S1906, the number of cameras N is compared with the threshold Th, and when the number of cameras N is higher than the threshold Th, the processing proceeds to step S1907, and otherwise, the processing proceeds to step S1908.

In step S1907, the transmission region determination unit 12404 detects an overlap between a region 1000-71r in a dotted line and an earlier-transmitted transmission region.

In step S1908, the transmission region determination unit 12404 removes the overlap from the background range thereby to determine the transmission region. Here, the region 1000-71a and the region 1000-71b are determined as transmission regions.

When the processing proceeds from step S1906 to step S1908, the entire region 1000-71r is assumed as a transmission region.

Figure 23:
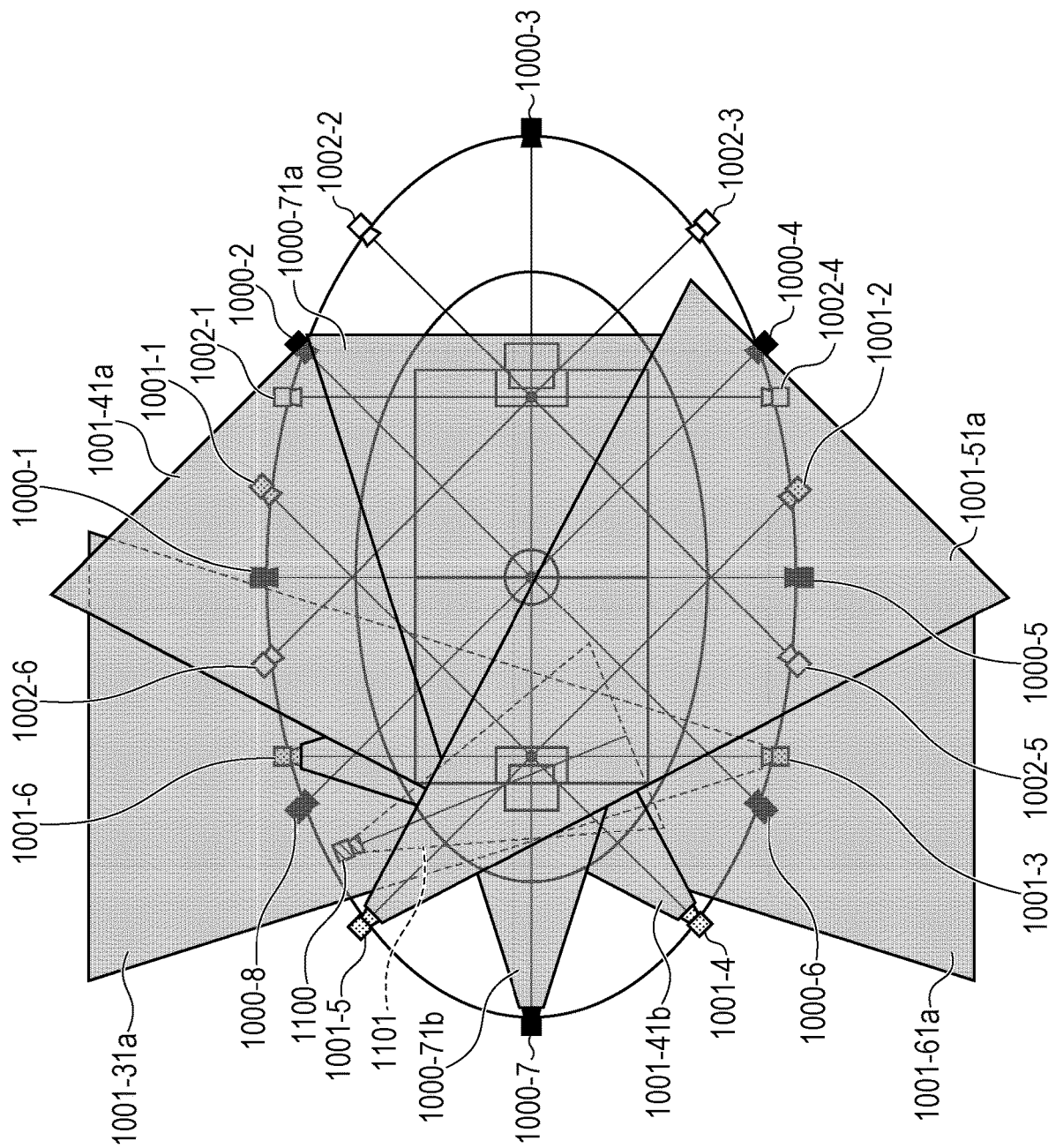
FIG. 23 is a diagram illustrating the calculation procedure of determining a transmission region for generating a virtual viewpoint image.

The processings in steps S1909 and S1910 are performed, and the camera order setting unit 12401 selects a next camera and continues the similar processing. FIG. 23 illustrates how the entire virtual shooting range 1101 is covered. The transmission region determination unit 12404 determines the transmission regions of the cameras 1001-5, 1000-7, 1001-6, 1001-4, and 1001-3 until the entire virtual shooting range 1101 is covered. Subsequently, the similar processings to the first embodiment are performed on a camera for which a transmission region is not determined (a camera not covering the virtual shooting range). That is, the camera 1000-8 is selected, and then the camera 1002-6 and others are subsequently processed. The transmission regions are determined for all the cameras, and each camera is notified of the transmission region information.

With the configuration and the operations described above, an image required to generate a virtual viewpoint image is first sent so that the back-end server can generate an image when the required images are acquired, and the processing can be started without waiting for all the images to reach. Thus, a response can be improved for movement of the virtual viewpoint so that the user of the virtual camera operation UI 330 can combine the virtual viewpoints without feeling uncomfortable.

Figure 24:
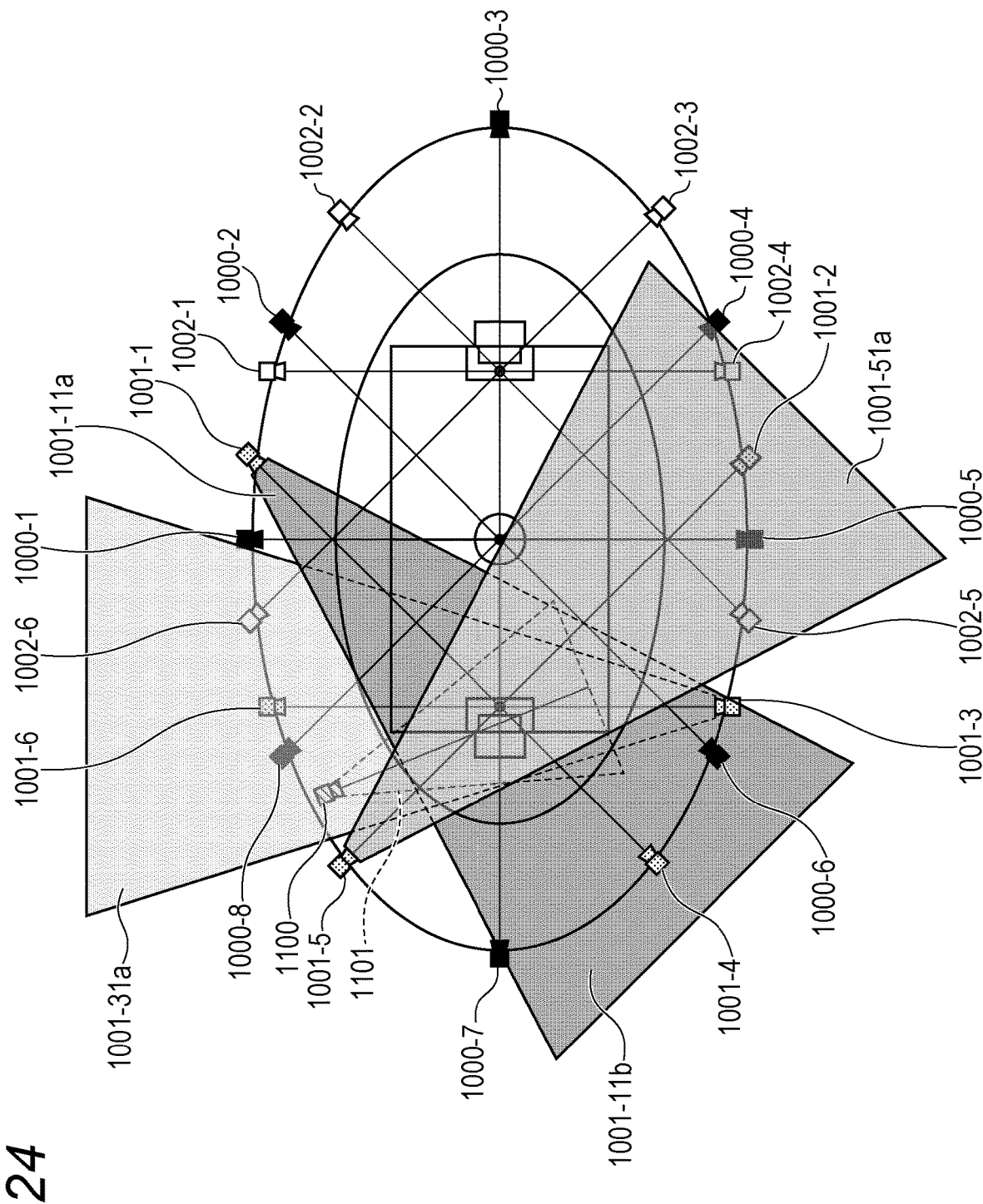
FIG. 24 is a diagram for explaining a camera selection method.

In step S1903, the camera selection method based on the virtual shooting range 1101 of the virtual camera 1100 by the camera order setting unit 12401 is not limited thereto. FIG. 24 is a diagram for explaining the camera selection method. For example, as illustrated in FIG. 24, cameras can be selected such that a minimum number of cameras for covering the virtual shooting range 1101 are required. The cameras can be easily found based on the position and shape of the shooting range of the virtual camera and the background range of each camera. For example, the background range of one camera is calculated. If the background range of a camera can cover the shooting range of the virtual camera, the camera is selected. If one camera cannot cover, the coverage of the virtual shooting range 1101 is calculated in a combination of two cameras or a combination of three cameras. While the number of combined cameras is increased, cameras may be selected based on a combination of cameras first covering the entire virtual shooting range.

When the control station 310 notifies that a background region image is not sent from any sensor system due to failure of the sensor system, disconnection or failure of a network, or the like, the transmission region calculation unit 2400 calculates a transmission region. The transmission region calculation unit 2400 specifies a sensor system (camera) for which a background region image is not sent from the control station 310. It is assumed here that the camera 110X is specified. The transmission region of the camera 110X is recalculated such that it is covered by a camera having a transmission region overlapping with the transmission region.

Figure 25:
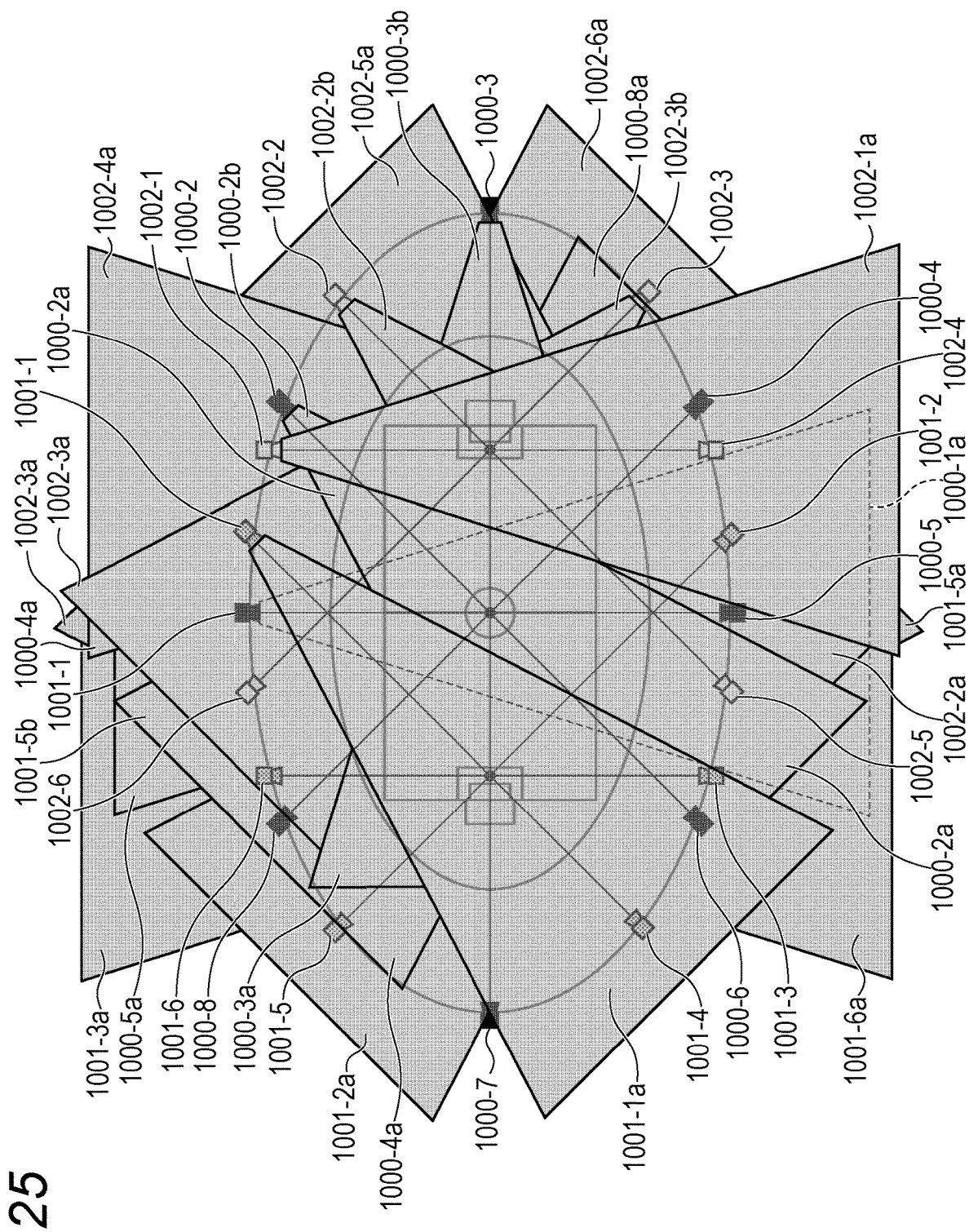
FIG. 25 is a diagram for explaining how to recalculate a new transmission region.

FIG. 25 is a diagram for explaining that a transmission region is newly recalculated. In FIG. 25, the camera 110X is assumed as the camera 1000-1. The region 1000-1a in a dotted line of the camera 1000-1 can be covered by the regions 1001-1a, 1000-2a, 1002-1a, 1002-2a, and 1001-6a. The transmission region is calculated in this way, and the respective items of transmission region information are transmitted to the sensor systems other than the sensor system 1000-1. The respective items of transmission region information are stored in the transmission region information storage unit 402.

An image corresponding to the background region image of a sensor system can be transmitted even if a failure or the like occurs in the sensor system, thereby preventing an influence on combination of the virtual viewpoint images later.

<Variant>

A transmission region determination method according to a variant will be described below. That is, a transmission region is determined in terms of a shooting range of a camera according to the above embodiment. According to the present variant, a transmission region is determined in terms of a distance between each point in a target region and a camera by use of the 3D shape data (stadium shape data) of the stadium.

Figure 26:
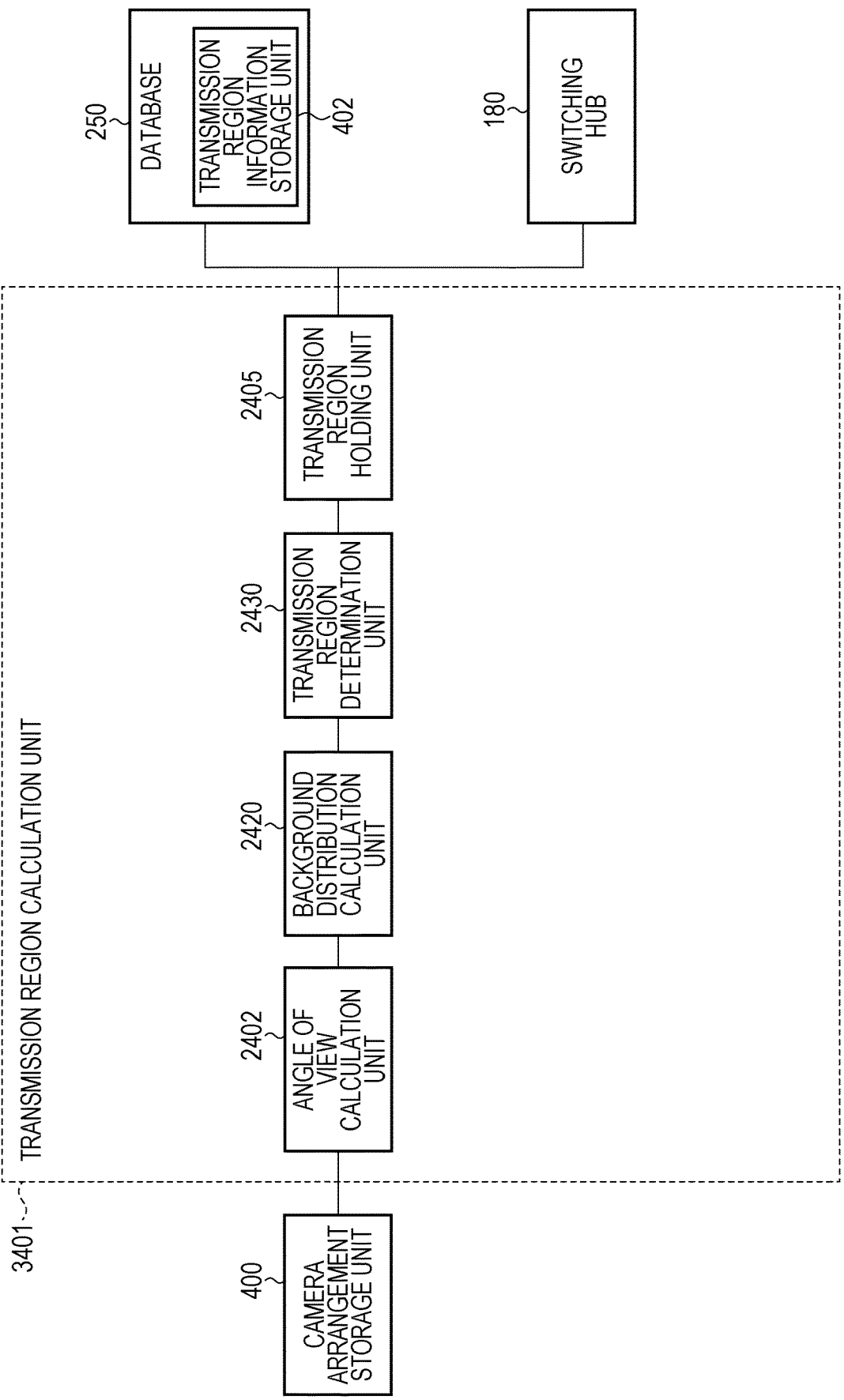
FIG. 26 is a functional block diagram of a transmission region calculation unit.

FIG. 26 is a functional block diagram of a transmission region calculation unit 3401 according to the present variant. In FIG. 26, the blocks having the same functions as in FIG. 5 are denoted with the same reference numerals, and the description thereof will be omitted.

The transmission region calculation unit 3401 includes the angle of view calculation unit 2402, a background distribution calculation unit 2420, a transmission region determination unit 2430, and the transmission region holding unit 2405.

The background distribution calculation unit 2420 divides the entire region shot by the camera in each sensor system into a plurality of small regions, and calculates which camera each small region is the closest to. The calculated closest camera is recorded per small region. A small region may be a unit of point cloud made of minimum units of point clouds configuring the space.

The transmission region determination unit 2430 groups the regions for each camera based on the information on the closest camera for a small region recorded by the background distribution calculation unit 2420. The grouped regions are assumed as transmission regions of each camera.

Figure 27:
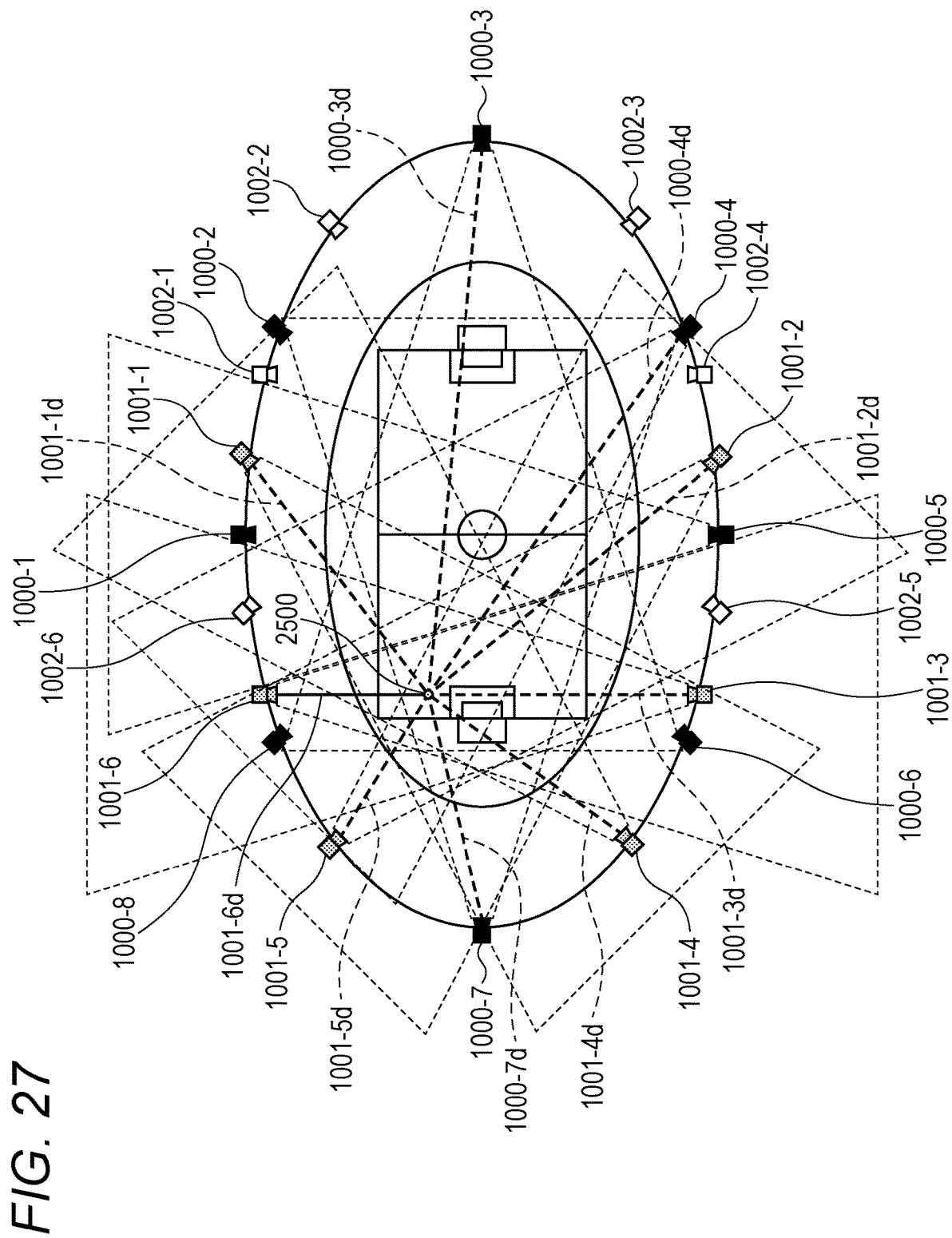
FIG. 27 is a diagram illustrating how to calculate a distance between a small region and a camera.

FIG. 27 is a diagram illustrating how to calculate a distance between a small region and a camera. The background distribution calculation unit 2420 selects a camera which covers a small region 2500 for which the distance is calculated within its visual field based on the angles of view of all the cameras. In FIG. 27, the cameras 1001-1, 1000-3, 1000-4, 1001-2, 1001-3, 1001-4, 1000-7, 1001-5, and 1001-6 are selected. The distances between the small region 2500 and the cameras are the distances 1001-1d, 1000-3d, 1000-4d, 1001-2d, 1001-3d, 1001-4d, 1000-7d, 1001-5d, and 1001-6d, respectively.

The background distribution calculation unit 2420 selects the shortest distance from the distances. The distance 1001-6d is the shortest here. The background distribution calculation unit 2420 records the camera 1001-6 as a camera having the shortest distance to the small region 2500. The background distribution calculation unit 2420 calculates and records a camera having the shortest distance to a small region (not illustrated) other than the small region 2500 in this way.

The transmission region determination unit 2430 then groups the regions based on the information on the cameras with the shortest distances recorded in units of small region by the background distribution calculation unit 2420, and determines a transmission region of each camera.

With the configuration and the operations described above, an image of the closest camera to each point is used thereby to acquire high-definition and accurate image data. Thereby, higher image quality can be achieved.

According to the aforementioned embodiment, it is possible to efficiently transmit a shot image irrespective of the scales of devices configuring the system such as the number of cameras 112, and the output resolution or the output frame rate of the shot image.

Third Embodiment

As in the above embodiments, when an image shot by a single camera is applied on a 3D model of the background, even if a reflected light source is shot in the image shot by the camera, the image can be applied on the background model as it is. Thus, there can arise a problem that when a virtual viewpoint image is generated, a reflected light which should not be seen from the viewpoint cannot be removed.

There will be described a configuration for reducing influences due to an abnormal pixel shooting a reflected light therein when generating a virtual viewpoint image by use of images shot by a plurality of imaging apparatuses according to a third embodiment.

Figure 28:
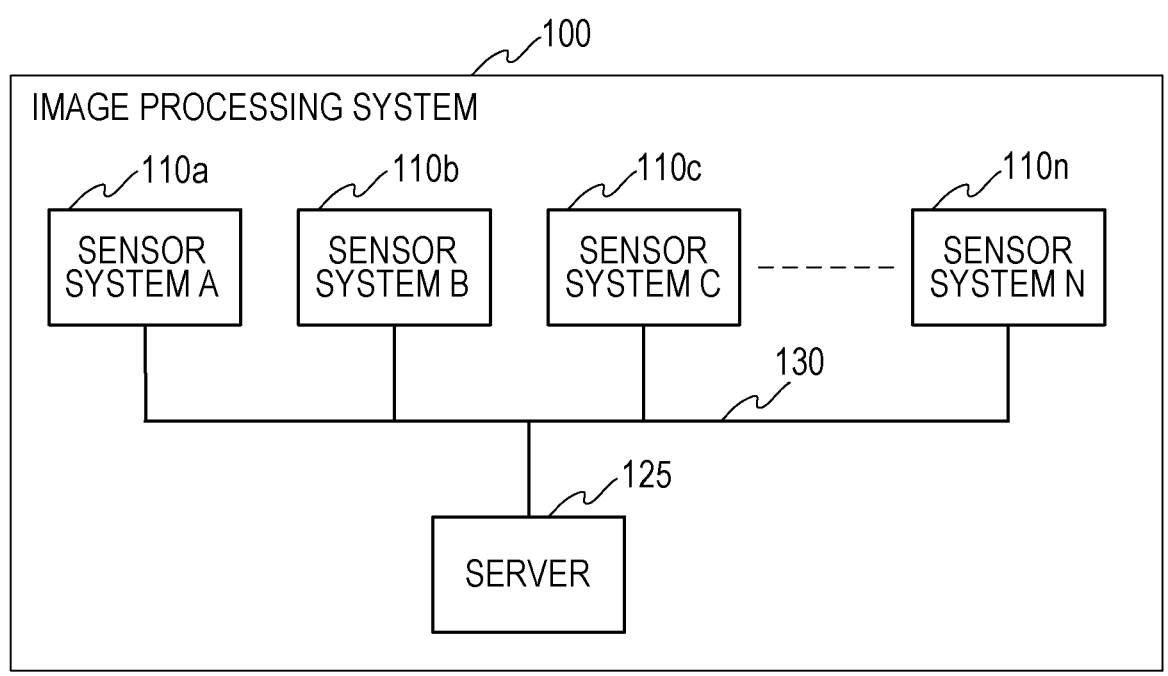
FIG. 28 is a block diagram of the image processing system.

FIG. 28 is a block diagram illustrating an exemplary configuration of the image processing system 100 according to the third embodiment of the present disclosure. The image processing system 100 includes the sensor systems 110a to 110n, a server 125, and a communication line 130. The image processing system 100 is such that the cameras in the sensor systems 110a to 110n are installed at different positions in a stadium or the like and image data shot by the installed cameras is collected in the server 125 via the communication line 130 thereby to generate a virtual viewpoint image.

The sensor systems (imaging apparatuses) 110a to 110n are arranged in a stadium or the like, process shooting image data shot by the cameras, and transmit the processed image data to the server 125. Any number of sensor systems 110a to 110n may be provided. A detailed configuration of the sensor systems 110 will be described below. The server 125 is an image processing apparatus, and generates a virtual viewpoint image by use of the image data received from the sensor systems 110a to 110n. A detailed configuration of the server 125 will be described below. The communication line 130 is directed for causing each of the sensor systems 110a to 110n and the server 125 to make bidirectional communication.

Figure 29:
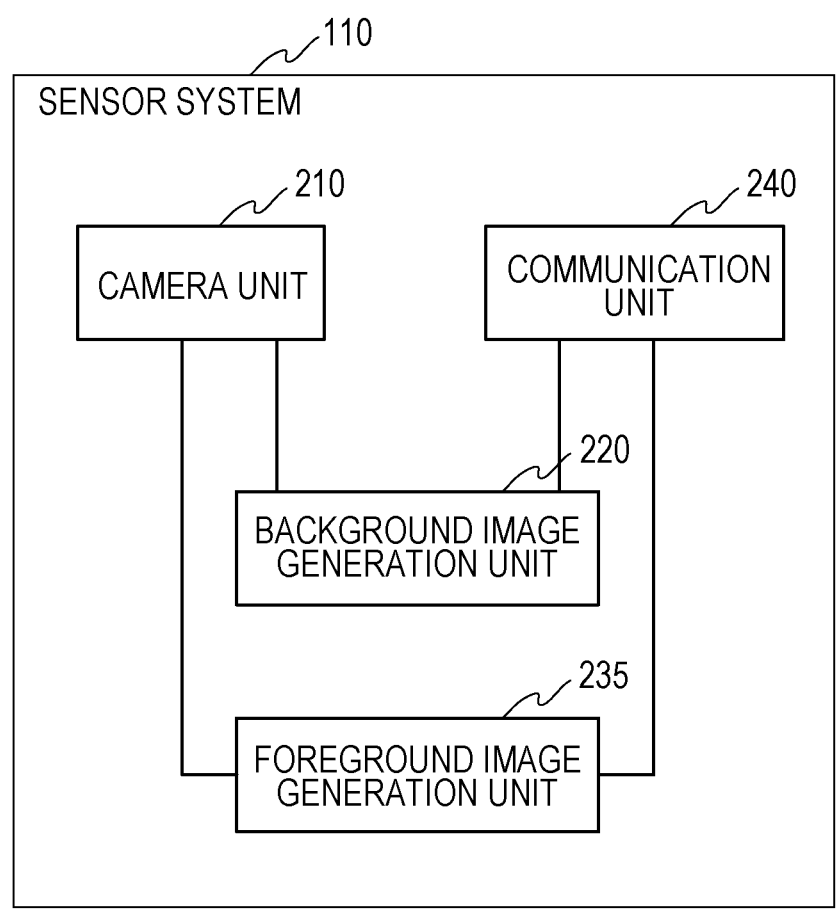
FIG. 29 is a block diagram of a sensor system.

FIG. 29 is a block diagram illustrating an exemplary configuration of the sensor system 110. The sensor system 110 corresponds to each of the sensor systems 110a to 110n of FIG. 28. The sensor systems 110a to 110n have the same configuration. The sensor system 110 includes a camera unit 210, a background image generation unit 220, a foreground image generation unit 235, and a communication unit 240.

The camera unit 210 has a lens and a camera such as CMOS sensor, generates an image by photoelectric conversion, and converts the generated analog image into digital data. The background image generation unit 220 generates background image data by use of the image data generated by the camera unit 210 and a background image data generation region designated by a background region generation unit 340 (FIG. 30) in the server 125 in response to an instruction of the server 125. The background image is an image other than the foreground region as a region of a predetermined object in an image. The communication unit 240 transmits the background image data generated by the background image generation unit 220 to the server 125. The foreground image generation unit 235 extracts the foreground which is the image data generated by the camera unit 210 with the background excluded, and generates foreground image data. Here, the foreground is a predetermined object such as person or ball. The communication unit 240 transmits the foreground image data generated by the foreground image generation unit 235 to the server 125. The communication unit 240 makes communication with the server 125 via the communication line 130.

Figure 30:
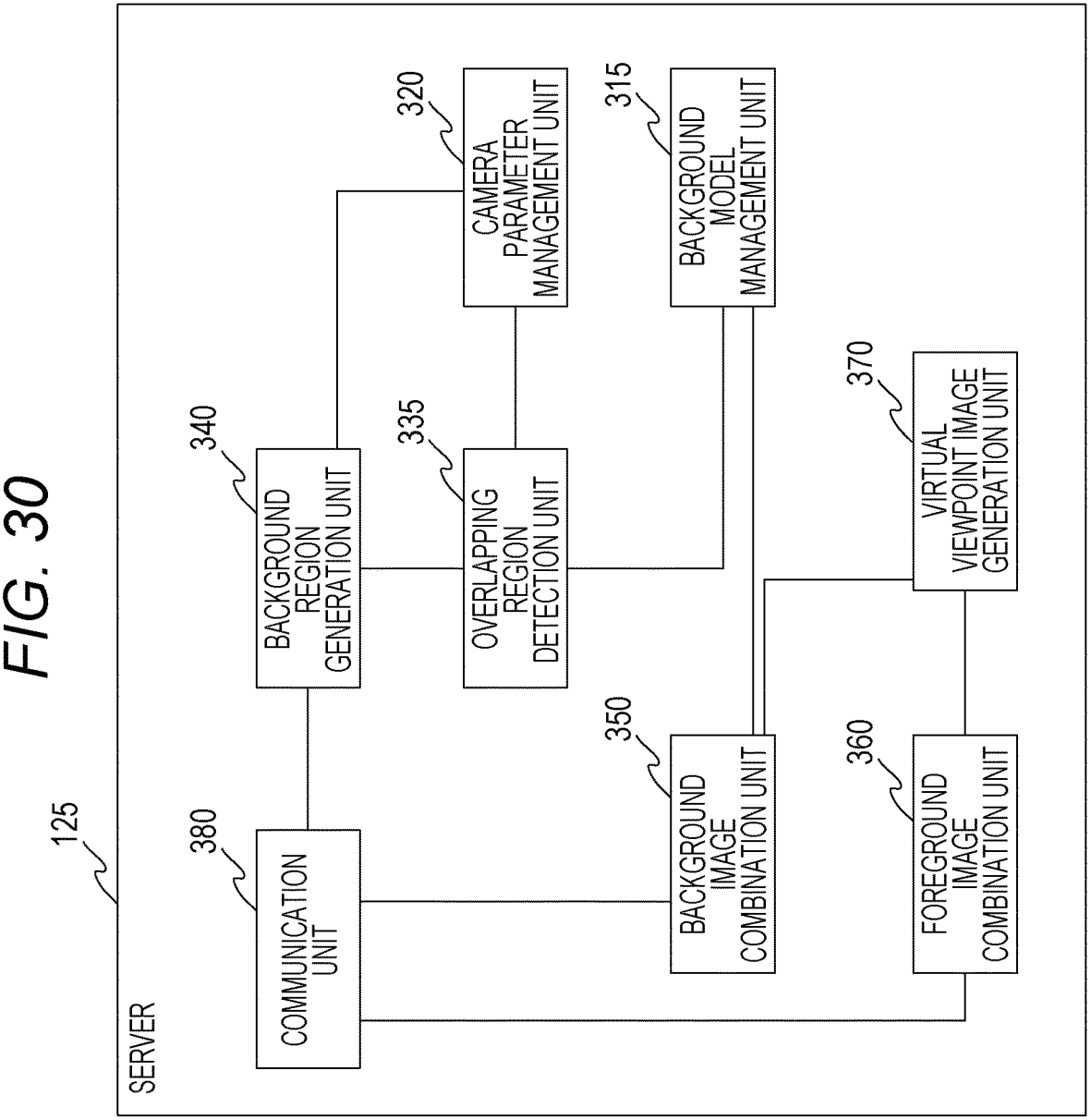
FIG. 30 is a block diagram of a server.

FIG. 30 is a block diagram illustrating an exemplary configuration of the server 125 of FIG. 28. One or more CPUs execute the programs stored in the storage device to calculate and process information and to perform hardware control so that each component is realized. Part or all of each component illustrated in FIG. 30 may be configured in dedicated hardware such as graphics processing unit (GPU), ASIC, or FPGA. The server 125 may be one apparatus or a plurality of apparatuses. The server 125 includes a background model management unit 315, a camera parameter management unit 320, an overlapping region detection unit 335, the background region generation unit 340, a background image combination unit 350, a foreground image combination unit 360, a virtual viewpoint image generation unit 370, and a communication unit 380.

The background model management unit 315 holds 3D information of the background of a stadium or the like shot by the sensor system 110, and provides the overlapping region detection unit 335 described below with the 3D information of the background. The 3D information is previously created by three-dimensionally scanning by use of CAD or mesh model file of a structure in the background of an object, or a laser scanner.

The camera parameter management unit 320 holds the camera parameters of each camera unit 210 in each of the sensor systems 110a to 110n, and provides the camera parameters to the overlapping region detection unit 335 and the background region generation unit 340. The camera parameters include extrinsic parameters indicating position and orientation, and intrinsic parameters indicating focal length and inter-pixel interval. The camera parameters may be either the extrinsic parameters or the intrinsic parameters.

The overlapping region detection unit 335 has the 3D information of the background input from the background model management unit 315, and has the camera parameters input from the camera parameter management unit 320. The overlapping region detection unit 335 then detects an overlapping region in which the shooting ranges (the same parts in the background) of two or more of the sensor systems 110a to 110n overlap by use of the 3D information of the background and the camera parameters. Specifically, the overlapping region detection unit 335 projects a beam from the camera unit 210 in each of the sensor systems 110a to 110n by calculation using the camera parameters of each of the sensor systems 110a to 110n. The overlapping region detection unit 335 then finds a region on the 3D information of the background on which the beam from the camera unit 210 in each of the sensor systems 110a to 110n hits, and detects a range in which the regions overlap as an overlapping region. The overlapping region detection unit 335 outputs the detected overlapping region information to the background region generation unit 340 and the background image combination unit 350. The overlapping region may be specified by a user operation.

The background region generation unit 340 has the camera parameters input from the camera parameter management unit 320, and has the overlapping region information input from the overlapping region detection unit 335. The background region generation unit 340 then determines a predetermined number of sensor systems 110 for generating background image data of the overlapping region from the sensor systems 110 by use of the camera parameters and the overlapping region information. The background region generation unit 340 then determines a background image data generation region including the overlapping region for a predetermined number of sensor systems 110, and determines a background image data generation region without the overlapping region for the sensor systems 110 other than a predetermined number of sensor systems 110 (other than the imaging apparatuses). A predetermined number is previously determined by the user, and is three, for example. A predetermined number may be dynamically determined depending on the overlapping region. The communication unit 380 transmits the information on the background image data generation region of each sensor system 110 determined by the background region generation unit 340 to each sensor system 110.

The background image combination unit 350 combines and applies the background image data input from each of the sensor systems 110 on the 3D information (3D model) of the background input from the background model management unit 315, and outputs it as background model information to the virtual viewpoint image generation unit 370.

The foreground image combination unit 360 combines the foreground image data input from each sensor system 110, and outputs it as foreground model information to the virtual viewpoint image generation unit 370. For example, the foreground image combination unit 360 estimates a 3D shape of an object in an object shape estimation method called Visual Hull, for example, thereby combining the foreground image data.

The virtual viewpoint image generation unit 370 receives an input viewpoint coordinate from the user, and combines the background model information input from the background image combination unit 350 and the foreground model information input from the foreground image combination unit 360 thereby to generate a virtual viewpoint image based on the viewpoint coordinate. The communication unit 380 makes communication with the sensor systems 110 via the communication line 130.

Figure 31A:
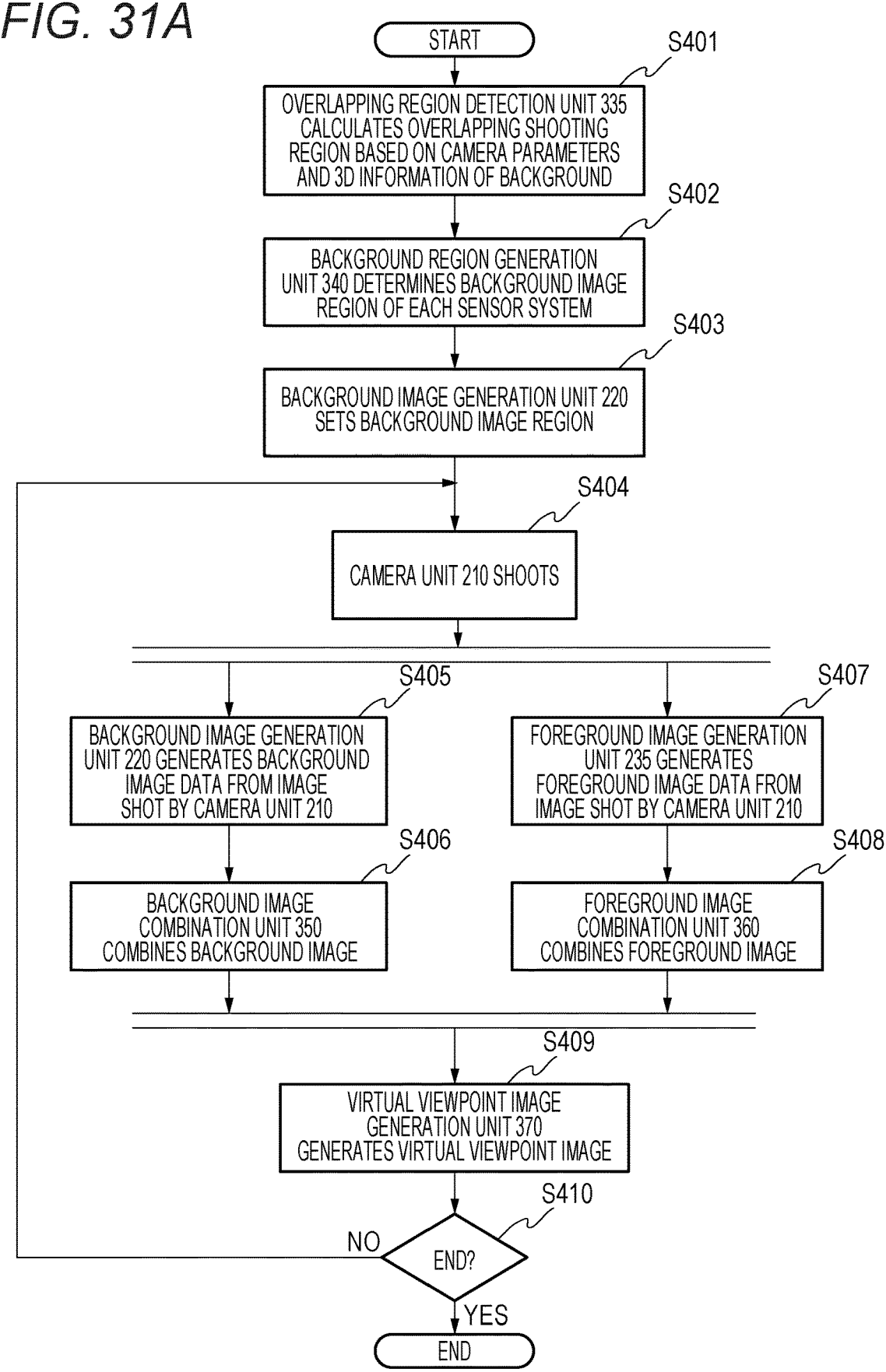
FIG. 31A to 31B are flowcharts illustrating a virtual viewpoint image generation processing.

FIG. 31A is a flowchart illustrating the processings of generating a virtual viewpoint image by the image processing system 100 according to the present embodiment, and illustrates an image processing method by the image processing system 100. In step S401, the overlapping region detection unit 335 has the camera parameters input from the camera parameter management unit 320, and has the 3D information of the background input from the background model management unit 315. The overlapping region detection unit 335 projects a beam from the camera unit 210 onto the 3D information of the background by use of the camera parameters and finds an intersection, thereby calculating the shooting ranges of the respective camera units 210 in the sensor systems 110a to 110n.

Figure 32A:
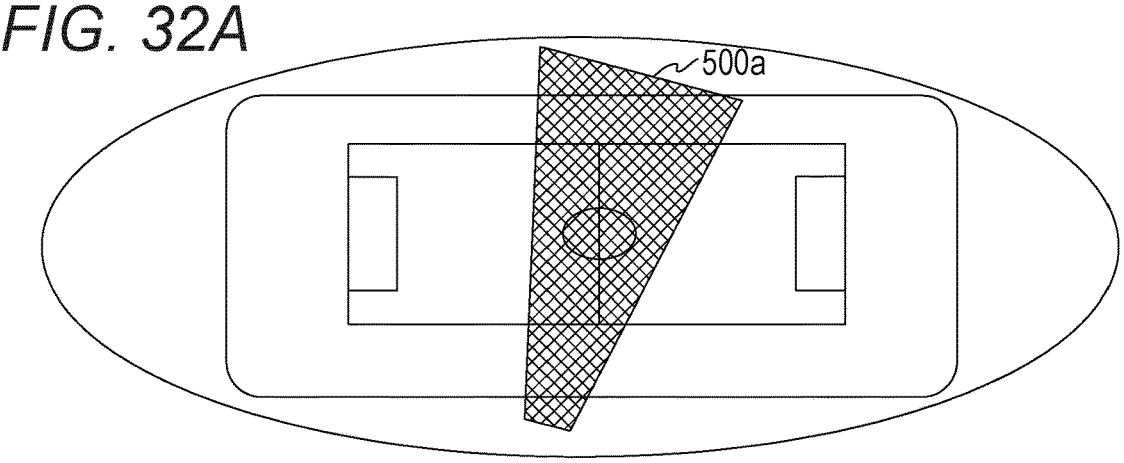
FIGS. 32A to 32C are schematic diagrams illustrating a shooting range.
Figure 32B:
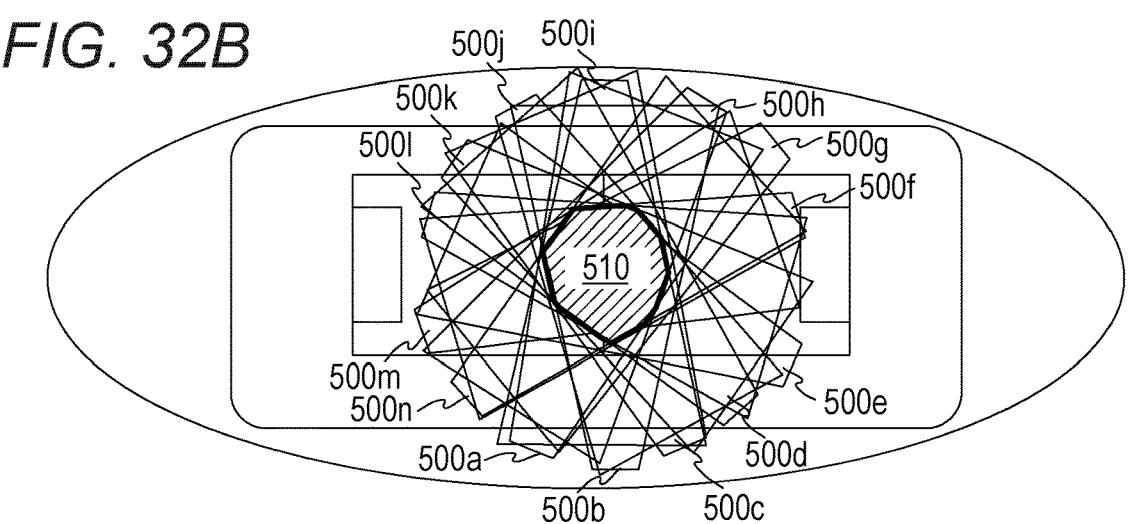

FIG. 32A is a schematic diagram illustrating a stadium and the shooting ranges of the cameras in the sensor systems 110 in the stadium. The overlapping region detection unit 335 finds an intersection of a beam with the 3D information of the stadium from the camera unit 210 in the sensor system 110 as illustrated in FIG. 32A thereby to calculate a shooting region 500a of the camera unit 210 in the sensor system 110. Similarly, the overlapping region detection unit 335 calculates the shooting regions 500a to 500n of all the sensor systems 110 by use of the camera parameters of the respective sensor systems 110 as illustrated in FIG. 32B. The overlapping region detection unit 335 then detects an overlapping region (shaded) 510 of the shooting regions 500a to 500n of the sensor systems 110. Here, a plurality of overlapping parts of the shooting ranges of the sensor systems 110 are present in addition to the overlapping region 510, and the overlapping regions are processed similarly to the overlapping region 510 and thus the description thereof will be omitted.

Then in step S402, the background region generation unit 340 determines a background image data generation region of each of the sensor systems 110 based on the overlapping region 510 and the camera parameters of the sensor systems 110. The background region generation unit 340 then transmits the determined background image data generation region of each of the sensor systems 110 to each of the sensor systems 110 via the communication unit 380.

Figure 32C:
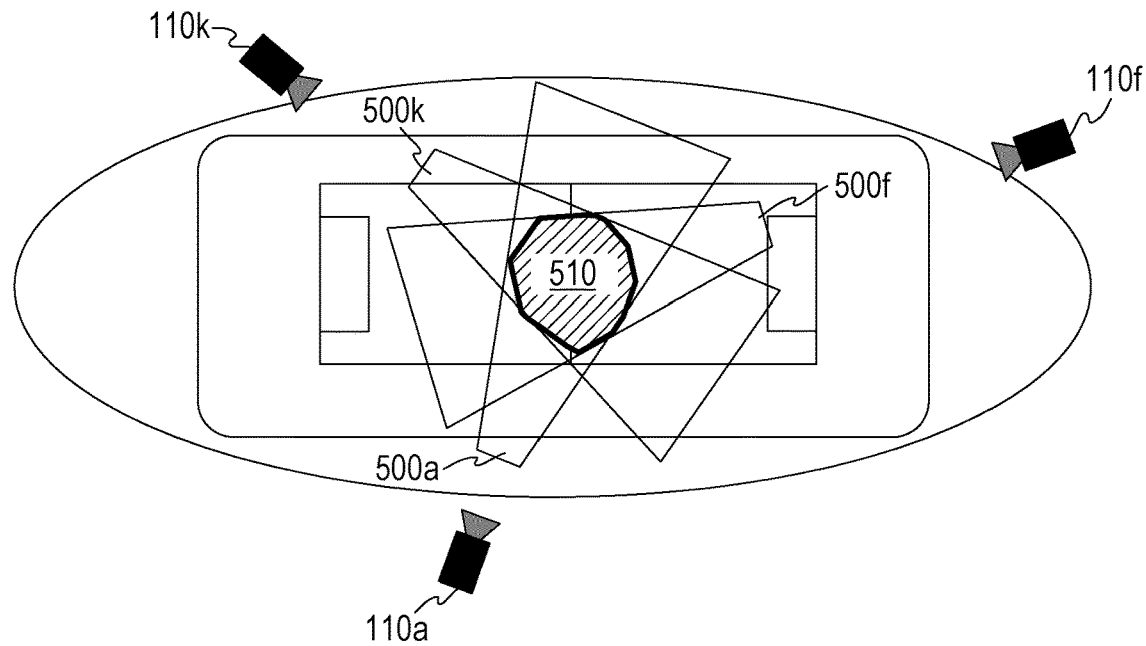

The method for determining a background image data generation region will be described herein by way of the overlapping region 510. As described above, for example, a predetermined number of sensor systems 110 are three sensor systems 110. At first, the background region generation unit 340 selects a sensor system 110 as a sensor system 110 for shooting the overlapping region 510. For example, the background region generation unit 340 selects the sensor system 110a, and further selects the other two sensor systems 110. It is desirable here that the background region generation unit 340 selects not three sensor systems 110 within a short distance but three sensor systems 110 away from one another. Thus, the background region generation unit 340 selects three sensor systems 110 by use of the global position coordinates in the camera parameters of the camera units 210 in the sensor systems 110a to 110n. The background region generation unit 340 finds the area of a triangle connecting the global position coordinates of the three sensor systems 110 in all the combinations of the sensor system 110a with the other two of the sensor systems 110b to 110n. The background region generation unit 340 then selects a combination of three sensor systems 110 with the largest area of a triangle. As illustrated in FIG. 32C, the background region generation unit 340 selects three sensor systems 110a, 110f, and 110k with the largest area of a triangle, for example. That is, the background region generation unit 340 determines a predetermined number of sensor systems 110 with the largest area of a graphic connecting the positions of the sensor systems 110 for shooting the overlapping region 510 in the sensor systems 110 based on the position coordinates of the sensor systems 110.

The three sensor systems 110a, 110f, and 110k are determined as the regions for which the overlapping region 510 is generated as background image data by the background region generation unit 340. Further, the sensor systems 110 other than the sensor systems 110a, 110f, and 110k are determined as the regions for which the overlapping region 510 is not generated as background image data by the background region generation unit 340. As described above, the background region generation unit 340 determines a background image data generation region of each sensor system 110.

The background region generation unit 340 determines a predetermined number of (three, for example) sensor systems 110 for which background image data of the overlapping region 510 is generated from the sensor systems 110. The background region generation unit 340 then determines a background image data generation region including the overlapping region 510 for a predetermined number of sensor systems 110, and determines a background image data generation region without the overlapping region 510 for the sensor systems 110 other than a predetermined number of sensor systems 110.

Then in step S403, the communication unit 240 in each sensor system 110 receives the background image data generation regions determined in step S402, and outputs the background image data generation regions to the background image generation unit 220. The background image generation unit 220 in each sensor system 110 sets the background image data generation regions.

Then in step S404, the camera unit 210 in each sensor system 110 shoots and generates an image, and outputs the image to the background image generation unit 220 and the foreground image generation unit 235. Thereafter, each sensor system 110 proceeds to the parallel processings of steps S405 and S407.

In step S405, the background image generation unit 220 in each sensor system 110 has the image input from the camera unit 210 and removes the foreground from the image thereby to generate a background image. The background image generation unit 220 then extracts the background image data generation region set in step S403 from the background image, deletes the other part, and generates the extracted background image data.

Figure 33:
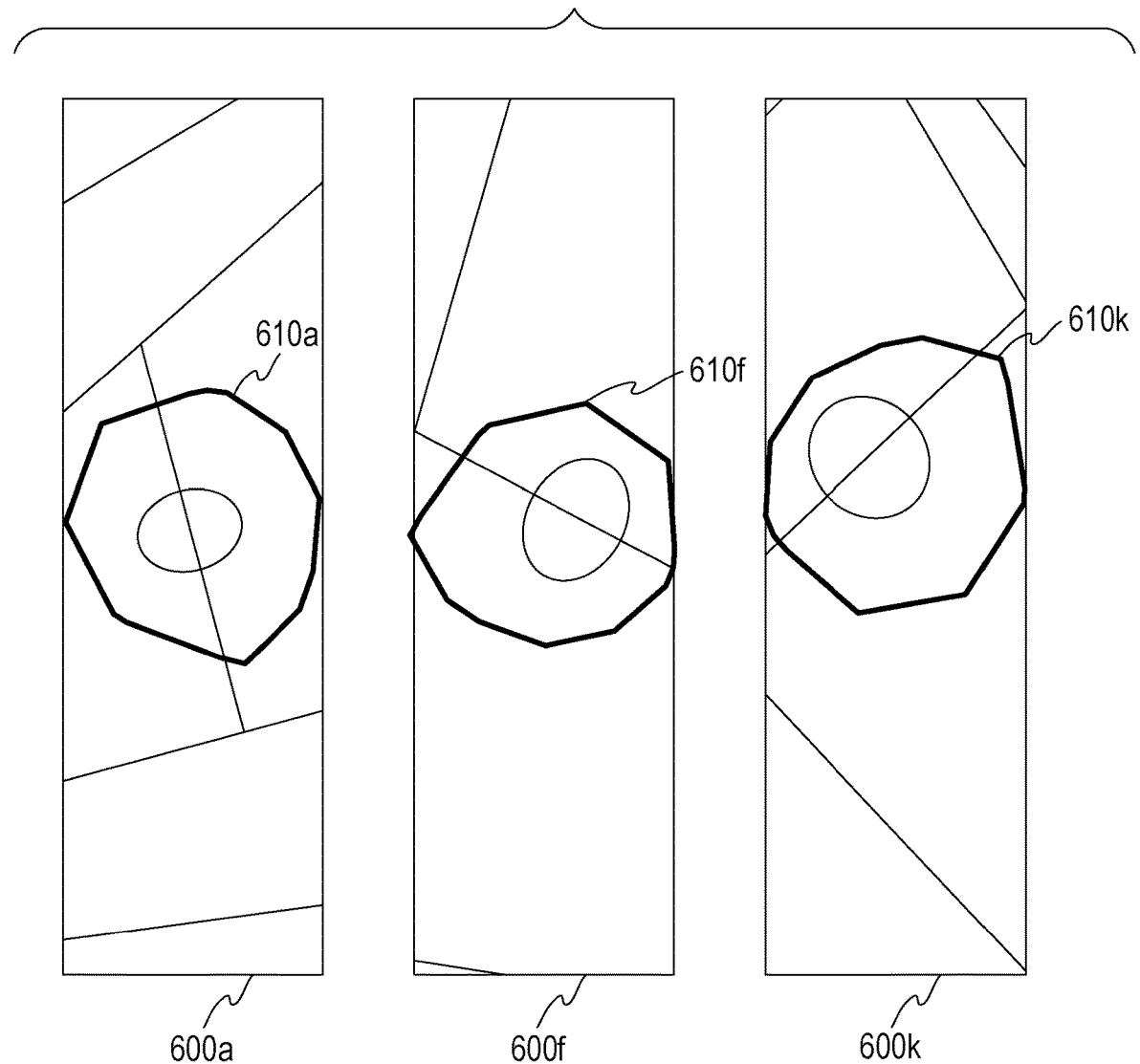
FIG. 33 is a schematic diagram illustrating images shot by the sensor systems.

FIG. 33 is a diagram illustrating images 600a, 600f, and 600k shot by the sensor systems 110a, 110f, and 110k of FIG. 32C, respectively. The images 600a, 600f, and 600k correspond to the images of the shooting regions 500a, 500f, and 500k of the sensor systems 110a, 110f, and 110k of FIG. 32C, respectively. The images 600a, 600f, and 600k have overlapping regions 610a, 610f, and 610k, respectively. The overlapping regions 610a, 610f, and 610k correspond to the overlapping region 510 of FIG. 32C. The overlapping region 510 is included in the background image data generation region so that the background image generation units 220 in the sensor systems 110a, 110f, and 110k generate background image data including the overlapping region 510.

Figure 34A:
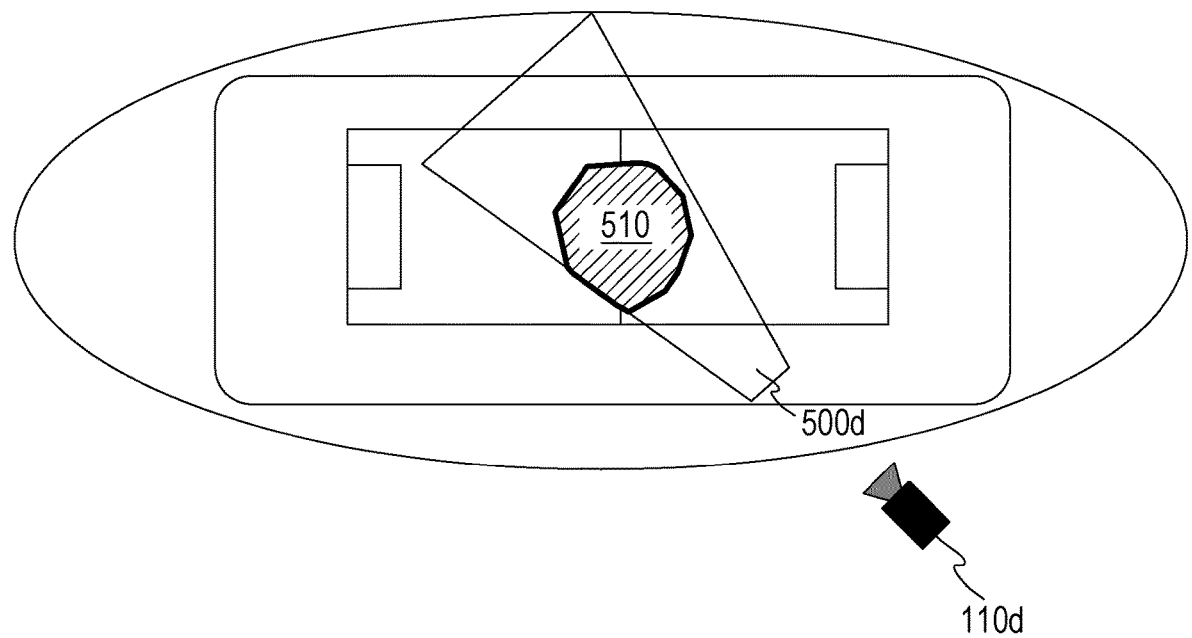
FIGS. 34A to 34C are schematic diagrams illustrating a shooting range and a shot image.
Figure 34B:
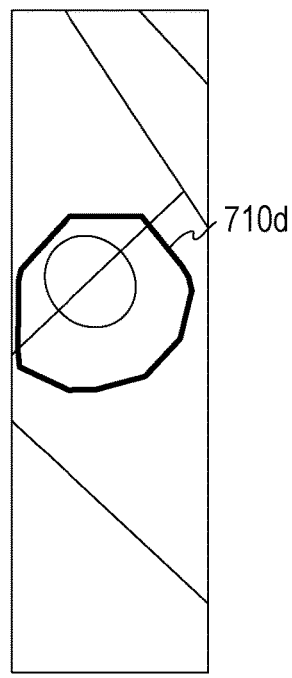
Figure 34C:
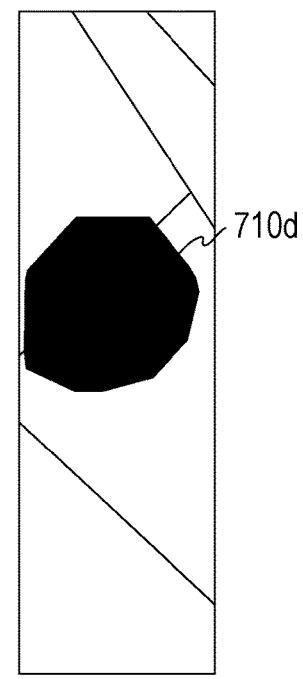

FIG. 34A is a diagram illustrating the shooting region 500d of the sensor system 110d. The shooting region 500d includes the overlapping region 510. However, the sensor system 110d is determined as a sensor system for which the overlapping region 510 is not included in the background image data generation region. FIG. 34B is a diagram illustrating an image shot by the camera unit 210 in the sensor system 110d. A region 710d in the image of FIG. 34B corresponds to the overlapping region 510. Since the overlapping region 510 is not included in the background image data generation region, the background image generation unit 220 in the sensor system 110d generates the background image data excluding the region 710d as illustrated in FIG. 34C. The sensor systems 110 other than the sensor systems 110a, 110f, and 110k generate the background image data excluding the overlapping region 510 similarly to the sensor system 110d since the overlapping region 510 is not included in the background image data generation region. The communication unit 240 in each sensor system 110 transmits the background image data generated by the background image generation unit 220 to the server 125.

Then in step S406, the communication unit 380 in the server 125 receives the background image data from each of the sensor systems 110, and outputs the background image data of each of the sensor systems 110 to the background image combination unit 350. The background image combination unit 350 projects the background image data of each of the sensor systems 110 onto the 3D information (3D model) of the background input from the background model management unit 315 thereby to combine the background image data, and proceeds to step S409. It is assumed here that three sensor systems 110a, 110f, and 110k generate the background image data for the overlapping region 510. Thus, the background image combination unit 350 combines the background image data of the three sensor systems 110a, 110f and 110k for the overlapping region 510.

Figure 35A:
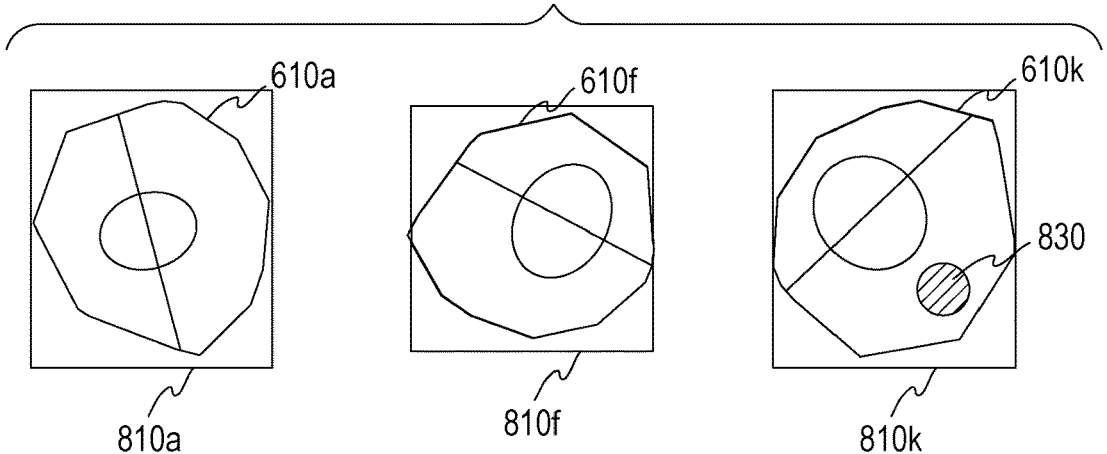
FIGS. 35A to 35C are schematic diagrams illustrating images, respectively.
Figure 35B:
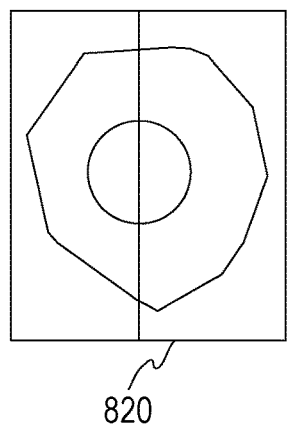
Figure 35C:
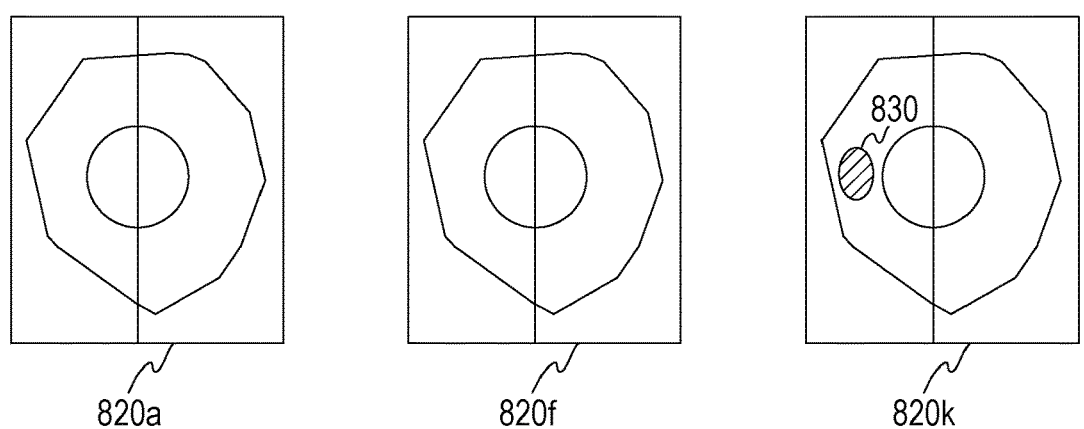

FIG. 35A is a diagram illustrating images 810a, 810f, and 810k of the overlapping regions 610a, 610f, and 610k of FIG. 33, respectively. The image 810a includes the overlapping region 610a, and is part of the image 600a of FIG. 33 shot by the sensor system 110a. The image 810f includes the overlapping region 610f, and is part of the image 600f of FIG. 33 shot by the sensor system 110f. The image 810k includes the overlapping region 610k, and is part of the image 600k of FIG. 33 shot by the sensor system 110k. The background image combination unit 350 modifies the images 810a, 810f, and 810k and generates an image 820 of FIG. 35B such that the object takes a similar shape when the images 810a, 810f, and 810k are projected onto the 3D model of the background. The images 810a, 810f, and 810k of FIG. 35A are modified into images 820a, 820f, and 820k of FIG. 35C, respectively, to be the same shape as the image 820 of FIG. 35B. The background image combination unit 350 determines the pixel value of the combined image to take the average value of the pixel values at the same position of the images 820a, 820f, and 820k during combination. The pixel value determination will be described below in detail.

Figure 31B:
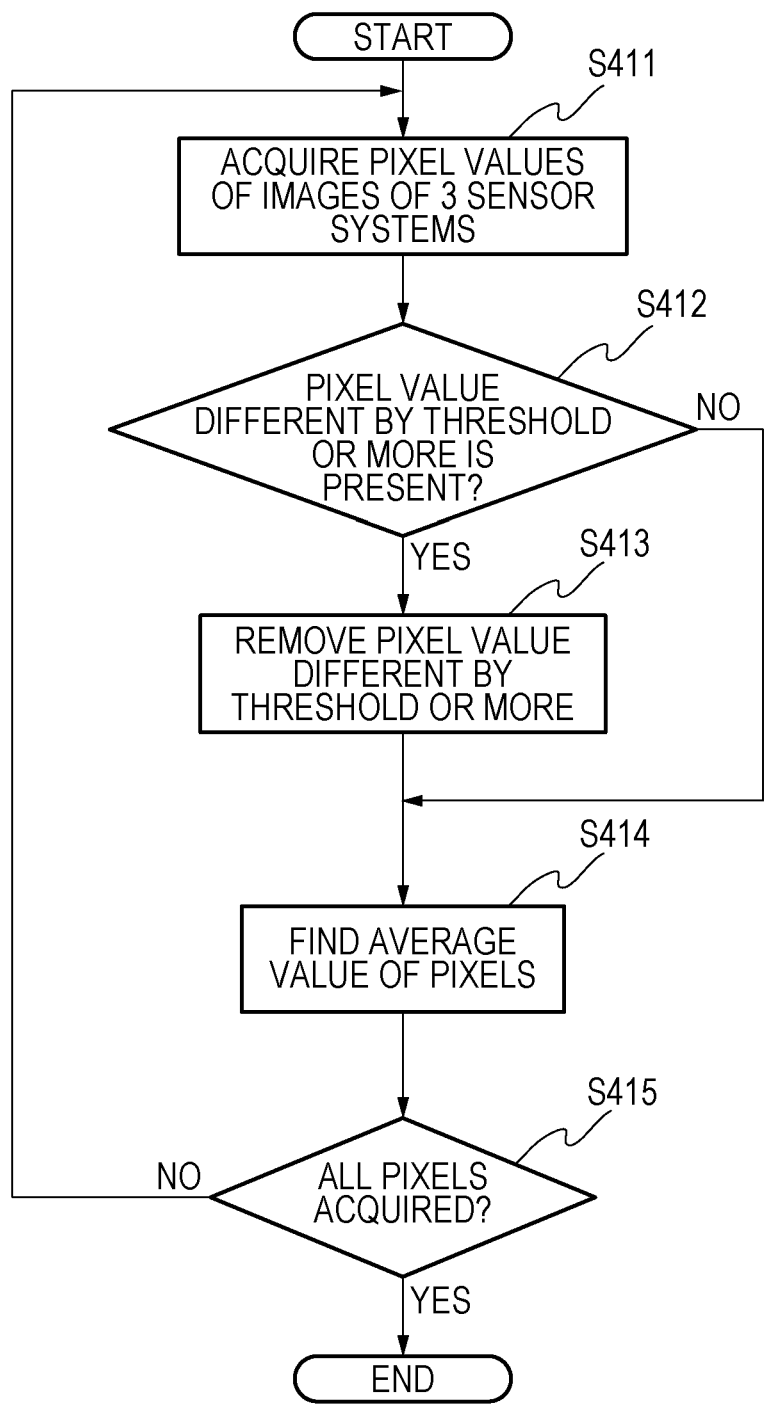

FIG. 31B is a flowchart illustrating a method for combining the overlapping region 510 by the background image combination unit 350. In step S411, the background image combination unit 350 acquires the pixel values of the images 820a, 820f, and 820k shooting the overlapping region of the three sensor systems 110a, 110f, and 110k. For example, the background image combination unit 350 acquires the pixel values 830a, 830f, and 830k of the pixels at the same position of the images 820a, 820f, and 820k.

Then in step S412, the background image combination unit 350 determines whether one pixel value in the pixel values 830a, 830f, and 830k is different from the other pixel values by a threshold or more. When determining that the pixel value is different by the threshold or more, the background image combination unit 350 proceeds to step S413, and when determining that the pixel is not different by the threshold or more, the processing proceeds to step S414. The background image combination unit 350 proceeds to step S413 or S414 depending on a comparison result of the pixel values 830a, 830f, and 830k.

Here, if the pixel values 830a, 830f, and 830k are of the pixels without a reflected light source, the pixel values are not different from each other by the threshold or more even in consideration of an error of the camera unit 210, and thus the background image combination unit 350 proceeds to step S414.

If the pixel value 830k is of the pixel with a reflected light source shot, it is different from the pixel values 830a and 830f by the threshold or more. In this case, the background image combination unit 350 proceeds to step S413.

The background image combination unit 350 determines whether a difference between the pixel values is the threshold or more, but is not limited thereto. The background image combination unit 350 previously calculates and finds the median value of each pixel, and if there is a pixel value with a difference between the pixel value and the median value of the threshold or more, the processing may proceed to step S413.

In step S413, the background image combination unit 350 removes the pixel value 830k determined as different by the threshold or more, leaves the pixel values 830a and 830f, and proceeds to step S414.

In step S414, the background image combination unit 350 finds the average values of the pixel values, and projects the average values onto the 3D model of the background. When the processing proceeds from step S412 to S414, the background image combination unit 350 finds the average value of the three pixel values 830a, 830f, and 830k. When the processing proceeds from step S413 to S414, the background image combination unit 350 finds the average value of the two pixel values 830a and 830f.

Then in step S415, the background image combination unit 350 determines whether the pixel values of all the pixels in the overlapping region 510 are acquired. When determining that the pixel values of all the pixels are not acquired, the background image combination unit 350 returns to step S411 for processing a next pixel. When determining that the pixel values of all the pixels are acquired, the background image combination unit 350 terminates the processing of FIG. 31B. The background image combination unit 350 performs the processing of FIG. 31B on all the pixels in the overlapping region 510. The background image combination unit 350 can combine the background images while removing a reflected light source shot in a specific sensor system 110 in the processing of FIG. 31B.

In step S412, the background image combination unit 350 assumes an abnormal pixel value when the pixel value of one sensor system 110 is different from the pixel value of another sensor system 110 by the threshold or more among the pixel values at the same pixel in the overlapping region 510 of the sensor systems 110. In steps S413 and S414, the background image combination unit 350 averages (combines) the pixel value per pixel in the overlapping region 510 except the abnormal pixel values in the overlapping region 510 of the sensor systems 110. That is, the background image combination unit 350 corrects an abnormal pixel value in the overlapping region 510 based on the background image data of the overlapping region 510 of the sensor systems 110.

In step S414, the background image combination unit 350 combines by use of the average values, but is not limited thereto. The background image combination unit 350 may weight and combine each image based on median value, resolution of image, shape of image, shooting position, and the like. Further, the background image combination unit 350 determines a reflection of a light source by use of the difference of each pixel value, but may convert each pixel value into the HSV color space and may assume a non-linear part as a candidate reflection of a light source. Further, the background image combination unit 350 may remove a noise part to be a candidate reflection of a light source by taking logical AND in the sensor systems 110 for a candidate reflection of a light source. Furthermore, the background image combination unit 350 may find and compare a reference value which determines a difference by the threshold or more in least square.

In step S407 of FIG. 31A, the foreground image generation unit 235 in each sensor system 110 has an image input from the camera unit 210, removes the background from the image, and generates foreground image data. For example, the foreground image generation unit 235 performs a foreground/background separation processing thereby to generate the foreground image data by use of the technique in Japanese Patent Laid-Open No. 2010-97355 or Japanese Patent Laid-Open No. 2013-97584. The communication unit 240 in each sensor system 110 transmits the foreground image data generated by the foreground image generation unit 235 to the server 125.

Then in step S408, the communication unit 380 in the server 125 receives the foreground image data from each of the sensor systems 110, and outputs the foreground image data of each of the sensor systems 110 to the foreground image combination unit 360. The foreground image combination unit 360 combines the foreground image data of each of the sensor systems 110, and proceeds to step S409.

In step S409, the virtual viewpoint image generation unit 370 combines the foreground image data combined by the foreground image combination unit 360 with the background image data combined by the background image combination unit 350 thereby to generate a virtual viewpoint image at the viewpoint coordinate. Specifically, the virtual viewpoint image generation unit 370 sets the camera parameters of the virtual camera for the foreground image data and the background image data, renders the image formed on the virtual camera, and generates the pixel value of the virtual viewpoint image.

Then in step S410, the image processing system 100 determines whether an instruction on ending is provided, returns to step S404 when determining that the instruction on ending is not provided, and terminates the processing of FIG. 31A when determining that the instruction on ending is provided.

With the above processings, the image processing system 100 can generate a virtual viewpoint image by use of the sensor systems 110. In this case, the image processing system 100 compensates for the pixels which one sensor system 110 cannot correctly shoot by use of the pixels shot by another sensor system 110, thereby generating a background image without a reduction in image quality. Three sensor systems 110 for generating the background image data of the overlapping region 510 are assumed, but any number of sensor systems 110 may be used or all the sensor systems 110 may be used. Further, when the number of sensor systems 110 for the overlapping region 510 is reduced, the size of the background image data required to generate a background image is restricted, which can produce an effect that the communication amount required to collect the images into the server 125 is restricted.

In step S402, the background region generation unit 340 first selects the sensor system 110a, but is not limited thereto. For example, the background region generation unit 340 calculates and finds a sensor system 110 by which the area of the overlapping region 510 formed on the sensor of the camera unit 210 is the largest by the camera parameters, and may select a sensor system 110 with the largest area. Alternatively, the background region generation unit 340 does not select a sensor system 110, and may find the area in a combination of three sensor systems 110 among all the sensor systems 110. The background region generation unit 340 selects three sensor systems 110 at the longest distances from each other, but may select the sensor systems 110 in descending order of the area of the overlapping region 510 formed on the sensor of the camera unit 210.

<Variant>

Figure 36:
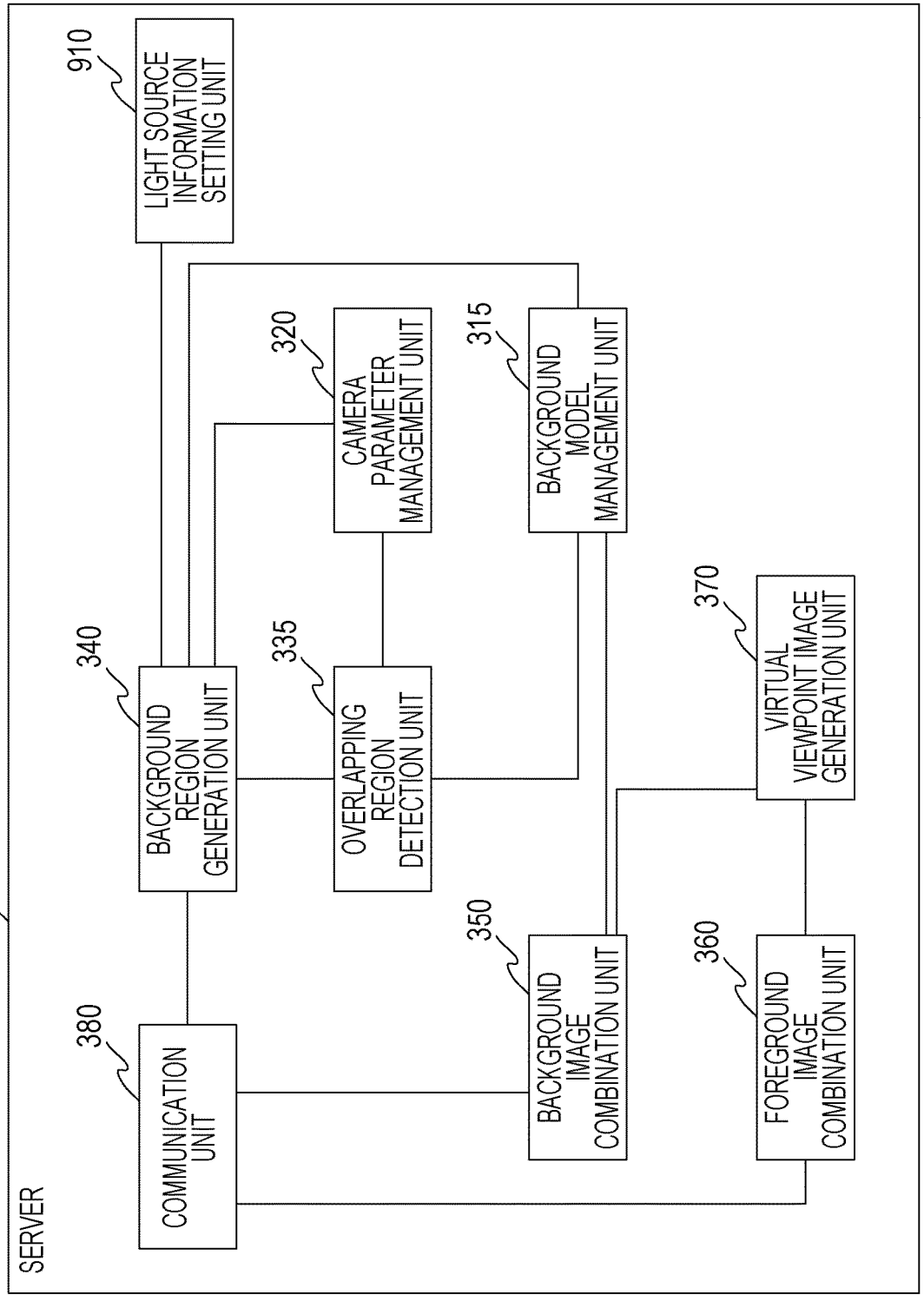
FIG. 36 is a block diagram of the server.

FIG. 36 is a block diagram illustrating an exemplary configuration of the server 125 according to a variant of the third embodiment. The server 125 of FIG. 30 is added with a light source information setting unit 910 to be the server 125 of FIG. 36. The light source information setting unit 910 sets the coordinate or light source information of a light source such as stadium illumination or the sun in the background of an object. The blocks or processing flows not described below are similar to those described in the third embodiment.

Figures 37A, 37B:
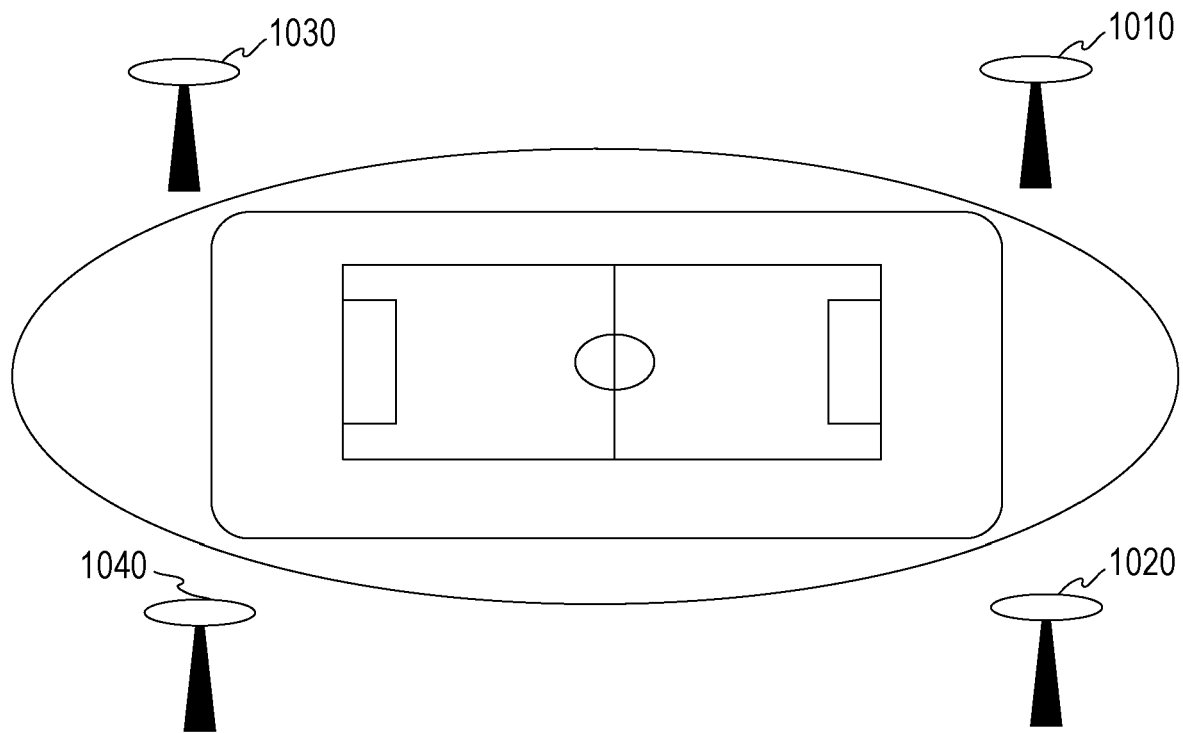
FIGS. 37A and 37B are diagrams illustrating setting values of light source information of a stadium.

FIG. 37A illustrates illuminations 1010, 1020, 1030, and 1040 as light sources of a stadium. The four illuminations 1010, 1020, 1030, and 1040 are installed in the stadium. FIG. 37B is a diagram illustrating a table in which the installation coordinate information of the light sources of the four illuminations 1010, 1020, 1030, and 1040 are set. The illuminations 1010, 1020, 1030, and 1040 are set as point light sources together, and have the coordinate values (x1, y1, z1), (x2, y2, z2), (x3, y3, z3), and (x4, y4, z4), respectively.

The light source information setting unit 910 outputs the light source information of FIG. 37B to the background region generation unit 340. The kind of the light sources is assumed as point light source here, but is not limited thereto and may be surface light source or line light source. The background region generation unit 340 has the camera parameters of each sensor system 110 input from the camera parameter management unit 320, has the overlapping region information input from the overlapping region detection unit 335, and further has the light source information input from the light source information setting unit 910. The background region generation unit 340 then determines a range shot by each sensor system 110 based on the camera parameters, the overlapping region information, and the light source information. The method will be described below.

Figure 38:
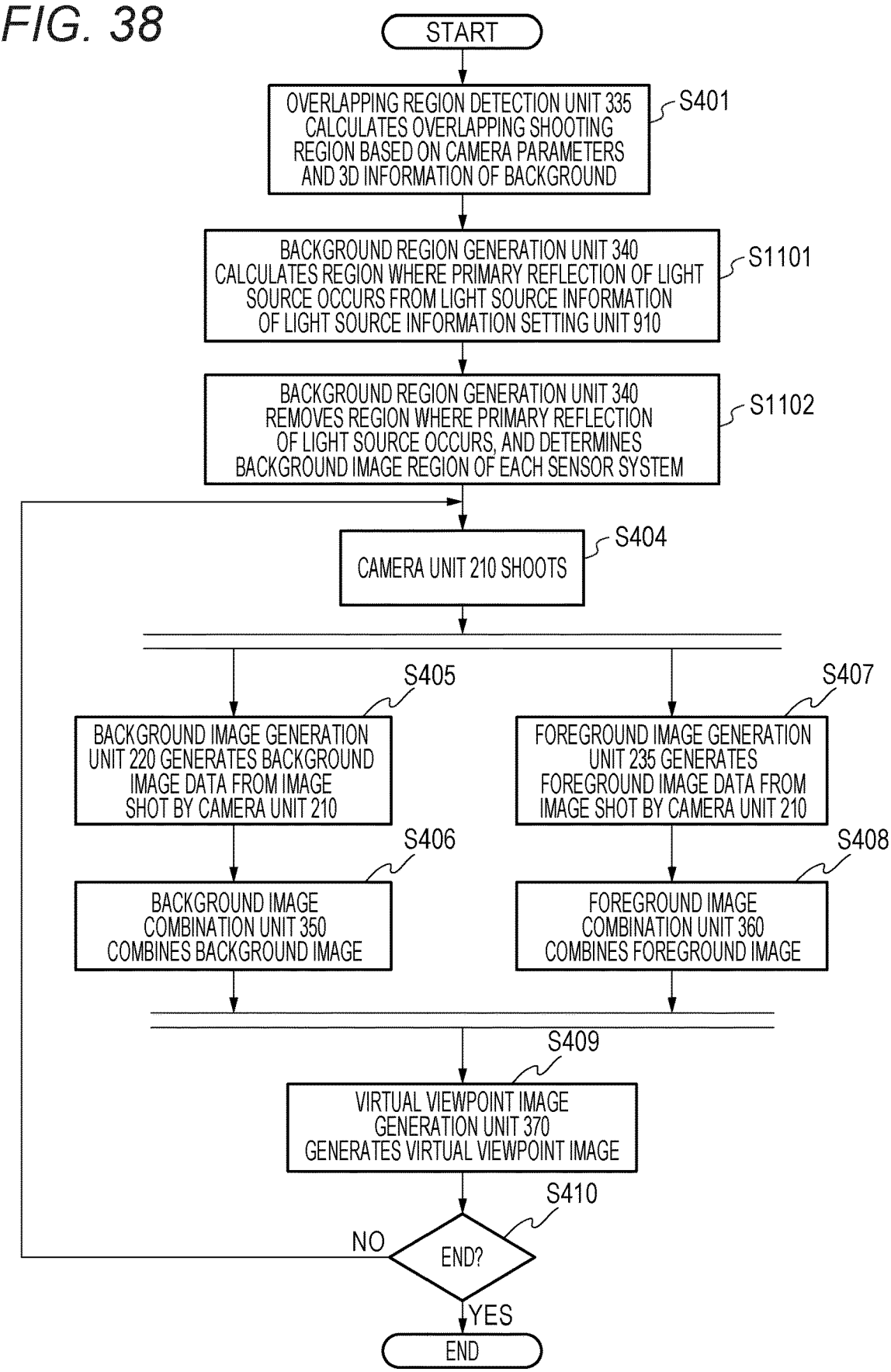
FIG. 38 is a flowchart illustrating the virtual viewpoint image generation processing.

FIG. 38 is a flowchart illustrating the processings of generating a virtual viewpoint image by the image processing system 100 according to the present variant.

The flowchart of FIG. 38 is such that steps S1101 and S1102 are provided to the flowchart of FIG. 31A instead of steps S402 and S403. The processings in steps S401 and S403 to S410 of FIG. 38 are the same as those of FIG. 31A.

At first, the image processing system 100 performs the processing in step S401 similarly as in FIG. 31A. Then in step S1101, the background region generation unit 340 calculates a region where primary reflection of a light source occurs by use of the light source information of the light source information setting unit 910.

Figure 39:
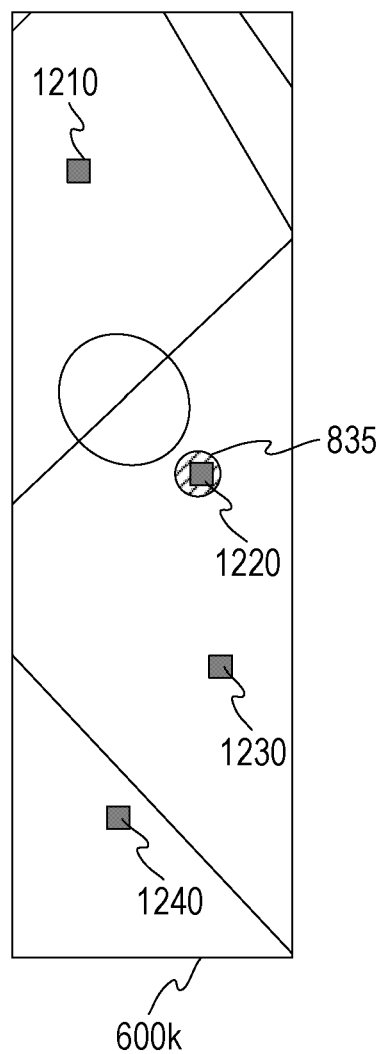
FIG. 39 is a schematic diagram illustrating a relationship between a shooting range and a beam.

FIG. 39 is a diagram illustrating a relationship between the image 600k in the shooting range of the sensor system 110k and a beam projected from the sensor system 110k. The background region generation unit 340 projects a beam to each pixel 1210, 1220, 1230, 1240, or the like in the image 600k of FIG. 39 thereby to perform ray tracing. The pixel 1220 is a point on a region 835, and a region where a reflection of a light source is shot.

Figure 40A:
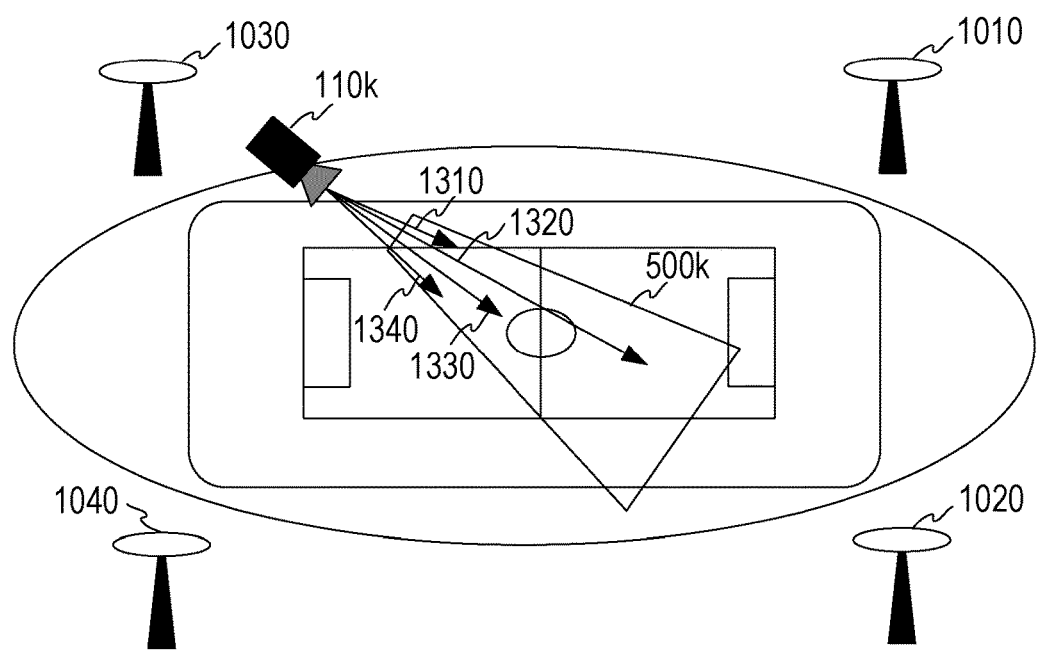
FIGS. 40A and 40B are schematic diagrams illustrating a beam.
Figure 40B:
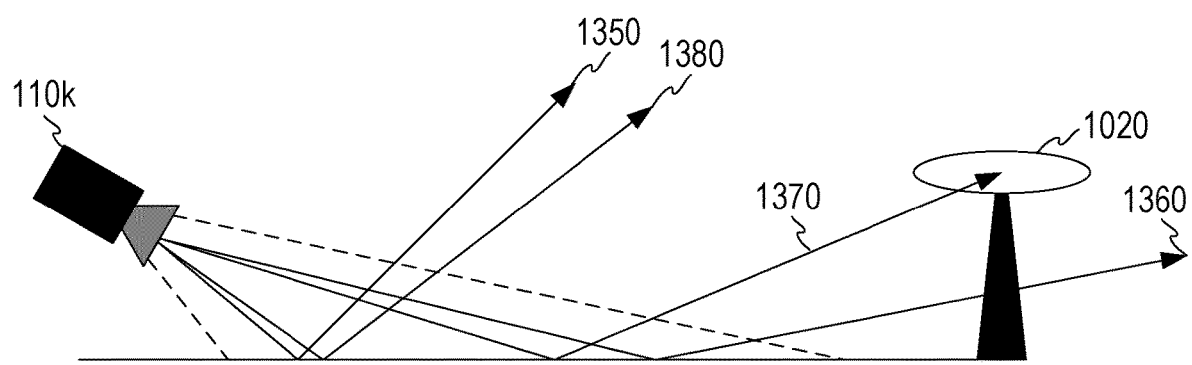

FIGS. 40A and 40B are diagrams illustrating that the beams of the pixels 1210, 1220, 1230, and 1240 are projected from the sensor system 110k to a 3 model (stadium) of the background. FIG. 40A illustrates that a beam is projected from each of the pixels 1210, 1220, 1230, and 1240 of the sensor system 110k to an intersection on the 3 model of the background. It can be seen that beams 1310, 1320, 1330, and 1340 of the pixels 1210, 1220, 1230, and 1240 are projected onto the 3D model of the background.

FIG. 40B is a diagram illustrating that the beams 1310, 1320, 1330, and 1340 of FIG. 40A primarily reflect on the 3D model of the background. The beams 1310, 1320, 1330, and 1340 reflect on the 3D model of the background to be beams 1350, 1360, 1370, and 1380, respectively. The beams 1350, 1360, and 1380 primarily reflect, and then do not hit on the light source. The beam 1370 primarily reflects and hits on the light source 1020. Therefore, the pixel 1220 in the image 600k of the beam 1370 is determined as a region in which a reflection of the light source 1020 can be shot. The background region generation unit 340 performs the similar processing on the other sensor systems 110, and detects a sensor system 110 in which a reflection of a light source of the overlapping region 510 can be shot. For example, the background region generation unit 340 detects four sensor systems 110k, 110d, 110g, and 110n in which a reflection of a light source of the overlapping region 510 can be shot.

Then in step S1102, the background region generation unit 340 determines a background image data generation region in each sensor system 110 except the region where primary reflection of a light source occurs detected in step S1101. For example, the background region generation unit 340 excludes the sensor systems 110d, 110g, 110k, and 110n in which a reflection of a light source of the overlapping region 510 can be shot, which are detected in step S1101, from the sensor systems 110a to 110n. The background region generation unit 340 then determines three sensor systems 110 for generating the background image data of the overlapping region 510 from the sensor systems 110 except the sensor systems 110d, 110g, 110k, and 110n similarly as in step S402 of FIG. 31A. The background region generation unit 340 then determines a background image data generation region of each sensor system 110 similarly as in step S402. The communication unit 380 transmits the background image data generation region determined by the background region generation unit 340 to each sensor system 110. The background image generation unit 220 in each sensor system 110 sets the background image data generation region similarly as in step S403 of FIG. 31A. Thereafter, the image processing system 100 performs the processings in steps S404 to S410 similarly as in FIG. 31A.

As described above, the background region generation unit 340 excludes a sensor system 110 which is determined as being likely to reflect from the candidates of three sensor systems 110 for generating the background image data of the overlapping region 510. The background region generation unit 340 searches three sensor systems 110 which cause the largest area in combination of their coordinate values from among the sensor systems 110 except the sensor systems 110 in which a reflection of a light source can occur in the overlapping region 510. The background region generation unit 340 then determines three sensor systems 110 causing the largest area as three sensor systems 110 for generating the background image data of the overlapping region 510, and determines a background image data generation range of each sensor system 110.

The background region generation unit 340 detects a sensor system 110 in which a reflected light of a light source of the overlapping region 510 is shot based on the position information of the light source, and determines a background image data generation region except the overlapping region 510 for the detected sensor system 110. The image processing system 100 previously excludes a region where a reflection can occur in the image of each sensor system 110 from the background image data generation region, thereby generating the background image data.

The present embodiment assumes that a reflection of a light source is removed, but is not limited thereto and can be similarly applied to dust or scratch on the lens surface of the camera unit 210 or the sensor of the camera unit 210, or insect or bird crossing in front of the camera unit 210, for example. At this time, a dust on the sensor of the camera unit 210 may be previously specified in its position by use of a dust shade identification technique in Japanese Patent Laid-Open No. 2012-222508 like the above light source reflection.

According to the present embodiment, the image processing system 100 generates a virtual viewpoint image by use of a plurality of sensor systems 110. In this case, the image processing system 100 corrects a pixel which one sensor system 110 cannot correctly shoot by use of a pixel of another sensor system 110, thereby removing a reflected light which should not be seen at the viewpoint. The image processing system 100 determines a background image data generation region of each sensor system 110 based on the overlapping region 510, thereby reducing the communication amount of the background image data.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2017-175528, filed Sep. 13, 2017, and Japanese Patent Application No. 2017-201955 filed Oct. 18, 2017 which are hereby incorporated by reference herein in their entirety.

What is claimed is:

1. An image processing system for generating a virtual viewpoint image, comprising:
   one or more hardware processors; and
   one or more memories storing one or more programs configured to be executed by the one or more hardware processors, the one or more programs including instructions for:
   acquiring viewpoint information indicating a virtual viewpoint;
   acquiring, based on a plurality of captured images acquired by shooting a target region by a plurality of imaging apparatuses from a plurality of directions, a plurality of background images not including a predetermined object in the target region and an image of the predetermined object;
   extracting a partial image to be used to generate the virtual viewpoint image from a background image included in the plurality of background images; and
   generating the virtual viewpoint image based on the partial image, the image of the predetermined object and the viewpoint information,
   wherein a value of a pixel in the virtual viewpoint image corresponding to a specific position in the target region is determined based on two or more partial images which include images at the specific position in the target region and which are extracted from two or more background images included in the acquired plurality of background images.

2. The image processing system according to claim 1, wherein the partial image is extracted such that a predetermined number of partial images including an image of the same region in the target region are present in a plurality of partial images extracted from the background images.

3. The image processing system according to claim 1, wherein the one or more programs further include instructions for
   determining a region which is in a background image and which is extracted as a partial image,
   wherein the partial image depending on the determination is extracted.

4. The image processing system according to claim 3, wherein a region which is in a background image acquired based on shooting by a first imaging apparatus among the imaging apparatuses and which is extracted as a partial image is determined based on a state of a second imaging apparatus different from the first imaging apparatus among the imaging apparatuses.

5. The image processing system according to claim 4, wherein the state of the second imaging apparatus includes at least any of position, orientation, direction, and lens focal length of the second imaging apparatus.

6. The image processing system according to claim 3, wherein a region to be extracted as a partial image is determined based on at least any of 3D shape data corresponding to the target region and viewpoint information acquired by the information acquisition unit.

7. The image processing system according to claim 3, wherein the one or more programs further include instructions for
   acquiring information on a state of a light projected on the target region,
   wherein a region to be extracted as a partial image is determined based on the information on a state of a light projected on the target region.

8. The image processing system according to claim 1, wherein one or more partial images are selected out of the two or more partial images based on values of pixels corresponding to the specific position in the two or more partial images, and a value of a pixel corresponding to the specific position in the virtual viewpoint image is determined based on values of pixels corresponding to the specific position in the one or more selected partial images.

9. The image processing system according to claim 8, wherein when a difference between a value of a pixel corresponding to the specific position in a first partial image out of the two or more partial images and a value of a pixel corresponding to the specific position in a second partial image out of the two or more partial images is less than a threshold, the first partial image and the second partial image are determined.

10. The image processing system according to claim 8, wherein when a plurality of partial images are selected from the two or more partial images, an average value of values of pixels corresponding to the specific position in the selected partial images is determined as a value of a pixel corresponding to the specific position in the virtual viewpoint image.

11. The image processing system according to claim 1, wherein the one or more programs further include instructions for
   transmitting the partial image and the image of the predetermined object to a storage device,
   wherein the generation unit generates the virtual viewpoint image based on the partial image and the image of the predetermined object stored in the storage device.

12. The image processing system according to claim 11, wherein the one or more programs further include instructions for
   determining a region which is in a background image acquired based on shooting by an imaging apparatus among the imaging apparatuses and which is extracted as a partial image based on other one or more partial images which has been transmitted and is stored in the storage device.

13. An image processing method for generating a virtual viewpoint image, comprising:
   acquiring viewpoint information indicating a virtual viewpoint;
   acquiring, based on a plurality of captured images acquired by shooting a target region by a plurality of imaging apparatuses from a plurality of directions, a plurality of background images not including a predetermined object in the target region and an image of the predetermined object;
   extracting a partial image to be used to generate the virtual viewpoint image from a background image included in the plurality of background images; and generating the virtual viewpoint image based on the partial image, the image of the predetermined object, and the viewpoint information, wherein a value of a pixel in the virtual viewpoint image corresponding to a specific position in the target region is determined based on two or more partial images which include images at the specific position in the target region and which are extracted from two or more background images included in the acquired plurality of background images.

14. A non-transitory storage therein a program for causing a computer to perform an image processing method, the method comprising:

acquiring viewpoint information indicating a virtual viewpoint;

acquiring, based on a plurality of captured images acquired by shooting a target region by a plurality of imaging apparatuses from a plurality of directions, a plurality of background images not including a predetermined object in the target region and an image of the predetermined object;

extracting a partial image to be used to generate the virtual viewpoint image from a background image included in the plurality of background images; and generating the virtual viewpoint image based on the partial image, the image of the predetermined object, and the viewpoint information, wherein a value of a pixel in the virtual viewpoint image corresponding to a specific position in the target region is determined based on two or more partial images which include images at the specific position in the target region and which are extracted from two or more background images included in the acquired plurality of background images.

* * * * *